(12) United States Patent
Labbe et al.

(10) Patent No.: US 7,980,278 B2
(45) Date of Patent: Jul. 19, 2011

(54) BRUSH CUTTING HEAD WITH INTERNALLY HOUSED DRIVE AND BEARING ASSEMBLY

(75) Inventors: Etienne Labbe, Sainte-Marie (CA); Rene Boivin, Scott (CA)

(73) Assignee: Usitech Nov Inc., Ste-Marie, Québec ( * ) Notice: Subject to any disclaimer, the term of this patent is extended or adjusted under 35 U.S.C. 154(b) by 623 days.

(21) Appl. No.: 11/889,901

(22) Filed: Aug. 17, 2007

(65) Prior Publication Data
US 2009/0044508 A1    Feb. 19, 2009

(51) Int. Cl.
*B27C 1/00* (2006.01)

(52) U.S. Cl. .......... 144/231; 144/172; 241/294; 407/48; 407/59

(58) Field of Classification Search ............... 144/24.12, 144/24.13, 172, 174, 218, 220, 230–237; 241/101.72, 101.762, 242, 294, 295; 56/249, 56/294; 407/40, 48, 51, 58, 59
See application file for complete search history.

(56) References Cited

U.S. PATENT DOCUMENTS

| | | | | |
|---|---|---|---|---|
| 4,041,996 A | * | 8/1977 | Grover | 144/24.12 |
| 5,158,126 A | * | 10/1992 | Lang | 144/375 |
| 5,355,918 A | * | 10/1994 | Lang | 144/24.12 |
| 5,555,652 A | * | 9/1996 | Ashby | 37/189 |
| 5,794,866 A | * | 8/1998 | Shinn | 241/101.72 |
| 5,975,644 A | * | 11/1999 | Lang | 299/39.4 |
| 6,438,874 B1 | * | 8/2002 | LaBounty et al. | 37/403 |
| 6,626,500 B1 | * | 9/2003 | Cribb et al. | 299/78 |
| 7,748,421 B2 | * | 7/2010 | Everett | 144/172 |

OTHER PUBLICATIONS

Technical brochure for "Tandem Asphalt Rollers CC800/900/1000", Dynapac Compaction Equipment AB, Apr. 2005, Karlskrona, Sweden.
Technical Specifications for Motorized Conveyor Rollers, Matrex Productions, Jan. 5, 2004, Villeneuve sur Yonne, France.

* cited by examiner

*Primary Examiner* — Dana Ross
*Assistant Examiner* — Jennifer Chiang
(74) *Attorney, Agent, or Firm* — Norton Rose OR LLP

(57) ABSTRACT

A brush cutting head having internally housed drive and bearing assemblies which can be easily attached/detached from the brush cutter housing without having to dismantle the drive assembly for improved productivity. The brush cutting head includes a hollow support body, a drive and bearing assembly housed at least partially within the hollow of the support body, a drive block mounted to extend within the hollow of the support body, and a motor provided with a torque transmitting driveshaft.

33 Claims, 34 Drawing Sheets

BRUSH CUTTING HEAD WITH INTERNALLY HOUSED DRIVE AND BEARING ASSEMBLY

FIELD OF THE INVENTION

The present invention relates generally to brush cutters and to brush cutting heads therefor, and more specifically, to brush cutting heads having internally housed drive and bearing assemblies.

BACKGROUND OF THE INVENTION

Extensive felling and mulching operations are often performed with a heavy-duty brush cutter mounted to the front of a work vehicle. A typical brush cutter includes a brush cutting head provided with an elongate support body that carries about its outer surface a plurality of teeth adapted to cut trees, brush or the like. The brush cutting head is rotatably mounted within an open-bottom housing. The housing has a pair of spaced apart sidewalls between which extend a top wall, a front wall and a rear wall. The walls of the housing cooperate with each other to define a well sized to receive therein the elongate support body of the brush cutting head. The brush cutting head is mounted for rotation between two spaced apart housing sidewalls with its ends supported on bearing assemblies mounted in the sidewalls.

A drive assembly is also provided to urge rotation of the support body. This drive assembly typically includes a motor carried on the sidewall of the housing and a transmission system for transmitting the torque produced by the motor to the support body. In one known brush cutting head, the transmission system includes a drive belt arrangement. Chain and sprocket arrangements have also been employed. In such brush cutters, the transmission system is usually housed within a protective enclosure carried on one of the sidewalls. A removable cover plate provides access to the protective enclosure for servicing or repair of the motor and/or transmission system. In the case of heavy-duty brush cutters, each sidewall carries its own motor and associated transmission system.

The brush cutting head often needs to be detached from the brush cutter for servicing or replacement, for instance, where a plurality of cutting teeth are broken or where the brush cutting head and its cutting teeth do not suit the particular field conditions encountered on a site to be cleared. In known brush cutters of the type described above, the detachment of the brush cutting head from the brush cutter tends to be a complicated, labour-intensive and time-consuming task because it requires not only that the support body be decoupled from the housing but also that the bearing assemblies and transmission system be taken apart as well. In some cases, disconnecting one brush cutting head and replacing it with another can take between six to eight hours. As a result, a brush cutter whose brush cutting head is undergoing servicing, repair or replacement tends be subjected to extended periods of non-use with adverse impacts on productivity.

In light of the foregoing, it would be advantageous to have a brush cutter whose brush cutting head could be easily attached/detached from the brush cutter housing without having to dismantle the drive assembly for improved productivity.

SUMMARY OF THE INVENTION

In accordance with one embodiment of the present invention, there is provided a brush cutting head. The brush cutting head includes a hollow support body having a first end, an opposed second end, an outer surface and an inner surface. The inner surface of the support body defining a hollow which extends between the first and second ends of the support body. Also provided is a drive and bearing assembly housed at least partially within the hollow of the support body. The drive and bearing assembly includes a drive block mounted to extend within the hollow of the support body at the first end thereof. The drive block includes a motor provided with a torque transmitting driveshaft. A first coupling assembly is connected to the driveshaft of the motor and the support body. The first coupling assembly is operable to transmit the torque produced by the motor to the support body to thereby urge rotation of the brush cutting head. The drive and bearing assembly is a second coupling assembly mounted to extend within the hollow of the support body at the second end thereof. The second coupling assembly has a first end and a second end. The second end of the coupling assembly is fixedly attached to the support body. The second coupling assembly includes a bearing support member, a bearing assembly housed within the bearing support member and a coupling member. The bearing assembly is mounted in surrounding relation with a portion of the coupling member to thereby allow free rotation of the coupling member relative to the bearing support member.

In another feature, the drive block further includes a motor support member for retaining the motor within the hollow of the support body. The motor support member includes a body provided with a first end, a second end, a generally cylindrical sidewall extending between the first and second ends of the body. The sidewall defines a hollow which receives therein a portion of the motor. The motor is detachably mounted to the motor support member.

In an additional feature, intermediate the first and second ends of the body, the sidewall has a radially inwardly extending portion defining a shoulder. The motor is provided with at least one tab for releasably fastening to the shoulder defined in the sidewall.

In still another feature, the body of the motor support member further includes a flange member joined to the sidewall at the first end of the body. The flange member is fixable to the side panel of a brush cutter housing.

In yet a further feature, the first coupling assembly includes a coupling member. The coupling member of the first coupling assembly includes a hub portion. The hub portion has a first end and a second end. The second end of the hub portion has a bore defined therein. The bore receiving the driveshaft in mating engagement therewith.

In one feature, the drive block further includes a motor support member for retaining the motor within the hollow of the support body. The motor support member includes a body provided, with a first end, a second end, a generally cylindrical sidewall extending between the first and second ends of the body. The sidewall defining a hollow sized to receive therein a portion of the motor. The hub portion of the coupling member is mounted to extend into the hollow defined by the sidewall of the body. Additionally, the first coupling assembly includes a bearing assembly. The bearing assembly of the first coupling assembly is mounted in surrounding relation with the hub portion. The bearing assembly of the first coupling assembly is housed within the body of the motor support member.

In an additional feature, the first coupling assembly includes an annular plate mounted to the second end of the body. The annular plate has a central opening defined therein. The central aperture receives therethrough a portion of the hub portion. The annular plate cooperates with the sidewall of the body to at least partially enclose the bearing assembly of the first coupling assembly within the body. In a further feature, the first coupling assembly includes first means for retaining the bearing assembly of the first coupling assembly onto the hub portion. The first retaining means includes a first retaining ring fitted onto the second end of the hub portion. In yet another feature, the first coupling assembly includes second means for retaining the bearing assembly of the first coupling assembly within the body of the motor support member. The sidewall of the body has an inner surface which defines the hollow of the body. The second retaining means includes a second retaining ring mounted in surrounding relation with the hub portion at a location intermediate the first and second ends thereof. The second retaining ring engages the inner surface of the sidewall and a portion of the bearing assembly of the first coupling assembly.

In a further feature, the coupling member of the first coupling assembly includes a disc-shaped portion having a first face and an opposed second face. The hub portion extends outwardly from the second face of the disc-shaped portion. In another feature, the first coupling member includes a mounting plate fixed to the support body. The mounting plate is releasably fastened to the disc-shaped portion of the first coupling member. Additionally, the first coupling assembly includes means for aligning the disc-shaped portion of the first coupling member with the mounting plate. The disc-shaped portion has a puck-like projection standing proud of the first face thereof and the mounting plate has an annular body provided with a central aperture. The puck-like projection and the central aperture of the annular body together define the alignment means of the first coupling assembly.

In another feature, the bearing support member includes a body provided with a first end, a second end, a generally cylindrical sidewall extending between the first and second ends of the body. The sidewall defines a hollow which receives therein the bearing assembly. The body of the bearing support member further includes a flange member joined to the sidewall at the first end of the body. The flange member is fixable to the side panel of a brush cutter housing.

In yet another feature, the bearing assembly is removeably mounted to the bearing support member. The coupling member of the second coupling assembly includes a hub portion. The bearing assembly is mounted in surrounding relation with the hub portion.

In another feature, the second coupling assembly includes an annular plate mounted to the second end of the body. The annular plate has a central opening defined therein. The central opening receives therethrough a portion of the hub portion. The annular plate cooperating with the sidewall of the body to at least partially enclose the bearing assembly within the body. In a further feature, the second coupling assembly includes first means for retaining the bearing assembly of the second coupling assembly onto the hub portion. The first retaining means includes a first retaining ring fitted onto the second end of the hub portion. Further still, the second coupling assembly includes second means for retaining the bearing assembly of the second coupling assembly within the body of the bearing support member. The sidewall of the body has an inner surface which defines the hollow of the body. The second retaining means includes a second retaining ring mounted in surrounding relation with the hub portion at a location intermediate the first and second ends thereof. The second retaining ring is sized to engage the inner surface of the sidewall and a portion of the bearing assembly of the second coupling assembly.

In an additional feature, the coupling member of the second coupling assembly includes a disc-shaped portion having a first face and an opposed second face. The hub portion extends outwardly from the second face of the disc-shaped portion. The second coupling member includes a mounting plate fixed to the support body. The mounting plate is releasably fastened to the disc-shaped portion of the second coupling member. Moreover, the second coupling assembly includes means for aligning the disc-shaped portion of the second coupling member with the mounting plate. The disc-shaped portion has a puck-like projection standing proud of the first face thereof and the mounting plate has an annular body provided with a central aperture. The puck-like projection and the central aperture of the annular body together define the alignment means of the second coupling assembly.

In still another feature, at a location adjacent the first end of the support body, the support body has a first shoulder projecting from the inner surface thereof into the hollow. The portion of the first coupling assembly is fixed to the first shoulder. At a location adjacent the second end of the support body, the support body has a second shoulder projecting from the inner surface thereof into the hollow. The second end of the second coupling assembly is fixedly attached to the second shoulder.

In a further feature, the first coupling assembly includes a coupling member matingly engaged with the driveshaft and a first mounting plate fixed to the first shoulder defined in the support body. The coupling member of the first coupling assembly is releasably fastened to first mounting plate. Additionally, the second coupling assembly includes a second mounting plate fixed to the second shoulder defined in the support body. The coupling member of the second coupling assembly is releasably fastened to second mounting plate.

In accordance with another embodiment of the present invention, there is provided to a brush cutter. The brush cutter including an open-bottom brush cutter housing having a plurality of panels. The plurality of panels includes a first side panel and a second side panel. The brush cutter also has a hollow support body rotatably mounted between the first and second side panels of the brush cutter housing. The support body has a first end, an opposed second end, an outer surface and an inner surface. The inner surface of the support body defines a hollow which extends between the first and second ends of the support body. Also provided is a drive and bearing assembly housed at least partially within the hollow of the support body. The drive and bearing assembly includes a drive block mounted to extend within the hollow of the support body at the first end thereof. The drive block includes a motor provided with a torque transmitting driveshaft. A first coupling assembly is connected to the driveshaft of the motor and the support body. The first coupling assembly is operable to transmit the torque produced by the motor to the support body to thereby urge rotation of the brush cutting head. The drive and bearing assembly further includes a second coupling assembly mounted to extend within the hollow of the support body at the second end thereof. The second coupling assembly has a first end and a second end. The second end of the coupling assembly is fixedly attached to the support body. The second coupling assembly includes a bearing support member, a bearing assembly housed within the bearing support member and a coupling member. The bearing assembly is mounted in surrounding relation with a portion of the coupling member to thereby allow free rotation of the coupling member relative to the bearing support member.

In one feature, the drive block is releasably connected to the first side panel of the brush cutter housing and the bearing support member is releasably connected to the second side panel of the brush cutter housing. In another feature, the drive block further includes a motor support member for retaining the motor within the hollow of the support body. The motor support member has a flange member. The flange member is detachably fastened to the first side panel. Additionally, the first side panel has a cutout formed therein sized to receive a portion of the motor support member. In still another feature, the bearing support member has a flange member. The flange member is detachably fastened to the second side panel. Moreover, the second side panel has a cutout formed therein sized to receive a portion of the bearing support member.

In accordance with yet another embodiment of the present invention, there is provided a drive and bearing assembly for a brush cutting head. The brush cutting head has a support body. The support body has a first end, an opposed second end, an outer surface and an inner surface. The inner surface of the support body defines a hollow which extends between the first and second ends of the support body. The drive and bearing assembly includes a drive block configured for placement within the hollow of the support body at the first end thereof. The drive block includes a motor provided with a torque transmitting driveshaft. A first coupling assembly is connectable to the driveshaft of the motor and the support body. The first coupling assembly is operable to transmit the torque produced by the motor to the support body to thereby urge rotation of the brush cutting head. The drive and bearing assembly further includes a second coupling assembly configured for placement within the hollow of the support body at the second end thereof. The second coupling assembly has a first end and a second end. The second end of the coupling assembly is fixedly attachable to the support body. The second coupling assembly includes a bearing support member, a bearing assembly housed within the bearing support member and a coupling member. The bearing assembly is mounted in surrounding relation with a portion of the coupling member to thereby allow free rotation of the coupling member relative to the bearing support member.

In accordance with still another embodiment of the present invention, there is provided a brush cutting head including a hollow support body having a first end, an opposed second end, an outer surface and an inner surface. The inner surface of the support body defines a hollow which extends between the first and second ends of the support body. Also, provided is a drive and bearing assembly housed at least partially within the hollow of the support body. The drive and bearing assembly includes a first drive block mounted to extend within the hollow of the support body at the first end thereof. The first drive block includes a first motor provided with a first torque transmitting driveshaft. A first coupling assembly is connected to the first driveshaft and the support body. The first coupling assembly is operable to transmit the torque produced by the first motor to the support body to thereby urge rotation of the brush cutting head. The drive and bearing assembly further includes a second drive block mounted to extend within the hollow of the support body at the second end thereof. The second drive block includes a second motor provided with a second torque transmitting driveshaft. The second coupling assembly is connected to the second driveshaft and the support body. The second coupling assembly is operable to transmit the torque produced by the second motor to the support body to thereby urge rotation of the brush cutting head.

In accordance with one embodiment of the present invention, there is provided a brush cutter. The brush cutter includes an open-bottom brush cutter housing having a plurality of panels. The plurality of panels includes a first side panel and a second side panel. The brush cutter further includes a hollow support body rotatably mounted between the first and second side panels of the brush cutter housing. The support body has a first end, an opposed second end, an outer surface and an inner surface. The inner surface of the support body defines a hollow which extends between the first and second ends of the support body. Also provided is a drive and bearing assembly housed at least partially within the hollow of the support body. The drive and bearing assembly includes a first drive block mounted to extend within the hollow of the support body at the first end thereof. The first drive block includes a first motor provided with a first torque transmitting driveshaft. A first coupling assembly is connected to the first driveshaft and the support body. The first coupling assembly is operable to transmit the torque produced by the first motor to the support body to thereby urge rotation of the brush cutting head. The drive and bearing assembly further includes a second drive block mounted to extend within the hollow of the support body at the second end thereof. The second drive block includes a second motor provided with a second torque transmitting driveshaft. The second coupling assembly is connected to the second driveshaft and the support body. The second coupling assembly is operable to transmit the torque produced by the second motor to the support body to thereby urge rotation of the brush cutting head.

In another feature, the first drive block is releasably connected to the first side panel of the brush cutter housing and the second drive block is releasably connected to the second side panel of the brush cutter housing. Additionally, the first drive block includes a first motor support member for retaining the first motor within the hollow of the support body. The first motor support member has a first flange member. The first flange member is detachably fastened to the first side panel. The second drive block includes a second motor support member for retaining the second motor within the hollow of the support body. The second motor support member has a second flange member. The second flange member is detachably fastened to the second side panel.

In accordance with yet another embodiment of the present invention, there is provided a drive and bearing assembly for a brush cutting head. The brush cutting head having a hollow support body provided with a first end, an opposed second end, an outer surface and an inner surface. The inner surface of the support body defines a hollow which extends between the first and second ends of the support body. The drive and bearing assembly includes a first drive block mounted to extend within the hollow of the support body at the first end thereof. The first drive block includes a first motor provided with a first torque transmitting driveshaft. A first coupling assembly is connected to the first driveshaft and the support body. The first coupling assembly is operable to transmit the torque produced by the first motor to the support body to thereby urge rotation of the brush cutting head. The drive and bearing assembly further includes a second drive block mounted to extend within the hollow of the support body at the second end thereof. The second drive block includes a second motor provided with a second torque transmitting driveshaft. The second coupling assembly is connected to the second driveshaft and the support body. The second coupling assembly is operable to transmit the torque produced by the second motor to the support body to thereby urge rotation of the brush cutting head.

BRIEF DESCRIPTION OF THE DRAWINGS

The embodiments of the present invention shall be more clearly understood with reference to the following detailed description of the embodiments of the invention taken in conjunction with the accompanying drawings, in which.

DETAILED DESCRIPTION OF THE EMBODIMENTS OF THE INVENTION

Figure 1:
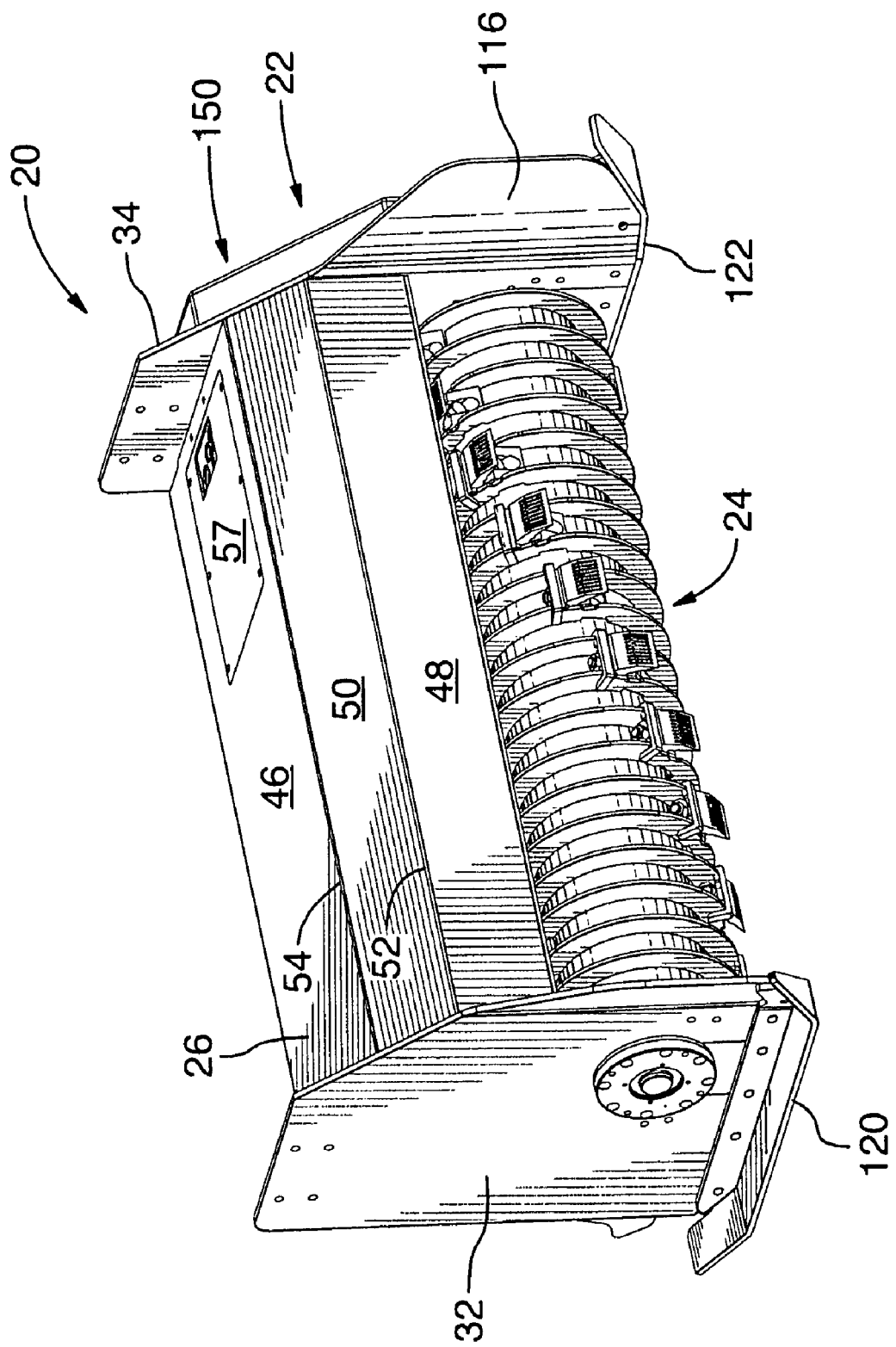
FIG. 1 is a front right perspective view of a brush cutter according to a first embodiment of the present invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIGS. 1 to 6, there is shown a brush cutter generally designated with reference numeral 20. Brush cutter 20 may be of the type attached to the front of a vehicle, such as a loader, skid steer, or the like. Brush cutter 20 includes an open-bottom housing 22 and a brush cutting head 24 rotatably mounted within the housing 22. The housing 22 is defined generally by a front cover panel 26, a rear cover panel 28 and a pair of side panels 32 and 34. The cover panels 26 and 28 extend longitudinally between, and are joined to, the side panels 32 and 34. A curved wall 33 disposed within the interior of the housing 22 spans the space between the side panels 32 and 34, its curved profile partially defining a well 35 (best shown in FIG. 6) sized to accommodate the brush cutting head 24.

Figure 2:
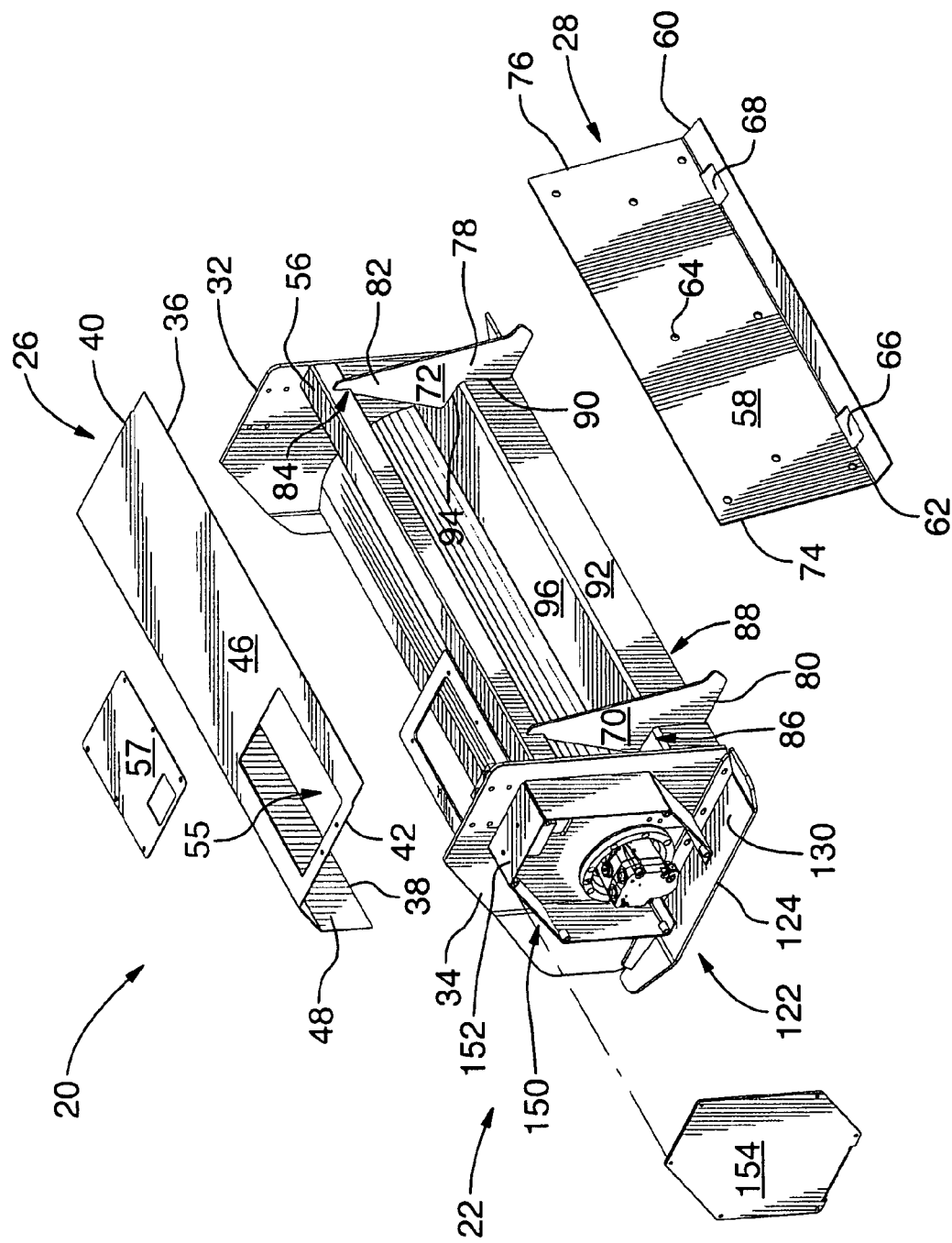
FIG. 2 is rear right perspective view of the brush cutter illustrated in FIG. 1 showing front and rear cover panels and the side cover plate exploded from the brush cutter housing.
Figure 3:
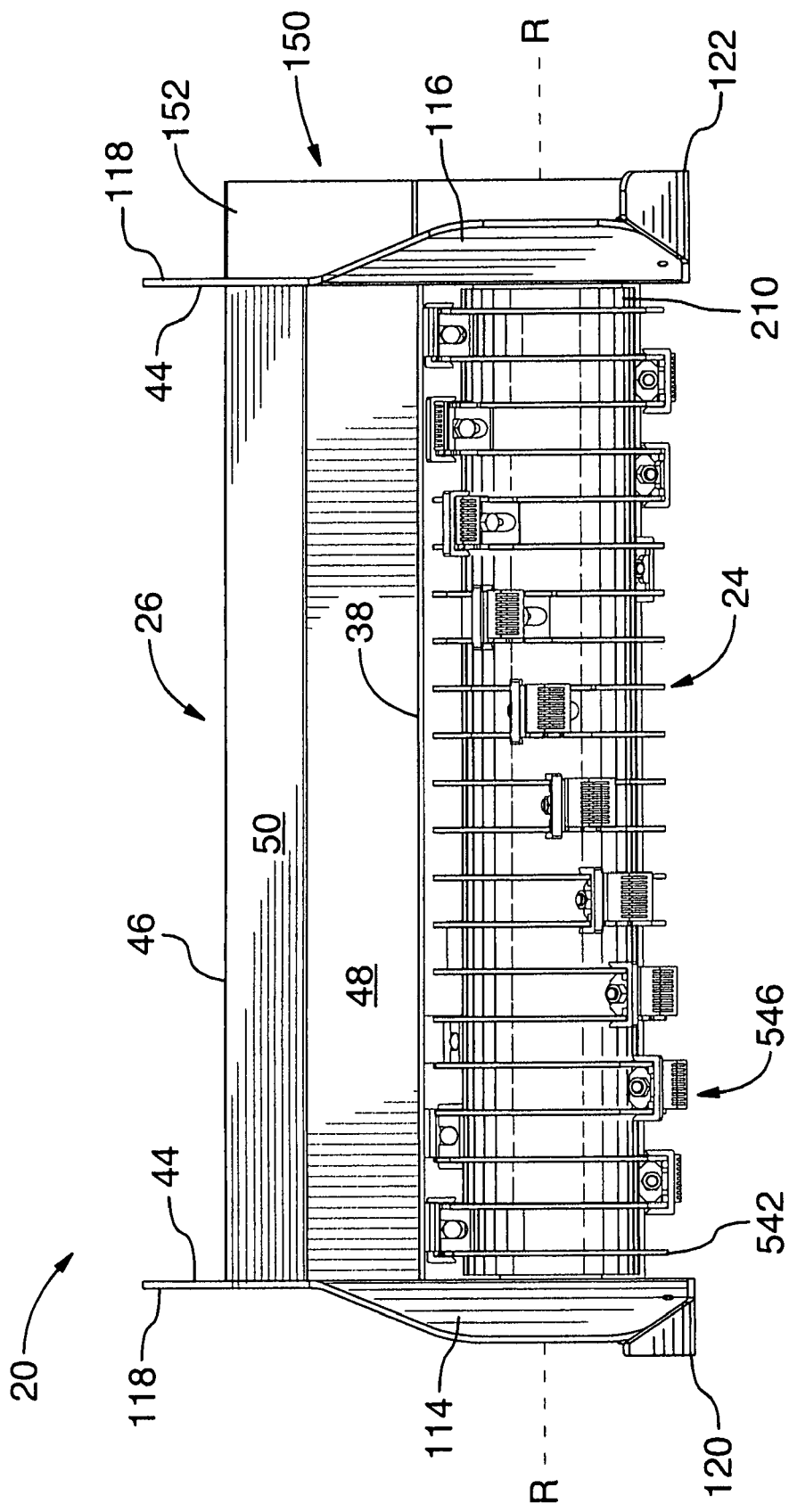
FIG. 3 is a front elevation view of the brush cutter shown in FIG. 1.

With reference to FIG. 2, the front cover panel 26 is a bent steel panel whose margins are defined by a rear upper longitudinal edge 36, a front lower longitudinal edge 38, and a pair of spaced apart side edges 40 and 42 extending between the longitudinal edges 36 and 38. The front cover panel 26 is welded to the inner faces 44 of the side panels 32 and 34 along its side edges 40 and 42. The front cover panel 26 includes an upper panel portion 46, a lower panel portion 48 and an intermediate panel portion 50 joining the upper panel portion 46 to the lower panel portion 48. The lower panel portion 48 extends generally vertically upwards from the front lower edge 38 to a first corner 52 whereat it meets the intermediate panel portion 50. The front lower edge 38 is carried above the axis of rotation R-R of the brush cutting head 24 (as best shown in FIG. 3) leaving the front of the housing 22 substantially open to allow the brush cutting head 24 to engage the brush to be cut as the brush cutter 20 travels over an area to be cleared. The intermediate panel portion 50 is bent relative to the lower panel portion 48 and extends upwardly and rearwardly from the first corner 52 and terminates at a second corner 54 whereat it connects to the upper panel portion 46. The upper panel portion 46 is also bent relative to the intermediate panel portion 48 such that it has a generally horizontal orientation and defines the top of the housing 22. At its rear upper edge 36, the upper panel portion 46 is supported by, and secured to, a square hollow structural steel (HSS) support member 56 that is mounted to extend longitudinally between the side panels 32 and 34. A relatively large, generally rectangular aperture 55 is defined in the upper panel portion 46 adjacent the side edge 42 thereof to permit access to a removable cover plate 57 which shields the hydraulic fluid distribution system 162 (best shown in FIG. 7).

The rear cover panel 28 is a bent steel panel that has a relatively wide portion 58 and a narrow doglegged, upturned lip portion 60 joined to the wide portion 58 at a corner 62. Defined at various spaced apart locations in the wide portion 58, is a plurality of small apertures 64 for receiving bolts or the like to permit permanent fastening of the brush cutting head 24 to the brush cutter 20. The lip portion 60 is provided with a pair of spaced apart, relatively larger rectangular, openings 66 and 68 that serve to allow quick attachment of the brush cutting head 24 to the brush cutter 20. A pair of vertically extending, fin-shaped, brace members 70 and 72 which protrude from the rear of the housing 22 are used to attach the rear cover panel 28 to the housing 22. More specifically, the rear cover panel 28 is welded along its side edges 74 and 76 to the inner faces 78 of the brace member 70 and 72.

Figure 4:
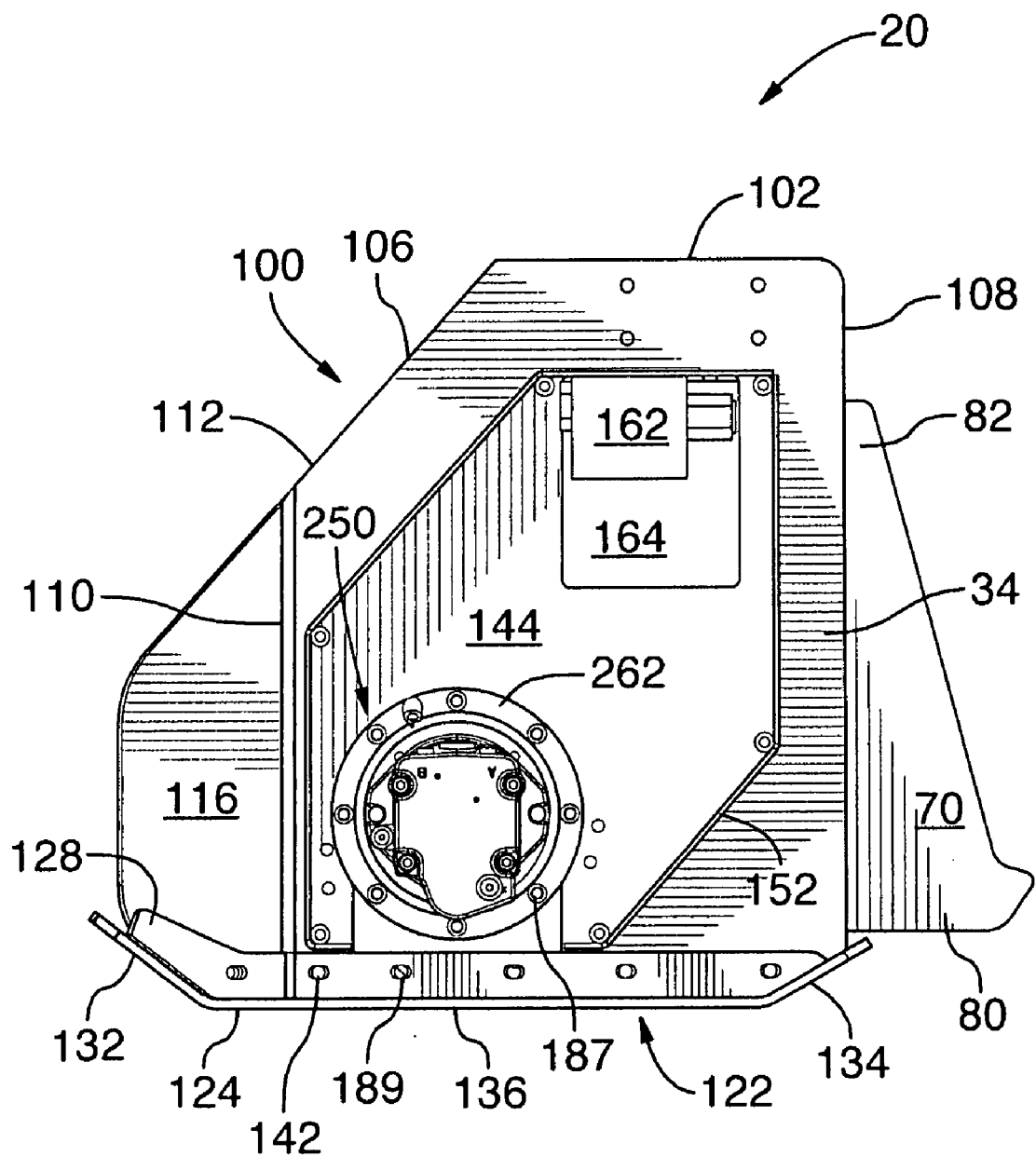
FIG. 4 is a right end elevation view of the brush cutter shown in FIG. 2.

As shown in FIGS. 2 and 4, each brace member 70, 72 has a relatively wide base portion 80 that tapers to a relatively narrower tip portion 82. The base portion 80 of each brace member 70, 72 is carried a relatively small distance above the lowest extremity of the brush cutter 20. The tip portion 82 of each brace member 70, 72 includes a first rabbet 84 configured to receive a corner of the HSS support member 56 in abutting relation thereto. A second rabbet 86 (sized larger than the first rabbet 84) is formed in the base portion 80. The second rabbet 86 is sized to correspond to the generally L-shaped profile of an angle member 88 upon which each brace member 70, 72 abuts. More specifically, the vertical edge 90 of the second rabbet 86 bears against, and is welded to, the vertical portion 92 of the angle member 88, while its horizontal edge 94 abuts, and is welded to, the horizontal portion 96 of the angle member 88.

In this arrangement, the ends of the angle member 88 are themselves welded to the inner faces 44 of the side panels 32 and 34 and the brace member 70 and 72 are mounted to the angle member 88 a relative short distance inwardly of the ends thereof such that there is a small space or gap between each brace member 70, 72 and each corresponding side panel 32, 34.

Figure 5:
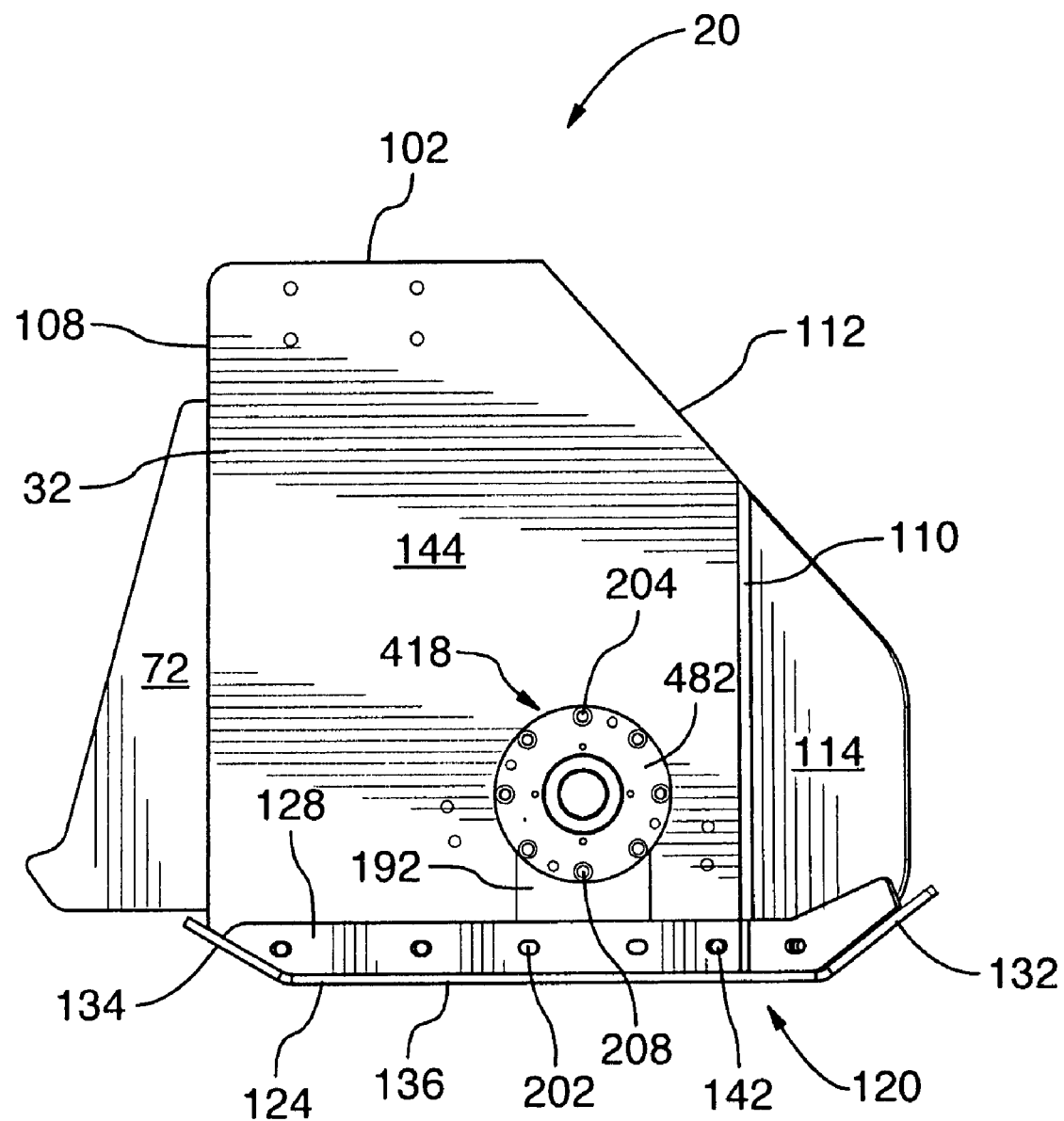
FIG. 5 is a left end elevation view of the brush cutter shown in FIG. 2.
Figure 6:
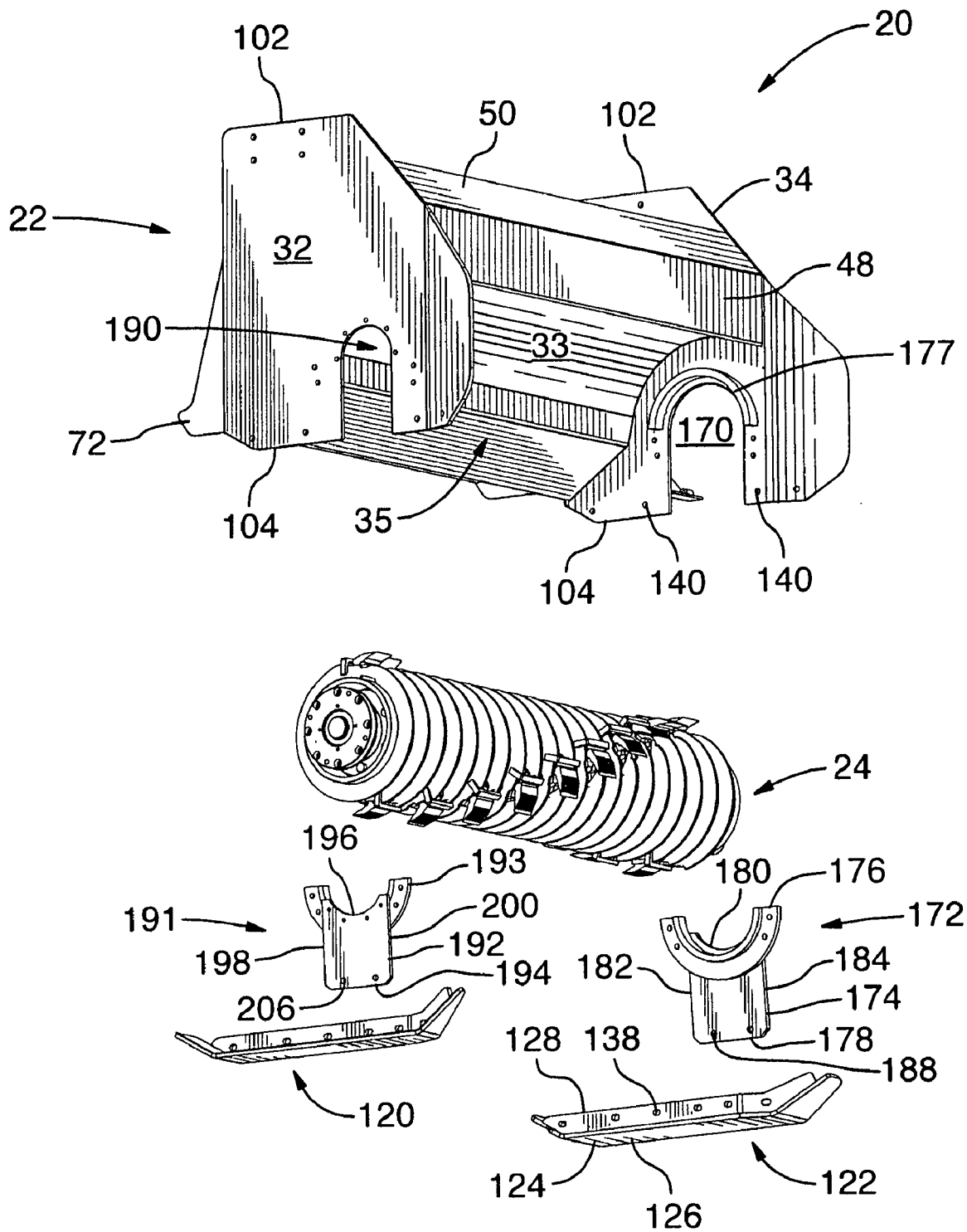
FIG. 6 is another right perspective view of the brush cutter of FIG. 1 showing the brush cutting head and the side panel runners and end members exploded.

Referring to FIGS. 4, 5 and 6, each side panel 32, 34 is a steel panel having a shape generally resembling that of rectangular but for its truncated top front corner 100. The margins of each side panel 32, 34 are defined by an upper horizontal edge 102, an opposed lower horizontal edge 104 and front and rear edges 106 and 108 that extend between the upper and lower horizontal edges 102 and 104. The rear edge 108 runs vertically from the upper horizontal edge 102 to the lower horizontal edge 104. The front edge 106 includes a vertically extending edge portion 110 running upwardly from the lower horizontal edge 104, and a rearwardly inclined or slanted edge portion 112 that joins the vertically extending edge portion 110 to the upper horizontal edge 102. A deflector plate 114, 116 is welded to the vertically extending edge portion 110 of each side panel 32, 34. As best shown in FIG. 3, the deflector plates 114 and 116 flare slightly from the plane of their respective side panels 32 and 34. Thus configured, the deflector plates 114 and 116 tend to encourage (i.e. funnel) the brush to be cut toward the brush cutting head 24 during operation of the brush cutter 20. In an alternative embodiment, the deflector plates 114, 116 could be integrally formed with the side panels 34, 36 and bent to achieve the desired configuration.

The upper horizontal edges 102 of the side panels 32 and 34 are carried above the upper panel portion 46. The portion of each side panel 32, 34 which protrudes above the upper panel portion 46 defines a tab 118 to which may be attached a protective member in the nature of bar (not shown) for protecting the housing 22 from being crushed or otherwise damaged by a falling tree during operation of the brush cutter 20.

Fastened to the lower horizontal edge 104 of each side panel 32, 34 is a ski-like runner 120, 122 that is provided to facilitate passage of the brush cutter over the terrain to be cleared. The runner 120, 122 includes a steel strip 124 whose bottom face 126 is adapted for contact with the ground and a bracket 128 welded to the top face 130 of the strip 124 for securing the runner 120, 122 to the side panel 32, 34. The strip 124 has front and rear upturned ends 132 and 134 and a flat portion 136 disposed intermediate the front and rear ends 132 and 134. The bracket 128 is similarly shaped to correspond to the profile of the strip 124. A plurality of apertures 138 formed in the bracket 128 are alignable with corresponding apertures 140 defined in each side panel 32, 34 adjacent the lower horizontal edge 104 thereof, to allow fasteners 142 to be received therethrough.

Figure 7:
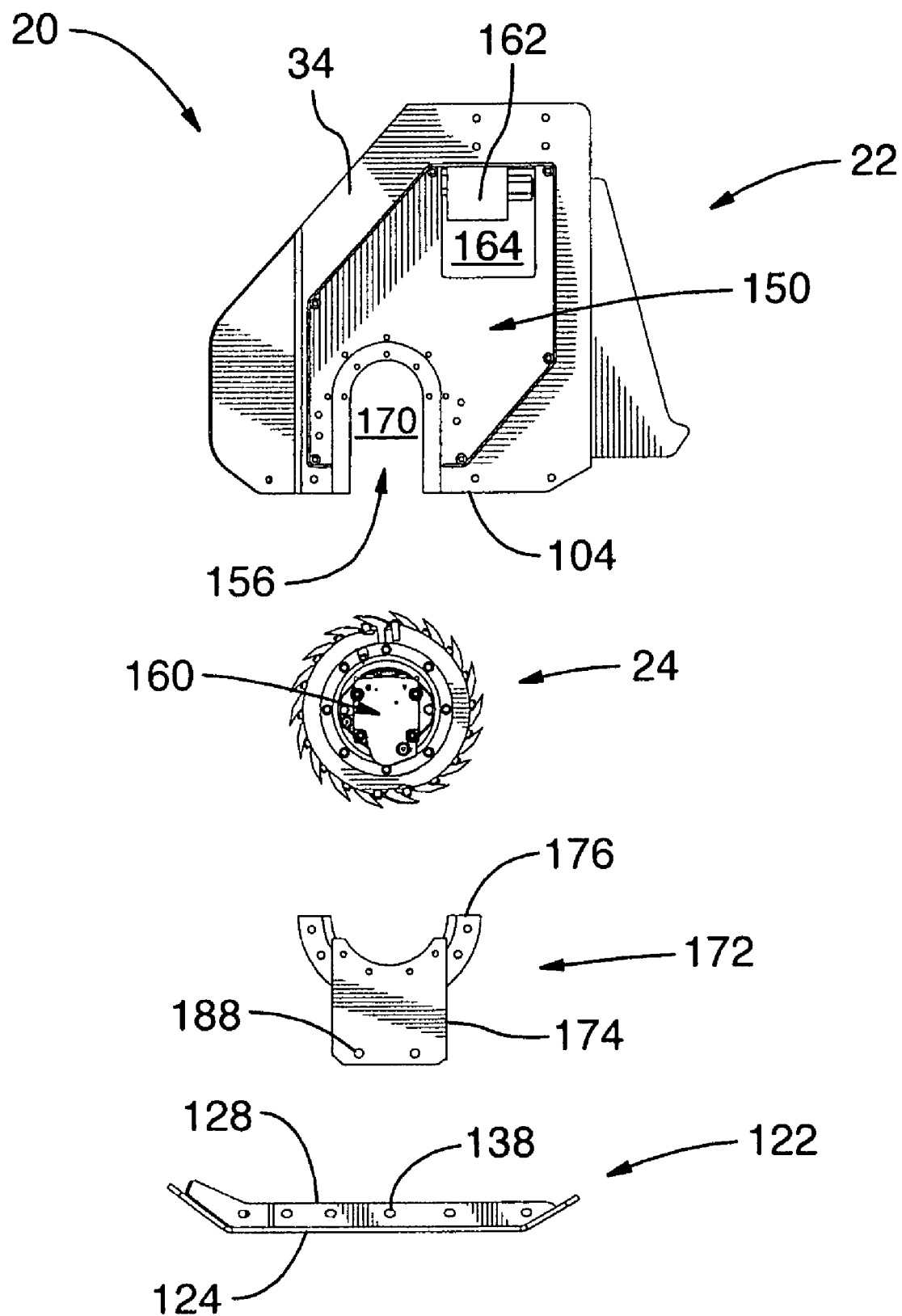
FIG. 7 is a right end elevation view of the brush cutter shown in FIG. 6.

Referring now to FIGS. 4, 6 and 7, the side panel 34 carries on its outer face 144 a protective enclosure 150 defined by a peripheral sidewall 152 standing proud of the side panel 34 and a removable cover plate 154. The peripheral sidewall 152 has a gap 156 formed therein along its lowermost margin to allow detachment of the brush cutting head 24 from the housing 22 during maintenance, repair or re-tooling of the brush cutter 20. The cover plate 154 may be attached to the peripheral sidewall 152 using fasteners (not shown). When secured to the peripheral sidewall 152, the cover plate 154 is adapted to close off the space defined by the peripheral sidewall 152 and the outer face 144 to prevent dirt, dust or debris from entering into the drive and bearing assembly 160 and the hydraulic fluid distribution system 162 (said system being accessible through a rectangular opening 164 formed in the side panel 34).

As best shown in FIGS. 6 and 7, the side panel 34 has defined therein a semi-circular, arch-shaped cutout 170 sized to allow a portion of the drive and bearing assembly 160 to be accommodated therein. Adjacent the curved edge defining the cutout 170, the side panel has a plurality of apertures 166.

Also provided, is an end member 172 designed to close off the arch-shaped cutout 170. The end member 172 includes a plate portion 174 that is configured to fit within the arch-shaped cutout 170 and an upturned semi-annular portion 176 attached to the back of the plate portion 174. The upturned semi-annular portion 176 is adapted for abutment with a downturned semi-annular portion 177 (best shown in FIG. 6) fastened to the inner face 44 of the side panel 34. When abutted, the semi-annular portion 176 and the downturned semi-annular portion 177 together define a protective end ring or collar which serves to block dust or debris from entering into the interior of the brush cutting head 24.

The plate portion 174 is defined by a lower horizontal edge 178, an opposed downwardly concaving edge 180 and a pair of spaced part vertical edges 182 and 184 extending between the edges 178 and 180. The upturned semi-annular portion 176 is welded to the plate portion 174 along the downwardly concaving edge 180. Adjacent the lower horizontal edge 180, a plurality of apertures 188 is provided which are alignable with the corresponding apertures 138 in the bracket 128 to allow the insertion of fasteners 189 therethrough to secure the plate portion 176 to the bracket 128.

In like fashion to side panel 34, side panel 32 also has a semi-circular, arch-shaped cutout 190 (albeit sized somewhat smaller than cutout 170). An end member 191 generally similar to end member 172 is also provided (see FIG. 6). It too includes a plate portion 192 that is designed to fit within the arch-shaped cutout 190 and an upturned semi-annular portion 193 attached to the back of the plate portion 192. The upturned semi-annular portion 193 is adapted to mate with a downturned semi-annular portion (not shown) fastened to the inner face 44 of the side panel 32.

The plate portion 192 is defined by a lower horizontal edge 194, an opposed downwardly concaving edge 196 and a pair of spaced part vertical edges 198 and 200 extending between the upper and lower edges 196 and 194. The upturned semi-annular portion 193 is welded to the plate portion 192 along the downwardly concaving edge 196. The plate portion 192 has a plurality of apertures 206 located near its lower horizontal edge 194 and alignable with corresponding apertures 138. The apertures 206 are sized to receive threaded fasteners 208. Contrary to the plate portion 174, the plate portion 192 is longer than it is wide.

Figure 8A:
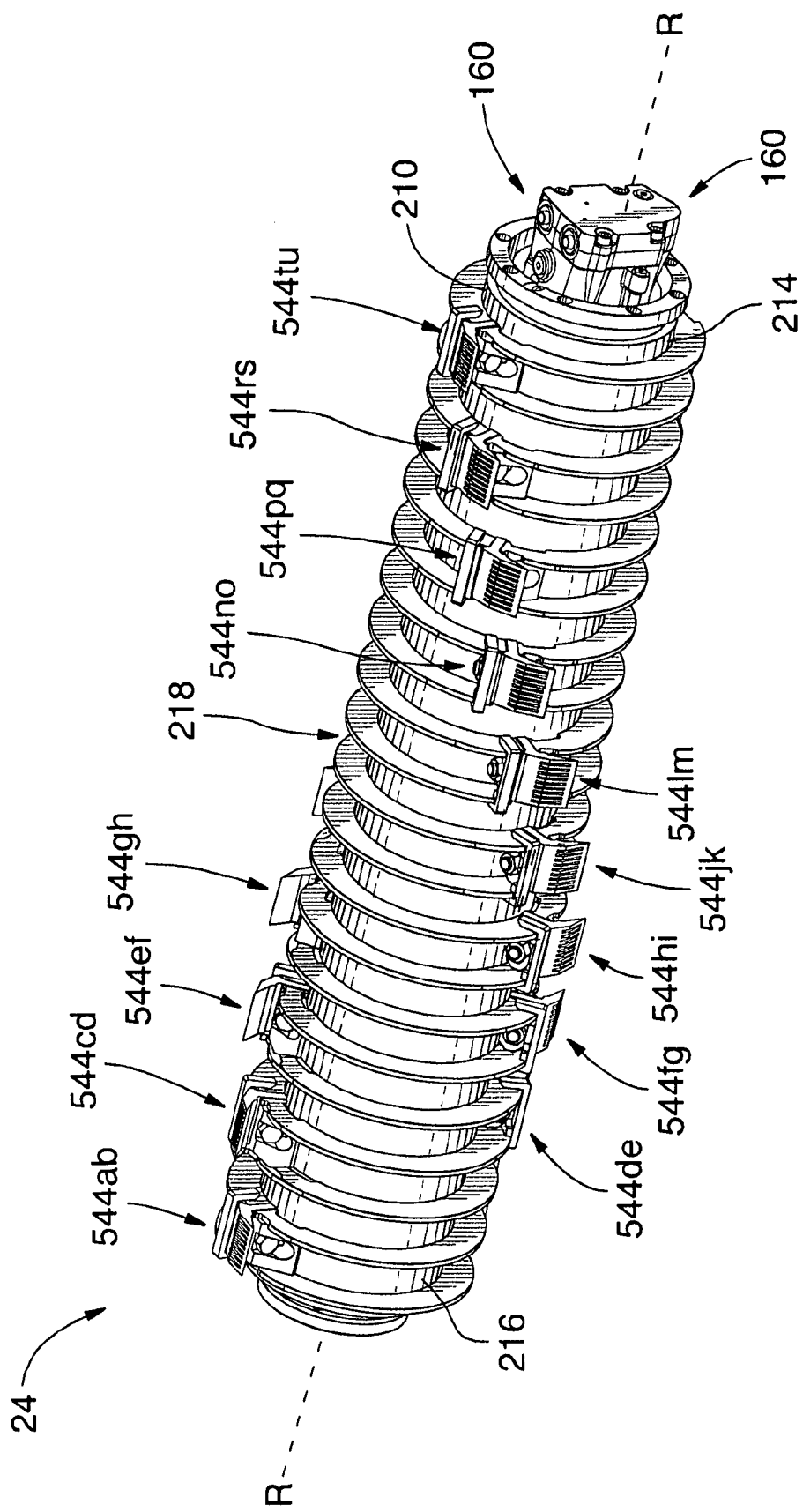
FIG. 8a is a front left perspective view of the brush cutting head shown in FIG. 1.
Figure 8B:
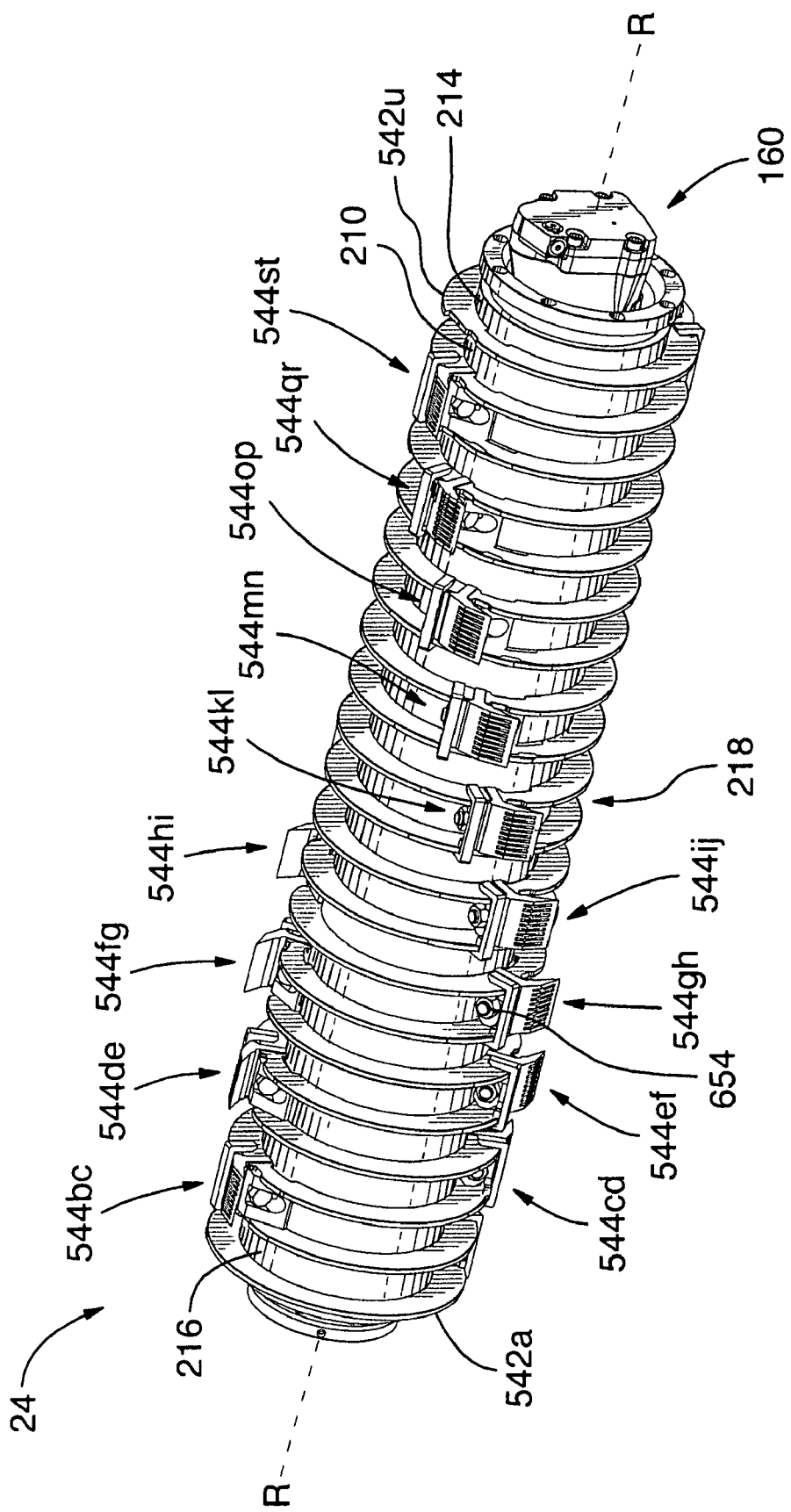
FIG. 8b is another perspective view similar to that shown in FIG. 8a showing the brush setting head rotated 180 degrees.
Figure 19:
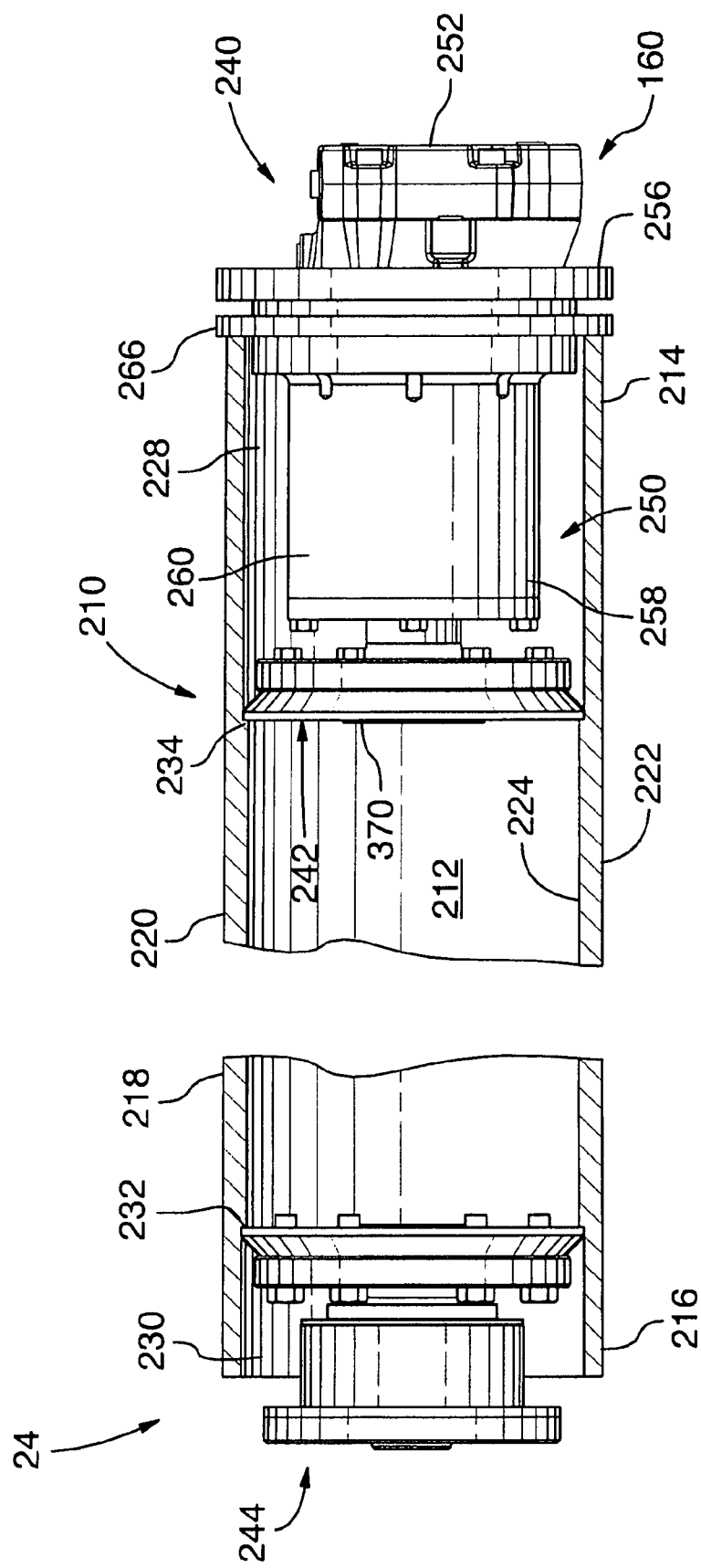
FIG. 19 is a front elevation view of the brush cutting head illustrated in FIG. 8a with the protective collars and cutting tooth assemblies omitted for the sake of clarity and a portion of the outer surface of the support body removed to reveal the drive and bearing assembly mounted within the hollow of the support body.

Referring now to FIGS. 8a, 8b and 19, there is shown the brush cutting head 24. The brush cutting head 24 includes a tubular support body 210 and the drive and bearing assembly 160 housed substantially within the hollow 212 defined in the support body 210. The support body 210 has a first end 214, an opposed second end 216 and an intermediate portion 218 extending between the first and second ends 214 and 216. In this embodiment, the support body 210 is cylindrical; its circular cross-section defined by a circumferential wall 220 having an outer surface 222 and an inner surface 224. Disposed along the outer surface 222 is a plurality of cutting tooth assemblies 546.

The thickness of the circumferential wall 226 is not constant throughout the length of the support body 210. More specifically, the circumferential wall 220 is thinner at the regions 228 and 230 of the support body 210 (which regions extend inwardly from the first and second ends 214 and 216 a short distance) than at the mid-length of the support body 210. In the regions 228 and 230 the hollow 212 has a greater cross-sectional area to accommodate the drive and bearing assembly 160. Defined by the increased thickness of the circumferential wall 220 beyond the regions 228 and 230, are circumferentially extending shoulders 232 and 234 upon which portions of the drive and bearing assembly 160 will abut.

The drive and bearing assembly 160 includes a drive block 240, a first coupling assembly 242 operatively connected to the drive block 240, and a second coupling assembly 244. The drive block 240 and the first bearing assembly 242 are adapted to fit within the hollow 212 in the region 228, while the second coupling assembly 244 is designed to fit in the hollow 212 in the region 230.

Figure 20:
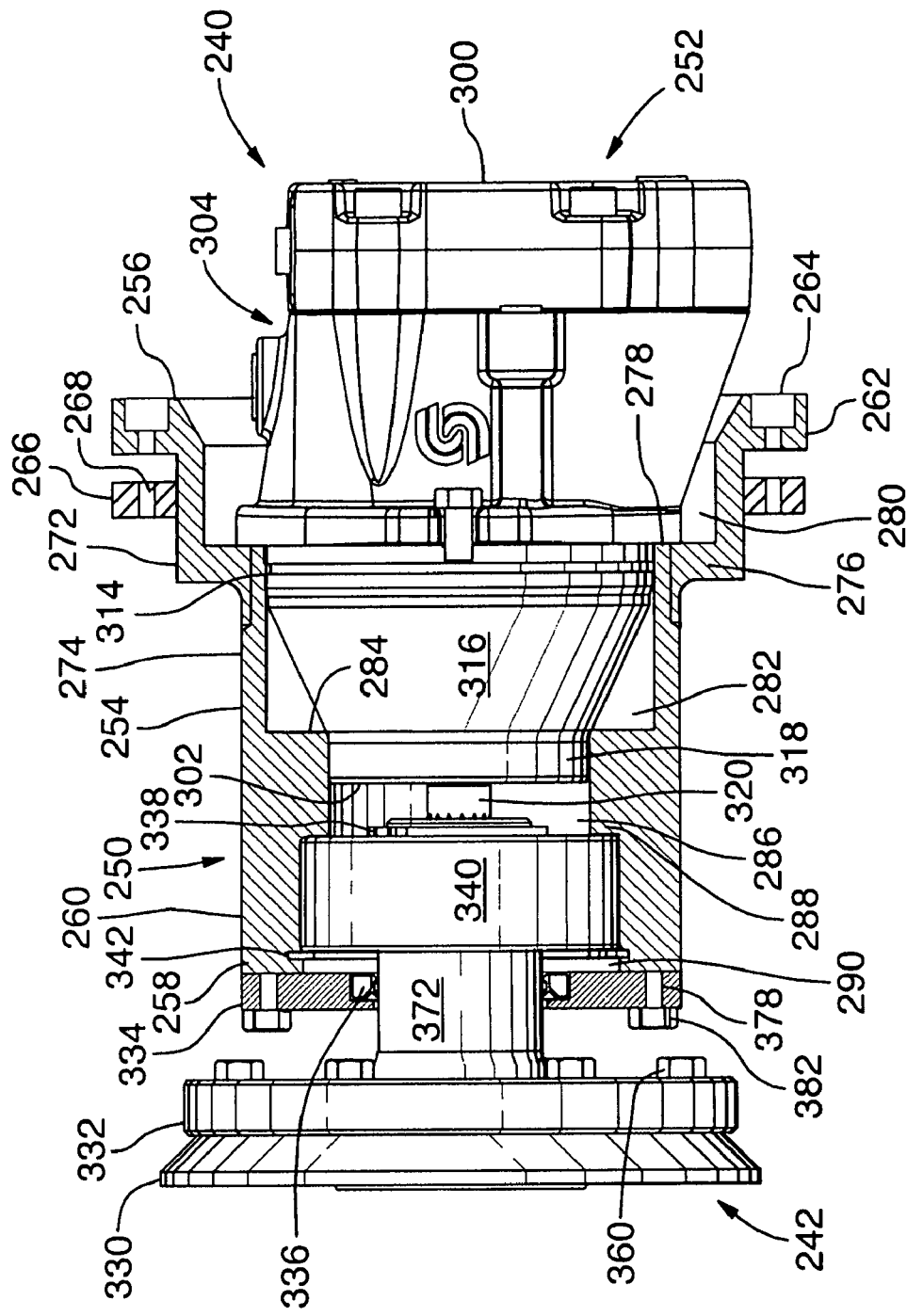
FIG. 20 is a side elevation view of a portion of the drive and bearing assembly illustrated in FIG. 19 showing a drive block and a first coupling assembly operatively connected to each other, a portion of the outer wall of the motor support member being removed to reveal details of the interior thereof.
Figure 21:
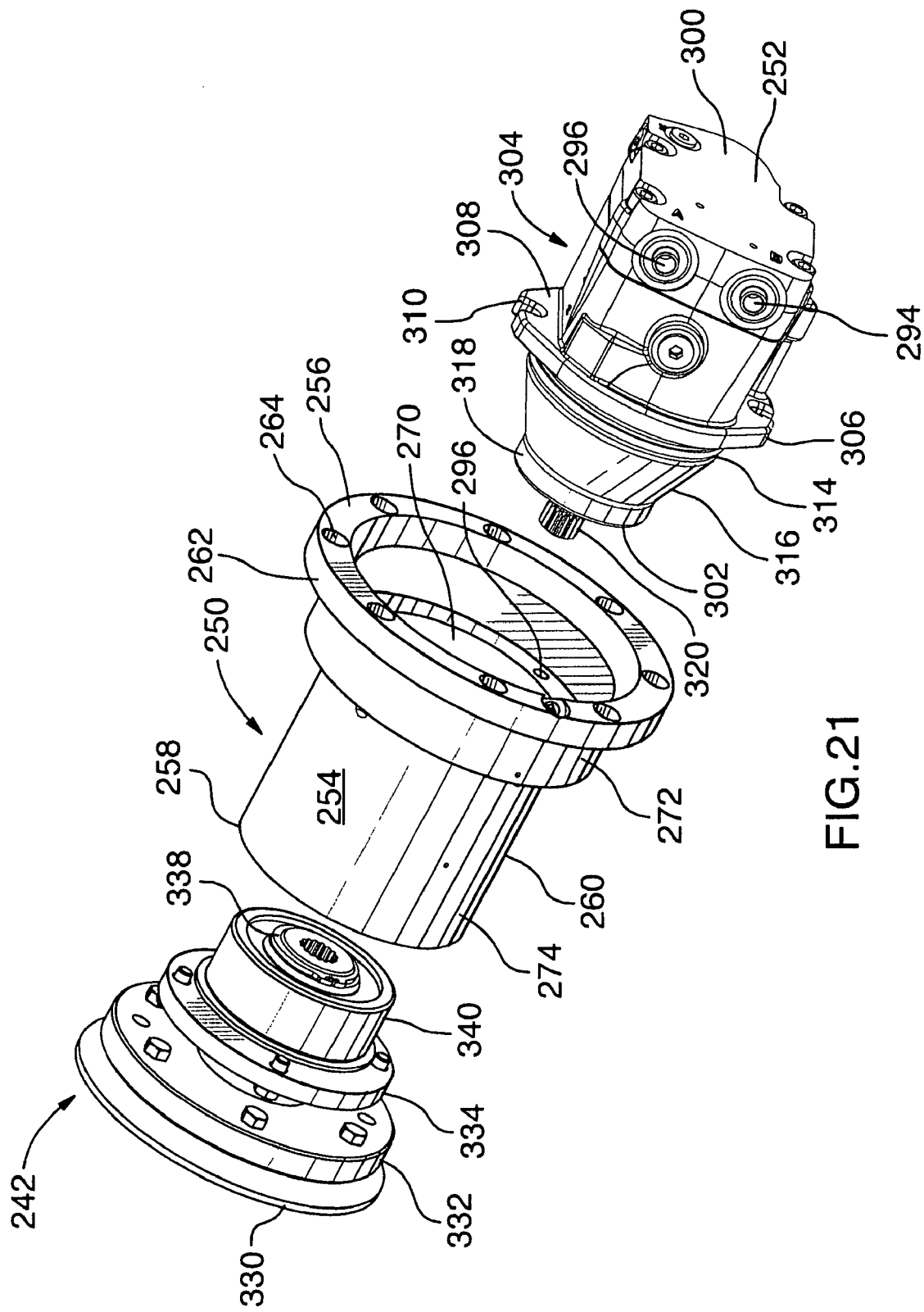
FIG. 21 is a perspective view of the drive block illustrated in FIG. 20 showing a motor, a motor support member and the first coupling assembly exploded.

Referring to FIGS. 20 and 21, the drive block 240 includes a hollow motor support member 250 and a hydraulic motor 252 adapted to fit at least partially within the motor support member 250. The motor support member 250 has a sleeve-like body 254 with a first end 256, an opposed second end 258 and a generally cylindrical sidewall 260 extending between the first and second ends 256 and 258. At the first end 256, the body 254 has a flange or outwardly projecting ring or collar 262 joined to the sidewall 260. The flange 262 is provided with a plurality of circumferentially spaced apertures 264. A mounting ring 266 with apertures 268 is also provided for placement between the side panel 34 and the flange 262 of the motor support member 250.

The sidewall 260 defines an interior hollow 270 within the body 254 and includes a first sidewall portion 272 extending from the first end 256 and a second sidewall portion 274 extending from the second end 258 to meet the first sidewall portion 272. As best shown in FIG. 20, the outer diameter of the body 254 defined by the first sidewall portion 272 is greater than the outer diameter of the body 254 defined by the second sidewall portion 274. A narrow band 276 extending radially inward from the first sidewall portion 272 joins the first sidewall portion 272 to the second sidewall portion 274. The narrow band 276 defines a first shoulder 278 having a plurality of apertures 296 drilled therein.

The hollow 270 includes a first region 280 extending between the flange 262 and the narrow band 276, a second region 282 spanning from the narrow band 276 to a second shoulder 284 defined by a radially inwardly extending portion of the second sidewall portion 274, a third region 286 extending from the second shoulder 284 to a third shoulder 288 formed by a radially outwardly extending portion of the second sidewall portion 274, and a fourth region 290 extending from the third shoulder 288 to the second end 258 of the body 254. Each region 280, 282, 286 and 290 is open at either end to provide access to the next adjacent region.

The hydraulic motor 252 has a first end 300, a second end 302 and a housing body 304 that extends between the first and second ends 300 and 302. Defined in face 292 of the housing body 304 are inlet and outlet ports 294 and 296. The ports 294 and 296 are connectable to the hydraulic fluid distribution system 162 for fluid communication therewith via flexible supply lines or hoses (not shown).

At a location intermediate the first and second ends 300 and 302, the housing body 304 has first and second opposed tabs 306 and 308 provided for abutting the first shoulder 278. Each tab 306 and 308 is provided with an aperture 310 that is sized to receive a threaded fastener 312. The apertures 310 of the tabs 306 and 308 are alignable with the apertures 296 defined in the first shoulder 278 to allow fixation of the motor 252 to the motor support member 250. While it this embodiment, the motor housing body is provided with a pair of fastening tabs, it will be appreciated that this need not be the case in every application. In alternative embodiments, the housing body may be constructed with more than two fastening tabs (i.e. three or four). Alternatively, a single fastening tab may be used. Other modifications to the means of attachment are also possible.

Additionally, while it is preferred for ease of servicing, maintenance and repair to have the motor support member 250 and the motor housing body 304 fabricated as two separate parts releaseably attachable to each other, this need not be the case in every application. In an alternative embodiment, the motor support member 250 may be combined with the motor housing body 304 to form a single part.

While it is preferred that the motor 252 be hydraulically powered, it will be appreciated that this need not be the case in every application. In other embodiments, other motors may be used to similar advantage, for instance, pneumatically-powered motors or gas-powered motors.

Beyond the tabs 306 and 308 (moving in the direction of the second end 302), the motor housing body 304 has a first, relatively narrow, circumferential band 314 of constant diameter joined to a tapering, funnel-shaped portion 316. The narrow band 314 is configured to fit snugly in the third hollow region 286 and to bear against the second sidewall portion 274. More specifically, it is adapted to receive in surrounding relation an O-ring (not shown) that serves to form a seal for preventing lubricant or grease from the first coupling assembly from entering into the second hollow region 282.

The housing body 304 terminates with a second, relatively narrow, circumferential band 318 joined to the funnel-shaped portion 316. When the motor 252 is attached to the motor support member 250, the second narrow band 318 fits snugly into the third hollow region 286 and abuts the second sidewall portion 274. Extending outwardly from the second end 304 of the hydraulic motor 252 is a splined driveshaft 320 for connecting to the first coupling assembly 242.

Figure 22:
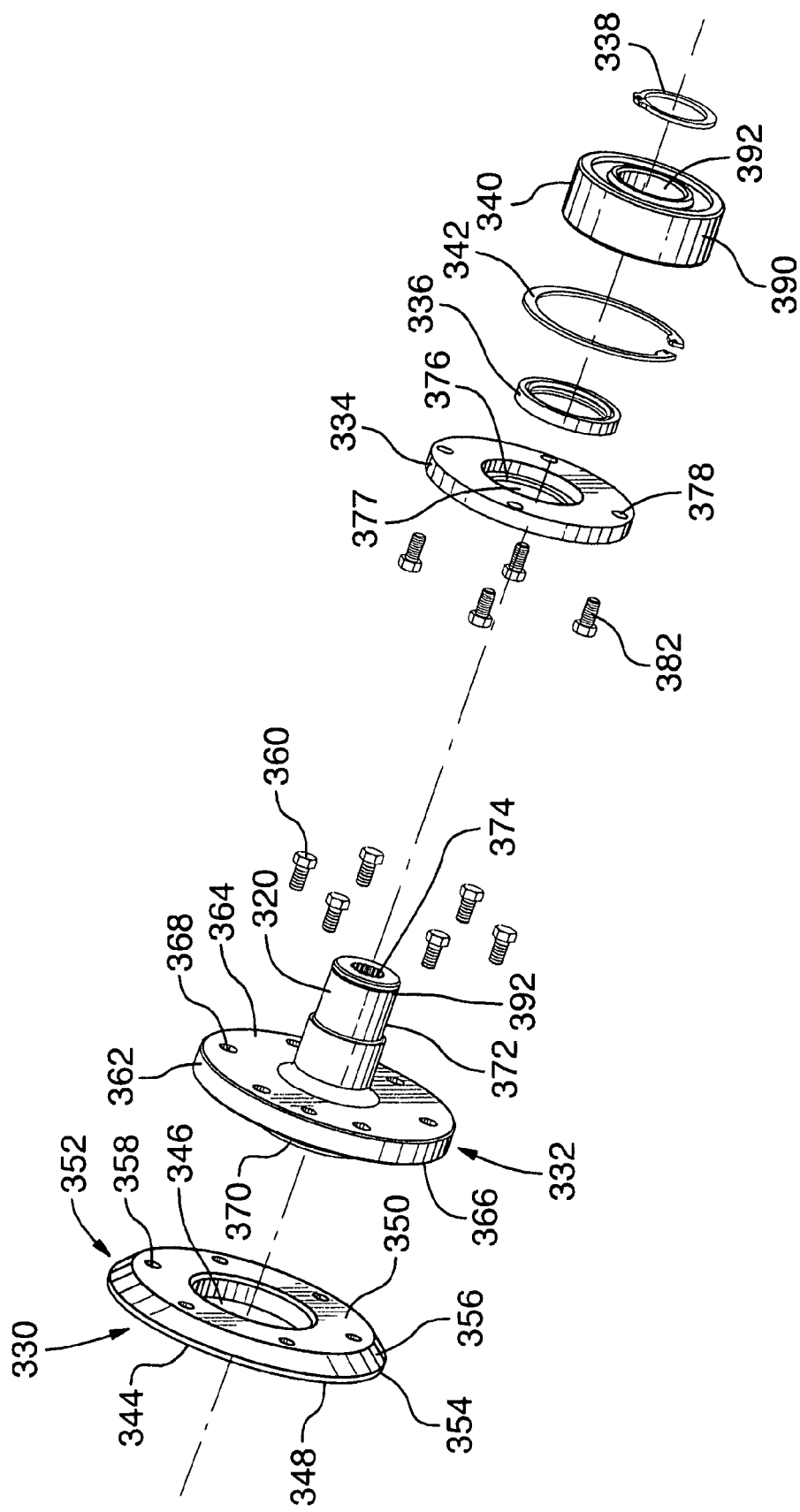
FIG. 22 is an exploded perspective view of the first coupling assembly shown in FIG. 21.

Referring now to FIGS. 20 to 22, the first coupling assembly 242 includes a mounting plate 330 for fixing to the support body 210, a coupling member 332 for mating to the driveshaft 320, a flat annular plate 334 attachable to the motor support member 250, an annular sealing gasket 336, a first retaining ring 338, a bearing assembly 340 and a second retaining ring 342.

The mounting plate 330 has an annular body 344 with a central aperture 346, a first face 348 and a second opposed face 350. Joining the first face 348 to the second face 350 is a sidewall 352 formed by a narrow circumferential band 354 and a tapering sidewall portion 356. When mounting the plate 330 to the support body 210, the first face 348 is urged to abut the circumferential shoulder 232 of the support body 210. The narrow band 354 is brought to bear against the inner surface 224 of the support body 210 and the mounting plate 330 is welded to the support body 210 about its tapering sidewall portion 356. Defined in the mounting plate 330 is a plurality of bores 358 sized to accommodate fasteners in the nature of threaded fasteners 360.

The coupling member 332 includes a disc-shaped portion 362 having a first face 364, a second face 366 and a plurality of circumferentially spaced bores 368 defined therein extending between the first and second faces 364 and 366. Standing proud of the first face 364 is a puck-like projection 370 that is sized for clearance fit with the central aperture 346 formed in the mounting plate 330. During fabrication, the first face 364 of the coupling member 332 is brought to bear against the second face 350 of the mounting plate 330 with the puck-like projection 370 locating in the central aperture 346. Thereafter, the coupling member 332 is fastened to the mounting plate 330 by inserting the threaded fasteners 360 into the aligned the bores 358 and 268 and tightening them. Thus attached, the coupling member 332 and mounting plate 330 are fixed to each other for rotation. The coupling member 332 further includes a cylindrical hub portion 372 that extends outwardly from the second face 366. The hub portion 372 has a blind bore 374 defined at its free or terminal end 392 that is adapted for slip fit mating with the splined drive shaft 320.

While in this embodiment, the locating or alignment means provided on the coupling member 332 take the form of a centrally disposed puck-like projection 370, it will be appreciated that in other embodiments alternative alignment means may be used. In still other embodiments, such alignment means may be omitted altogether. Additionally, while it is preferred for ease of servicing, maintenance and repair to have the mounting plate 330 and the coupling member 332 fabricated as two separate parts detachably mountable to each other, this need not be the case in every application. In another embodiment, the mounting plate may be combined with the coupling member to form a single part.

The annular plate 334 has an inwardly projecting flange 376 that radially bounds the central aperture 377 formed in the plate 334 and defines a seat for the sealing gasket 336. When the first coupling assembly 242 is assembled, the annular plate 334 surrounds the cylindrical hub portion 372 and the gasket 336 tends to form a seal between the annular plate 334 and the cylindrical hub portion 372 to prevent dust or debris from fouling the lubricant that coats the bearings (not shown) of the bearing assembly 340. While it is generally preferred that gasket 336 be used, in alternative embodiments, the gasket may be omitted.

The annular plate 334 has a plurality of bores 378 which are alignable with longitudinal blind bores (not shown) drilled into the sidewall 260 at the second end 258 of the body 254. During fabrication, threaded fasteners 382 are inserted through bores 378 and the blind bores and tightened to attach the annular plate 334 to the motor support member 250.

The bearing assembly 340 includes a generally annular body 390 having a central aperture 392 defined therethrough. As best shown in FIG. 20, the annular body 390 is sized to fit snugly in the fourth hollow region 290 defined within the motor support member 250. The annular body 390 is securely retained at one end by the first retaining ring 338 mounted in surrounding relation with the terminal end 392 of the hub portion 372 and at the opposite end by the second retaining ring 342 which engages the inner surface of the second sidewall portion 274 of body 254. While in this embodiment, the bearing assembly 340 is releasably mounted to the motor support member 250, this need not be the case in every application. In other embodiments, the bearing assembly may be integrated into the motor support member.

Housed within the annular body 390 is a plurality of bearings (not shown) disposed circumferentially about the central aperture 392. When the drive block 240 is assembled to the first coupling assembly 242, the bearing assembly 340 surrounds the cylindrical hub portion 372. In this embodiment, the bearings in the bearing assembly 340 are roller bearings. In alternative embodiments, other types of bearing could also be employed.

Figure 23:
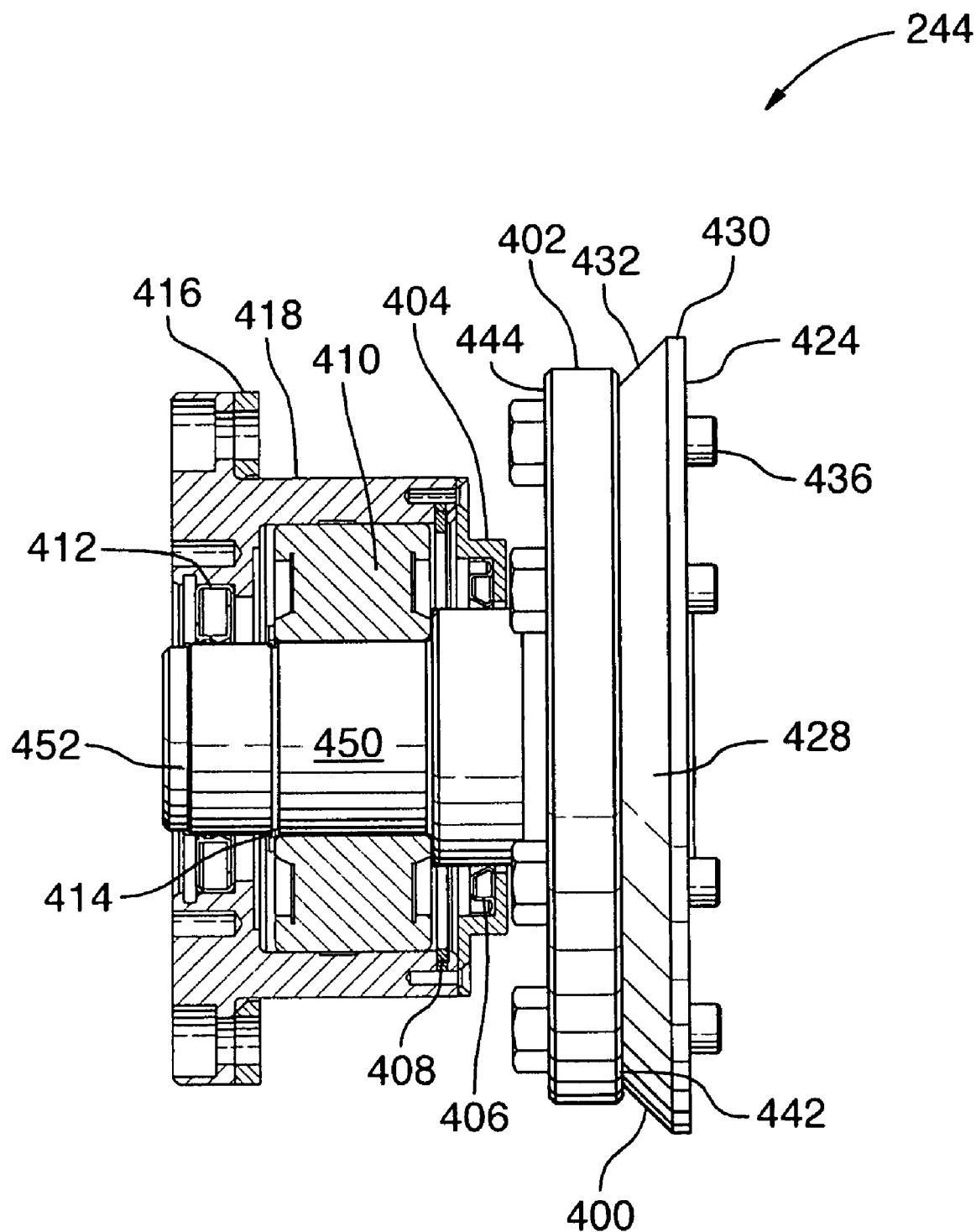
FIG. 23 is an elevation view of the second coupling assembly shown in FIG. 20 with a portion of the sidewall of the bearing mounting support removed to reveal the bearing assembly mounted within the hollow of the bearing support member.
Figure 24:
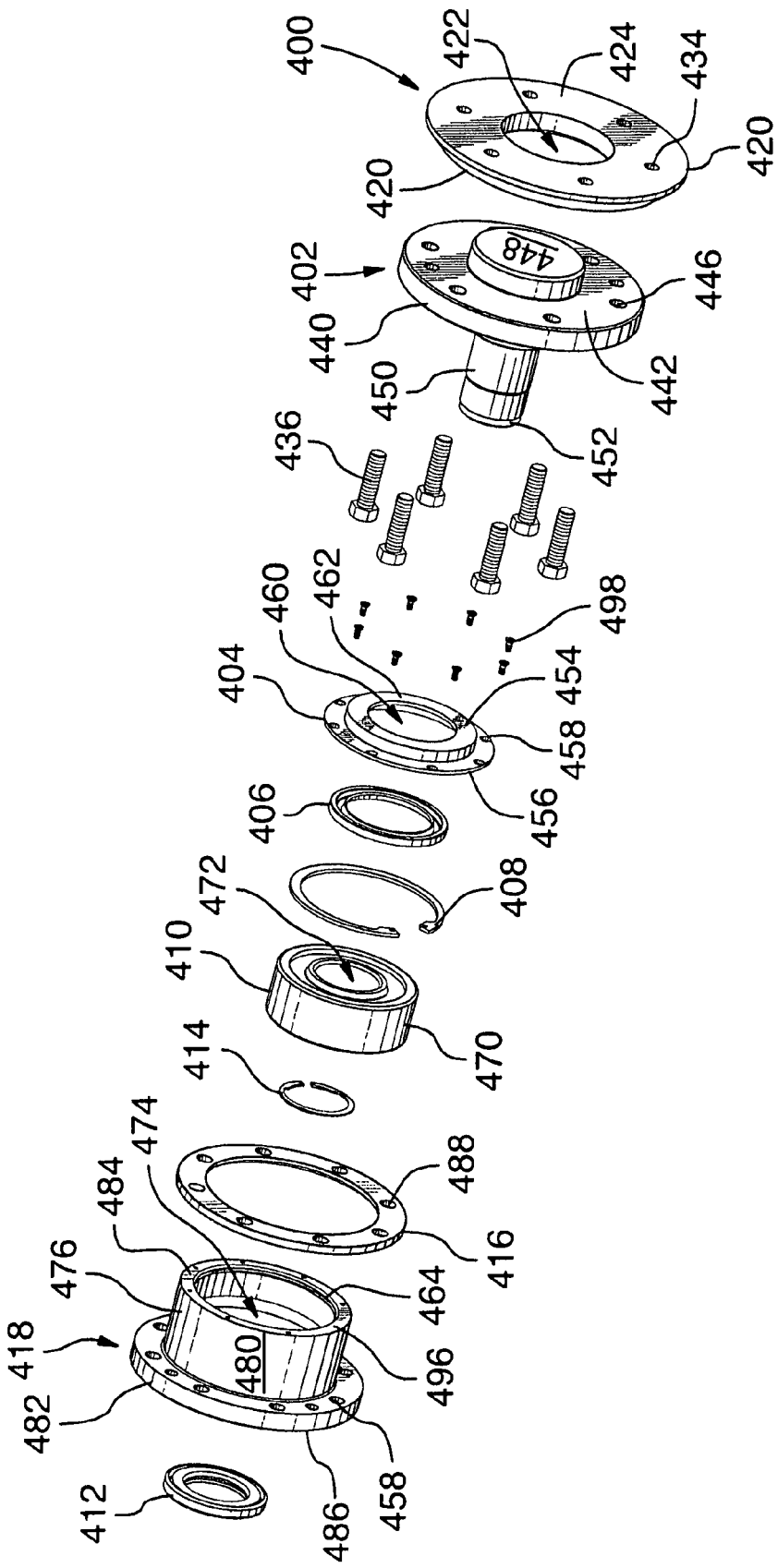
FIG. 24 is an exploded perspective view of the second coupling assembly shown in FIG. 23.
Figure 25:
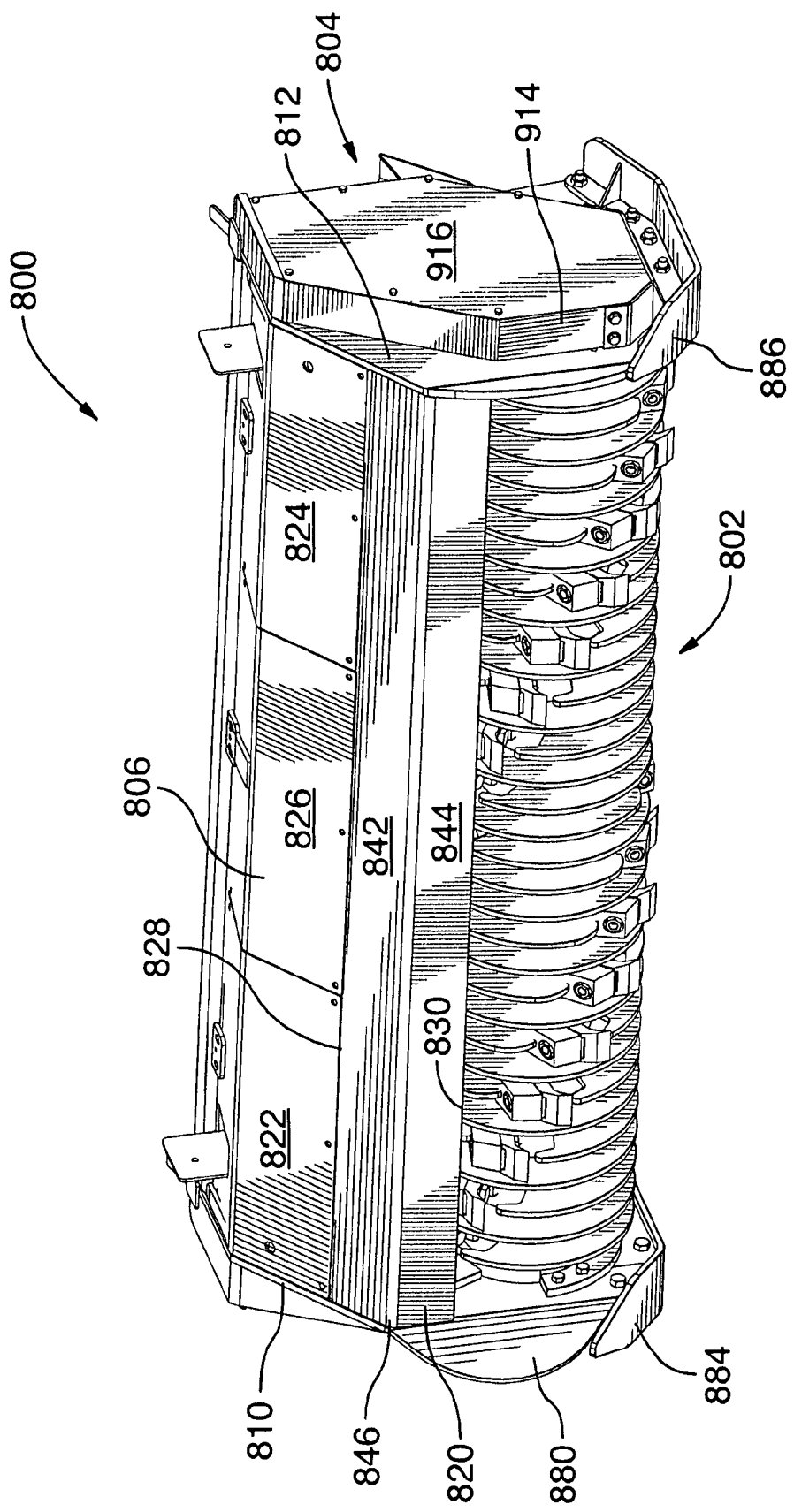
FIG. 25 is a front left perspective view of a brush cutter according to a second embodiment of the present invention.

Referring now to FIGS. 23 and 24, there is shown the second coupling assembly 244 which includes a mounting plate 400 for fixing to the support body 210, a coupling member 402, a flanged annular member 404, a first annular sealing gasket 406, a first retaining ring 408, a bearing assembly 410, a second retaining ring 414, a mounting ring 416, a bearing support member 418 and a second annular sealing gasket 412.

The mounting plate 400 is generally similar to the mounting plate 330 in that has an annular body 420 with a central aperture 422, a first face 424 and a second opposed face 426. The first face 424 is joined to the second face 426 by a sidewall 428 formed by a narrow circumferential band 430 and a tapering sidewall portion 432. When mounting the plate 400 to the support body 210, the peripheral edge of the first face 424 is urged to abut the circumferential shoulder 234 of the support body 210. The narrow band 430 is brought to bear against the inner surface 224 of the support body 210 and the mounting plate 400 is welded to the support body 210 about its tapering sidewall portion 432. Defined in the mounting plate 400 is a plurality of bores 434 sized to accommodate fasteners in the nature of threaded fasteners 436.

The coupling member 402 generally resembles the coupling member 332. It includes a disc-shaped portion 440 having a first face 442, a second face 444 and a plurality of circumferentially spaced bores 446 defined therein extending between the first and second faces 442 and 444. Standing proud of the first face 442 is a puck-like projection 448 that is sized for clearance fit with the central aperture 422 formed in the mounting plate 400. During fabrication, the first face 442 of the coupling member 402 is brought to bear against the second face 426 of the mounting plate 400 with the puck-like projection 448 locating in the central aperture 422. Thereafter, the coupling member 402 is fastened to the mounting plate 400 by inserting the fasteners 436 into the aligned the bores 436 and 446' and tightening them. The coupling member 402 further includes a cylindrical portion 450 generally similar in shape and size to the cylindrical hub portion 372, except that the cylindrical portion 450 has no blind bore defined therein at its terminal end 452.

The flanged annular member 404 is defined at least partially by a sidewall 454. A first circumferential lip or flange 456 extends outwardly from the edge of the sidewall 454. The first flange 456 has defined therein a plurality of circumferentially spaced apertures 458. Radially bounding the central aperture 460 formed in the flanged member 404 is a second, inwardly projecting flange 462. The second flange 462 forms a seat for the first sealing gasket 406. When the second coupling assembly 244 is assembled, the flanged annular member 404 surrounds the cylindrical portion 450 and the first gasket 406 tends to form a seal between the flanged annular member 404 and the cylindrical portion 450 to prevent dust or debris from fouling the lubricant that coats the bearings (not shown) of the bearing assembly 410. The second gasket 412 disposed at the opposite end of the bearing assembly 410 and mounted between the bearing assembly 410 and an inwardly extending flange 464 of the bearing support member 418 serves a similar sealing function. Again, while it is generally preferred that gaskets 406 and 412 be employed, in alternative embodiments these gaskets may be omitted.

In like fashion to the bearing assembly 340, the bearing assembly 410 includes a generally annular body 470 having a central aperture 472 defined therethrough. Within the hollow 474 of the bearing support member 418, the annular body 470 is securely retained at one end by the second retaining ring 414 mounted in surrounding relation with the terminal end 452 of the cylindrical portion 450 and at the opposite end by the first retaining ring 408 which engages the inner surface of the sidewall 476 of the bearing support assembly 418. While it is generally preferred that the bearing assembly 410 be releasably mounted to the bearing support member 418, in alternative embodiments, the bearing assembly may be integrated into the motor support member.

Housed within the annular body 470 is a plurality of bearings (not shown) disposed circumferentially about the central aperture 472. When the second coupling assembly 244 is assembled, the bearing assembly 410 surrounds the cylindrical portion 450 and allows free rotation of the coupling member 402 relative to the bearing support member 418. As with the bearing assembly 340, the bearing assembly 470 uses roller bearings.

The bearing support member 418 has a generally tubular body 480 having a first end 482, a second end 484 and sidewall 476 extending between the first and second ends 482 and 484. Extending outwardly from the edge of the sidewall 476 at the first end 482 is a first circumferential lip or flange 486.

The first flange 486 has defined therein a plurality of circumferentially spaced apertures 458 which are alignable with apertures 488 defined in the mounting ring 416 and apertures 490 formed in the housing side panel 32. At its first end 482, the tubular body 480 also has a second, inwardly projecting flange 492 that radially bounds the hollow 474 in the tubular body 480. When the second coupling assembly 244 is assembled, the second gasket 412 sits on the cylindrical portion 450 and abuts the inner face of the second flange 492. A plurality of longitudinal bores 496 drilled into the sidewall 476 at the second end 484 are alignable with the apertures 458 defined in the first flange 456 of the flanged annular member 404. During fabrication, threaded fasteners 498 are inserted through bores 484 and 458 and tightened to attach the bearing support member 418 to the flanged annular member 404.

Referring now to FIGS. 6 and 7, the mounting of the brush cutting head 24 to the housing 22 of the brush cutter 20 is now described in greater detail. As a preliminary step, the brush cutter 20 is operatively connected to the front of a vehicle (not shown) and the brush cutting head 24 is placed on the ground or other support surface which may be raised above the ground. Care is taken to ensure that the runners 120 and 122 and the end plates 172 and 192 are detached from the side panels 32 and 34 and that the cutouts 170 and 190 are free from obstructions. The cover plate 154 is also removed from the protective enclosure 150.

Using the lifting means (not shown) provided on the vehicle (for instance, mechanical lifting arms) the housing 22 is hoisted above the brush cutting head 24 and positioned such that the arch-shaped cutouts 170 and 190 defined in the side panels 34 and 32 are aligned with the first and second ends 214 and 216 of the support body 210. Thereafter, the housing 22 is lowered onto the brush cutting head 24 with the motor support member 250 received within the arch-shaped cutout 170 and the bearing support member 418 accommodated within the arch-shaped cutout 190.

Once the brush cutting head 24 is properly positioned within the well 35 of the housing 22, the brush cutting head 24 is attached at each end to the side panels 32 and 34. The flange 262 of the motor support member body 254 and the mounting ring 266 are fastened to the outer face 144 of the side panel 34 by inserting threaded fasteners 500 through the aligned apertures 264 (defined in the flange 262), apertures 268 (defined in the mounting ring 266) and apertures 166 (defined in the side panel 34), and tightening the fasteners 500.

The end member 172 is then attached to the side panel 34. More specifically, the plate portion 174 is fitted into the arch-shaped cutout 170 and secured in place with the threaded fasteners 187 extending through the aligned apertures 268 (defined in the mounting ring 266) and the apertures 186 (defined in the plate portion 174). The upturned semi-annular portion 176 is in turn fastened to the inner face 44 of the side panel 34.

With the end member 172 secured in place, the runner 122 is next installed. If required, the housing 22 is raised off the ground to create sufficient clearance between the lower horizontal edge 104 of the side panel 34 and the ground to permit installation of the runner 122. To fix the runner 122 to the side panel 34, fasteners 142 are inserted through the aligned apertures 138 (defined in the bracket 128) and the apertures 140 (defined in the side panel 34) and tightened. In like fashion, the end plate 172 is tied to the runner 122 by fasteners 142 extending through the aligned apertures 138 and the apertures 186 (defined in the end plate 172).

To attach the opposite end of the brush cutting head 24 to the housing 22, the bearing support member 418 and the mounting member 416 are secured to the outer face 144 of the side panel 32. Threaded fasteners 502 are inserted into aligned apertures 458 (defined in the first flange 456 of the bearing support member 418), apertures 488 (defined in the mounting ring 416) and apertures 490 (defined in the side panel 32) and the fasteners 502 are then tightened.

The end member 191 is then attached to the side panel 32 in a manner similar to that used to attach the end member 172 to the side panel 34. The plate portion 192 is fitted into the arch-shaped cutout 190 and secured in place with threaded fasteners 204 extending through the aligned apertures 488 and the apertures 202 (defined in the plate portion 192). The upturned semi-annular portion (not shown) is fastened to the inner face 44 of the side panel 32.

Thereafter, the runner 120 is attached to the side panel 32 and the end member 191. To fix the runner 120 to the side panel 32, fasteners 142 are inserted through the aligned apertures 138 (defined in the bracket 128) and the apertures 140 (defined in the side panel 32) and tightened. In like fashion, the runner 120 is tied to the plate portion 192 by fasteners 208 extending through the aligned apertures 138 and the apertures 206 (defined in the plate portion 192).

With the mounting of the brush cutting head 24 onto the housing 22 completed, the hydraulic fluid distribution system 162 is operatively connected to the hydraulic motor 252 via fluid supply lines tied to the inlet and outlet ports 294 and 296 and the brush cutter 20 is now operation ready. To actuate the brush cutting head 24, the hydraulic motor 250 is energized thereby causing the driveshaft 320 to rotate. By virtue of the mating connection between the driveshaft 320 and the cylindrical hub portion 372, the torque generated by the driveshaft 320 is transmitted to the support body 210 via the coupling member 332, the mounting plate 330 and the circumferential shoulders 232 and 234 formed in the support body 210. As a result, the support body 210 is urged to rotate about the longitudinal axis R-R. During rotation of the support body 210, neither the motor support member 250 nor the bearing support member 418 is subjected to torque.

From the foregoing, it will be appreciated that the brush cutting head 24 may be operatively connected to, or detached from, the brush cutter 20 relatively, quickly and easily to thereby allow the brush cutter 20 to be rapidly adapted to suit the field conditions of the site to be cleared. In a relatively short period of time, the brush cutter could be outfitted with a brush cutting head carrying teeth specifically designed for the terrain. For instance, where the site to be cleared is rocky, a brush cutting head carrying thin-edged cutting teeth could be replaced with a brush cutting head having hammer-type teeth which tend to better resist frequent impacts with rocks.

By housing the drive and bearing assembly 160 substantially within the hollow 212 defined in the support body 210, the brush cutter 20 tends to avoid many of the shortcomings associated with prior art brush cutters. In contrast to those prior art devices which require the drive assembly (i.e. the motor and drive belt arrangement) to be decoupled from the support body before the brush cutting head can be disconnected from the brush cutter (which operation often took three to four hours to perform), the brush cutting head 24 can be detached from the brush cutter 20 (i.e. housing 22) without having to disconnect the drive block 240 or motor 252 from the support body 210. In the brush cutter 20, this operation can be carried out in well under one hour.

Moreover, the brushing cutting head designed in accordance with the principles of the present invention allows re-tooling, repair and maintenance activities to be carried out on the brush cutter in a cost-effective and time-efficient manner. The drive block 240 and the first and second bearing subassemblies 242 and 244 tend to be easily accessible. In the event the hydraulic motor 252 is in need of servicing, it may be removed simply by unfastening fasteners 312 and decoupling from the cylindrical hub portion 372. A replacement motor can be installed quickly with minimal impact on operations. By minimizing the time during which the brush cutter is out-of service, productivity may be improved and cost savings may be realized.

Figure 9:
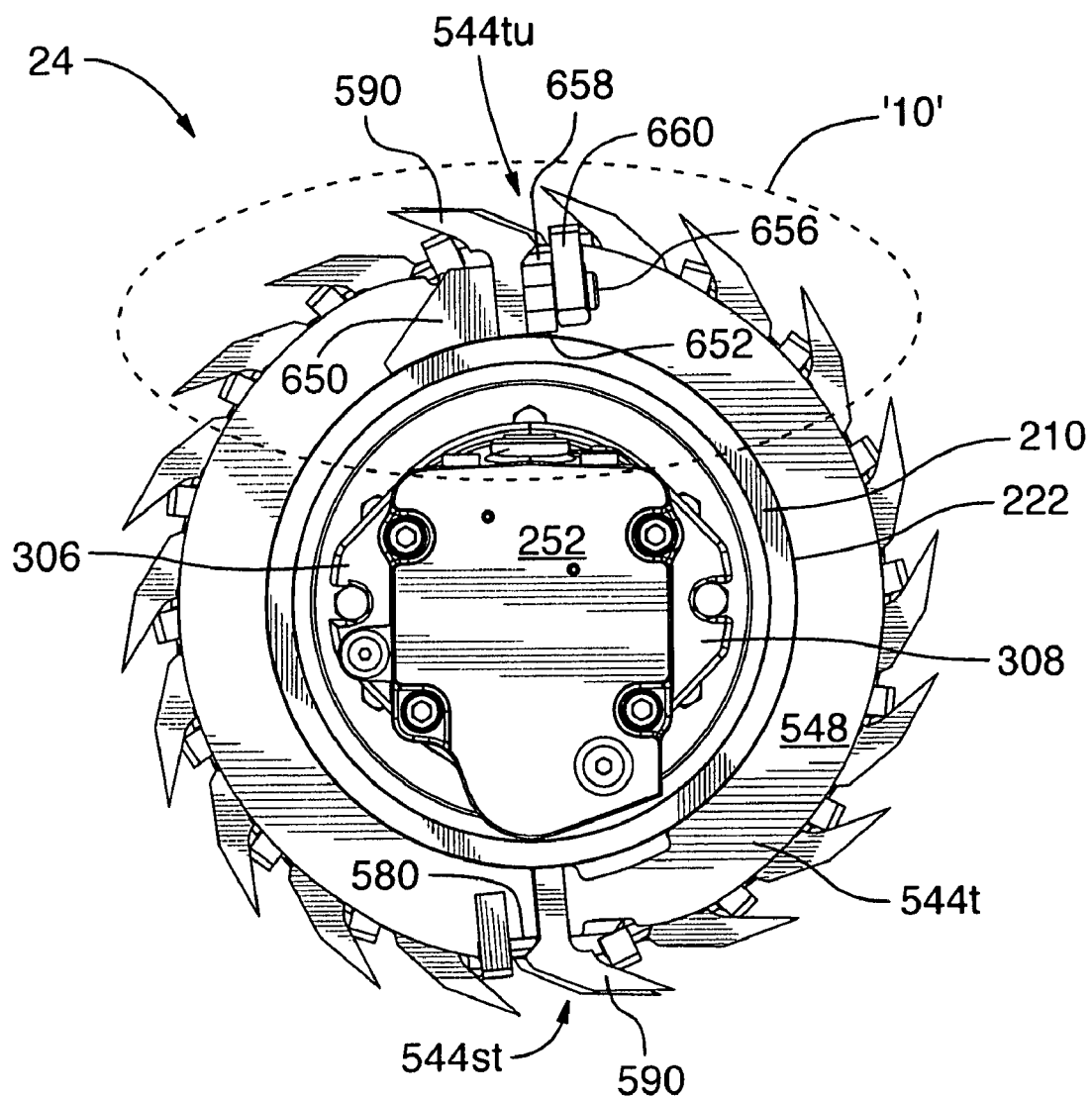
FIG. 9 is an end view of the brush cutting head shown in FIG. 8a with a collar removed therefrom for the sake of clarity.
Figure 10:
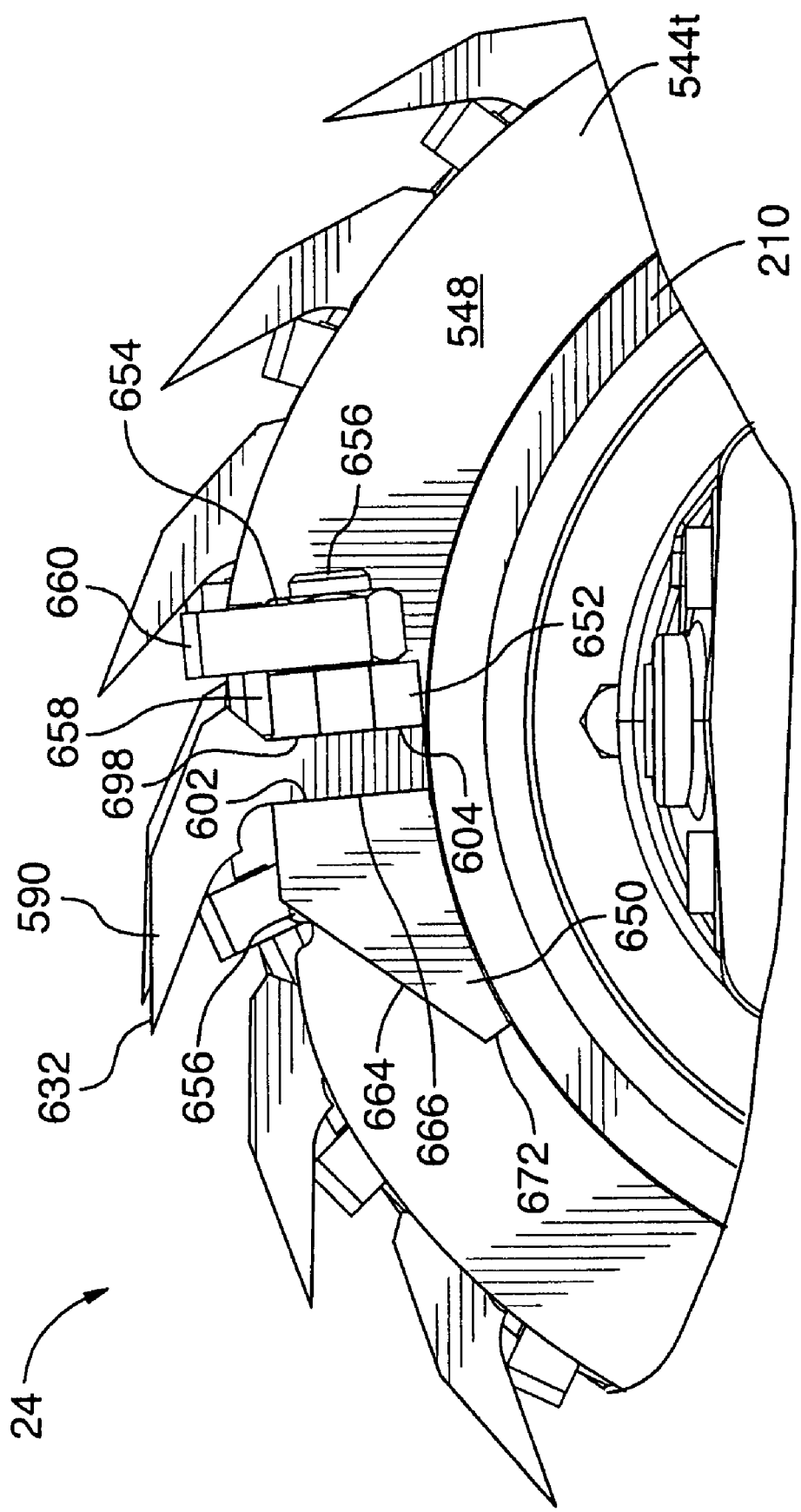
FIG. 10 is an enlarged view similar to that illustrated in FIG. 9 showing the encircled portion '10'.

Referring now to FIGS. 8a, 8b and 9, a plurality of protective collars designated with reference numerals 542a through to 542u (collectively, "collars 542") are concentrically mounted to the support body 210 at spaced intervals along the intermediate portion 538. As will be explained in greater detail below, pairs of adjacent collars 542 cooperate with each other to define mounting sites or stations 544 for each receiving a cutting tooth assembly 546 therein.

Figure 12:
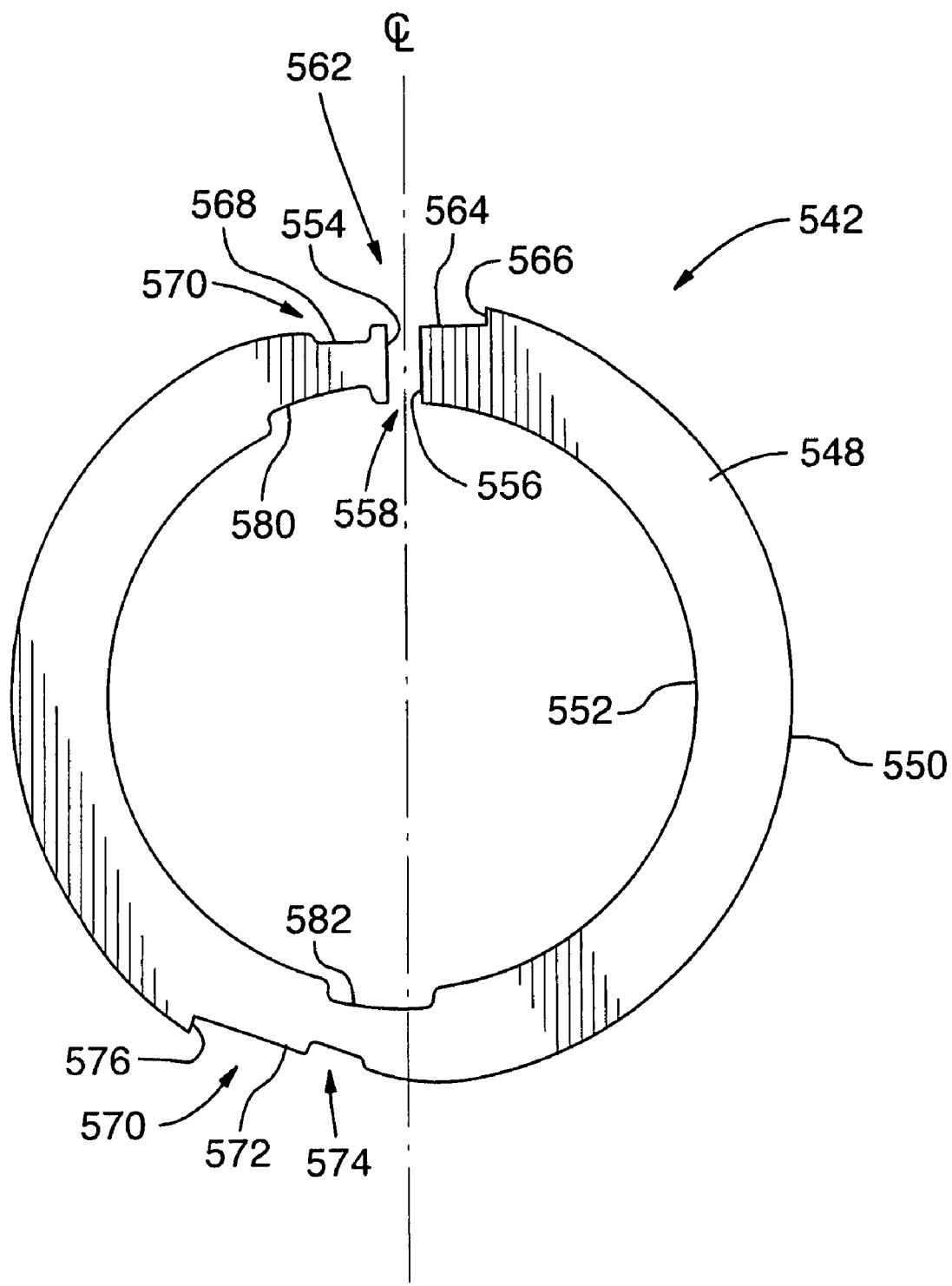
FIG. 12 is a side elevation view of one of the collars shown in FIG. 11.
Figure 13:
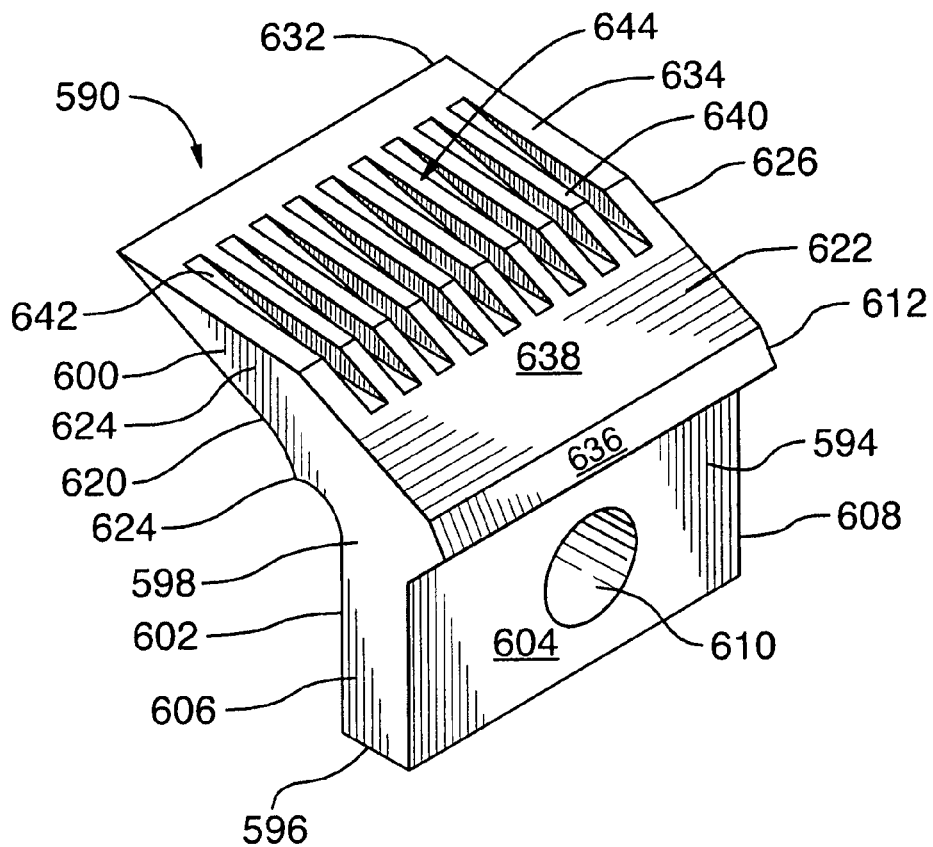
FIG. 13 is a perspective view of one of the cutting teeth shown in FIG. 11.

Referring to FIG. 12, each collar 542 is has a substantially penannular structure defined by a relatively flat, circumferentially extending, sidewall 548. The sidewall 548 is bounded circumferentially by an outer edge 550 and inner edge 552, and has first and second spaced apart ends 554 and 556. The space between the ends 554 and 556 defines a cutout 558 formed in the collar 542. The cutout 558 is disposed slightly off centre of the centreline CL of the collar 542.

At second sidewall end 556, the outer edge 550 has been trimmed back (by laser cutting) at a first location 562 to define a first substantially planar edge 564. A short distance away from the second sidewall end 556, the edge 564 terminates at a relatively small shoulder 566 defined in the outer edge 550. Inwardly of the first end 554 (i.e. moving counterclockwise), there is a rebate 568 that has been formed by a cut away in the outer edge 550. The outer edge 550 has also been trimmed at a second location 570 circumferentially spaced from the first location 562, to define a second substantially planar edge 572 and rebate 574. The edge 572 also terminates at a shoulder 576 of a size similar to that of shoulder 566. The rebates 568 and 574 are provided to facilitate the removal of bits of wood or debris that may be lodged within the cutting assembly 546.

Adjacent each of the first and second locations 562 and 570, the inner edge 552 of the sidewall 228 has a generally channel-shaped rebate 580, 582 (as the case may be) defined therein. The first rebate 580 is circumferentially spaced from the second rebate 582. The rebates 580 and 582 provide access to the space between adjacent collars 542 thereby facilitating the welding of a portion of the cutting tooth assembly 546 to the collar sidewalls 548.

Figure 11:
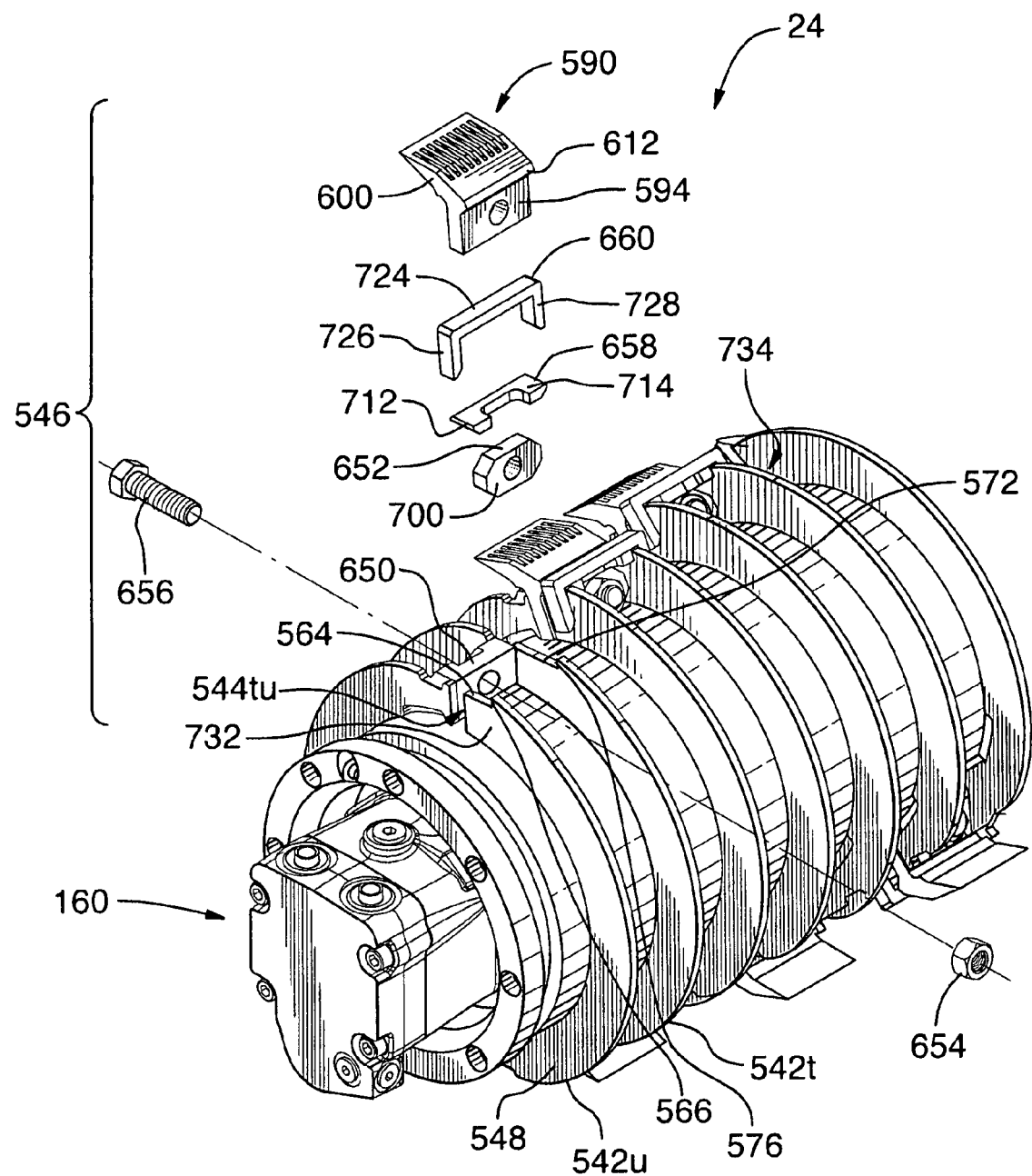
FIG. 11 is an enlarged perspective view of one end of the brush cutting head of FIG. 8a showing a cutting tooth and a portion of its corresponding mounting assembly exploded.

The collars 542 are radially mounted to the support body 210 with their inner sidewall edges 552 welded to the curved surface 540. The spacing between adjacent collars 542 is sized to correspond generally to the width of the cutting tooth assembly 546 and tends to minimize the risk that the cutting tooth assembly 546 will be damaged by violent contact with a rock or a large tree. Each collar 542 is radially offset from its adjacent collar 542 such that the cutouts 558 of adjacent collars are staggered relative to each other. In this embodiment, each station 544 is defined between the cutout 558 formed in a given collar 542 and that portion of the sidewall 548 of the adjacent collar 542 that is disposed opposite the cutout 558. Referring to FIG. 11, the station 544tu (previously identified generically as "station 544") can be seen to be defined between the cutout 558 in collar 542u and the portion of sidewall 548 of collar 542t located opposite the first cutout 558. Each of the other stations 542, identified in FIG. 8a is similarly defined between the cutout 558 of one collar 542 and a portion of sidewall 548 of an adjacent collar 542. As best shown in FIGS. 8a and 11, each station 544 is circumferentially staggered from its adjacent station.

In this embodiment, the staggered arrangement of the collars 542 allows the plurality of cutting tooth assemblies 546 to be disposed along the support body 210 in a generally double helix pattern thereby permitting cutting across the entire length of the support body 210 when the brush cutting head 24 is rotated about its longitudinal axis 'R-R'. It will however be appreciated that the cutting tooth assemblies 546 could be disposed differently along the support body 210.

Turning now to FIGS. 8a, 9 and 13 to 18, the cutting tooth assembly 546 is now described in greater detail. The cutting tooth assembly 546 includes a cutting tooth 590 and a mounting assembly 592 for securely fixing the cutting tooth 590 within a respective station 544. The cutting tooth 590 has a base portion 594 having a first end 596 and a second end 598, and a cutting portion 600 mounted to the second end 598 of the base portion 594.

The base portion 594 has a generally planar, leading face 602, an opposing trailing face 604 and two, spaced apart, lateral faces 606 and 608. Defined in the base portion 604 is a bore 610 that extends between the leading face 602 and the trailing face 604. The bore 610 is adapted to receive a fastener therethrough to permit fastening of the cutting tooth 590 to the mounting assembly 592. Adjacent the second end 598, the trailing face 604 of the base portion 594 flares outwardly to partially define a wedge-shaped abutment shoulder 612. The abutment shoulder 612 serves to reinforce the cutting tooth 590 and enables it to better resist the high impact forces to which it may be subjected during operation of the brush cutting head 24. As a result, the cutting tooth 590 tends to be less vulnerable to cracking failures along the area where the cutting portion 600 meets the base portion 604. As will be explained in greater detail below, when the cutting tooth 590 is mounted within its respective station 544, the abutment shoulder 612 will rest on a portion of the mounting assembly 592.

Figure 14:
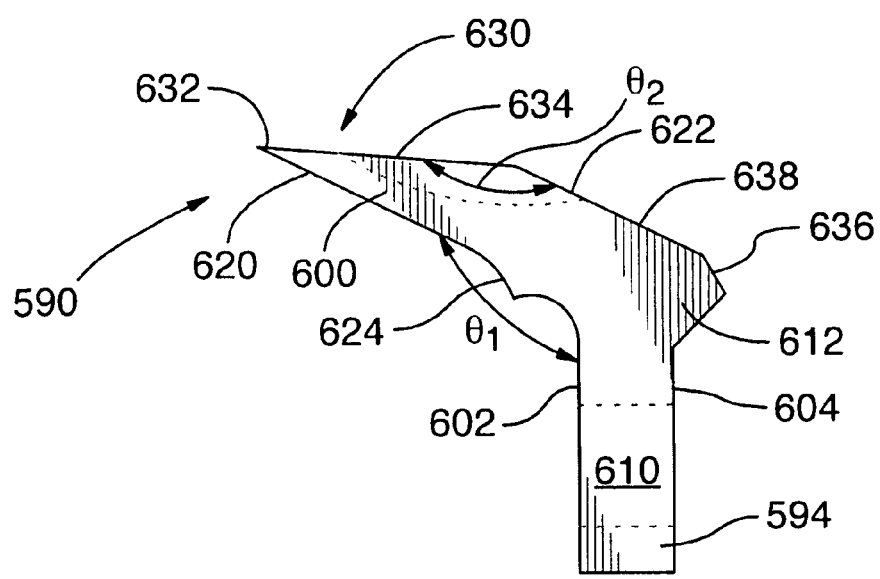
FIG. 14 is a side elevation view of the cutting tooth shown in FIG. 13.

The cutting portion 600 is carried on the second end 598 of the base portion 594 in a generally, forwardly leaning or canted fashion, and is integrally formed with the base portion 594. The cutting portion 600 has a leading face 620, an opposed trailing face 622 and two spaced-apart lateral faces 624 and 626. The leading face 620 of the cutting portion 600 joins the leading face 602 of the base portion 594 while the trailing face 622 joins the trailing face 604. Adjacent the juncture of the leading face 620 and the leading face 602, a spur 624 projects from the leading face 620. The spur 624 is provided for further chipping cutting debris. As best shown in FIG. 14, an external obtuse angle $\theta_1$ is formed between the leading face 620 and the leading face 602. In this embodiment, the angle $\theta_1$ measures approximately 116 degrees.

The leading and trailing faces 620 and 622 cooperate with each other to define a tapering, wedge-like, profile 630 that terminates in a cutting edge 632. The cutting edge 632 is carried forwardly of the leading face 622 of the base portion 594 such that it tends to be the first element of cutting tooth 590 to make contact with the brush. The cutting edge 632 extends generally linearly between the lateral faces 624 and 626 and substantially parallel to the rotational axis R-R of the brush cutting head 24. However, in alternative embodiments, the cutting edge could be configured differently. For instance, the cutting edge could be configured to extend generally diagonally between the lateral faces 624 and 626, askew of the rotational axis R-R. This configuration would tend to favor one end of the cutting edge over the other contacting the brush. In a further alternative, the cutting edge could be scalloped or formed to extend in a generally, zigzagging fashion.

When the cutting tooth 590 is mounted within the station 544, the cutting edge 632 extends beyond the first and second edges 564 and 572 of the sidewall 548 (of adjacent collars 542) to facilitate the cutting action of the tooth. The reduced profile of the sidewall 548 at the edges 564 and 572 tends to facilitate evacuation of the cutting debris away from the station 544 and the cutting tooth 590. In operation, the cutting edge 632 of each cutting tooth 590 comes into contact with the brush thereby creating debris as a result of the cutting action of the cutting tooth 590. As the debris passes over the cutting edge 632, it abrades the surface of the cutting edge 632 thereby sharpening the cutting tooth 590. This sharpening action tends to maintain or enhance the cutting efficiency of the cutting tooth and tends to reduce the need for mechanical sharpening. Thereafter the debris travels along the channels 642 to be carried away from cutting edge 632.

Returning to FIG. 14, the trailing face 622 of the cutting portion 600 has an upper portion 634, a lower portion 636 and an intermediate portion 638 disposed between the upper portion 634 and lower portion 636. The upper portion 634 extends between the cutting edge 632 and the intermediate portion 638. The upper portion 634 is bent relative to the intermediate portion 638 such that an internal obtuse angle $\theta_2$ is defined therebetween. In the present embodiment, the angle $\theta_2$ measures approximately 158.5 degrees. Similarly, the lower portion 636, which partially defines the abutment shoulder 612, is also canted relative to the intermediate portion 638.

The cutting portion trailing face 622 has a plurality of knuckle-like protuberances in the nature of ridges 640 formed thereon. The ridges 640 are generally evenly spaced and extend generally transverse of the cutting edge 632 between the upper and intermediate portions 634 and 638 of the trailing face 622. Defined between each pair of adjacent ridges 640 is a channel or groove 642 which when viewed from the side (as shown in FIG. 14) is generally curved. The alternate arrangement of ridges 640 and channels 642 define corrugations 644 on the trailing face 622. These corrugations serve to direct rocks, wood chips and other debris away from the cutting edge 632 thereby minimizing dispersion of the debris over the cutting area. In addition, the ridges 640 can themselves define additional cutting edges for improved cutting performance.

In this embodiment, the grooves 642 are machine ground into the trailing face 622 during fabrication. However, it should be appreciated that in alternative embodiments, the cutting portion 600 could be cast or forged in such a way that grooves and ridges are formed.

While in this embodiment, the corrugations 644 have a generally crenellated profile when view in cross-section, it will be appreciated that this need not be the case in all applications. In alternative embodiments, the corrugations could be configured differently. For instance, the corrugations could have a generally arcuate or zigzag profile when viewed in cross-section. Other profiles may also be employed to similar advantage.

While it is preferred that the brush cutting head 24 be used with cutting teeth 590, it will be appreciated that other types of teeth could also be used to similar advantage. More specifically, it may be advantageous to change the cutting tooth to adapt to the nature of the materials likely to be encountered during cutting operations. For instance, where the terrain to be cleared is rocky, the cutting tooth 590 described above could be replaced with a hammer-type tooth which tends to be better suited to resisting frequent impacts with rocks and the like.

Referring to FIGS. 8a to 11, the mounting assembly 592 includes a mounting block 650 disposed forwardly of the cutting tooth 590, a mounting plate 652 disposed rearwardly of the cutting tooth 590, a fastener in the nature of a nut 654 and bolt 656, an abutment plate 658 for placement on the substantially planar edges 564 and 572, and a C-shaped retaining member 660.

Figure 15:
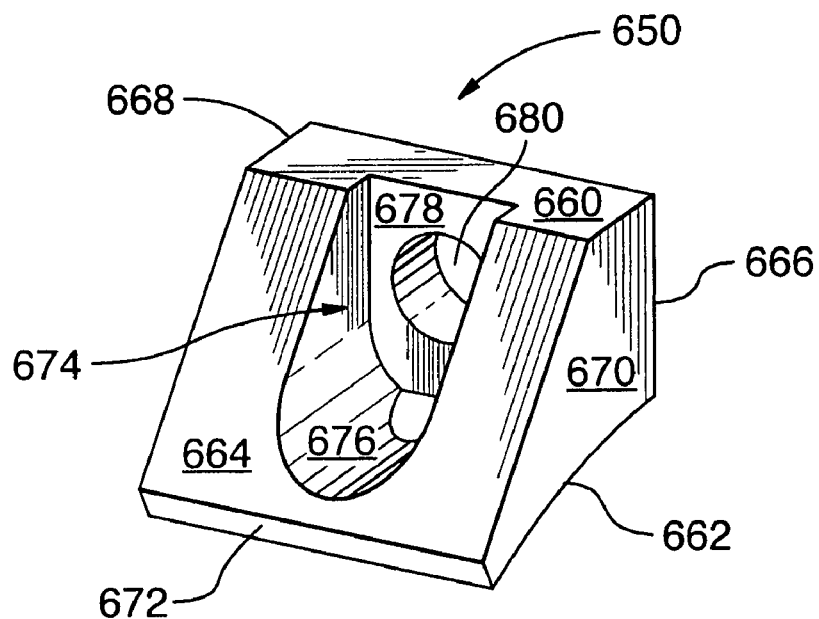
FIG. 15 is a perspective view of the mounting block shown in FIG. 11.

Referring to FIG. 15, the mounting block 650 is defined by a top face 660, a bottom face 662 disposed opposite the top face 660, leading and trailing faces 664 and 666 which extend between the top and bottom faces 660 and 662 and a pair of spaced apart lateral faces 668, 670. The bottom face 662 is generally arcuate—its radius of curvature matching that of the curved surface 220 to thereby facilitate welding of the mounting block 650 to the support body 210. The trailing face 666 extends generally upwardly from the bottom face 662 to join the top face 660. As compared to the bottom face 662, the top face 660 is relatively short. The leading face 664 extends away from the top face 660 at a downward angle toward the bottom face 662. A narrow band 672 joins the leading face 664 to the bottom face 662. The leading face 664, the narrow band 672 and the bottom face 662 cooperate with each other to impart to the mounting block 650 a generally tapering (wedge-like) profile. It will be appreciated that the configuration of the mounting block 650 with its sloped leading face 664 tends to encourage the deflection of debris away from the cutting tooth 590.

Formed centrally in the leading face 664 and extending partially into the top face 660, is a relatively large rebate 674. The rebate 674 defines a generally curved bottom wall 676 and a leading wall 678 that is generally parallel to and spaced apart from the trailing face 666. The rebate 674 communicates with a bore 680 that extends between the trailing face 666 and the leading wall 666. The rebate 674 and the bore 680 are sized to accommodate the bolt 656 extending therethrough.

Figure 16:
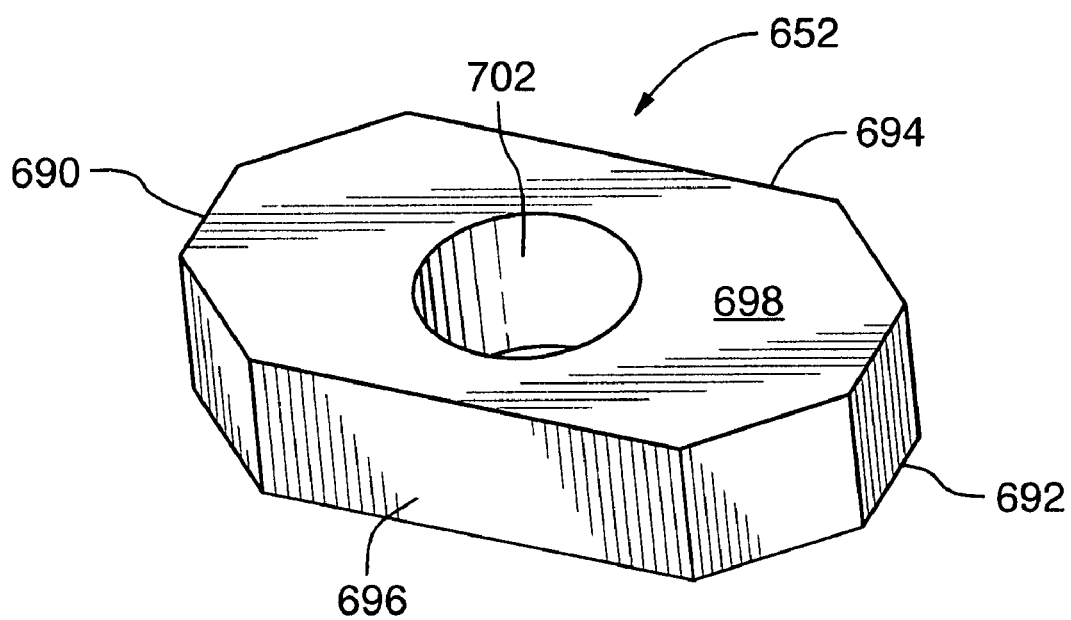
FIG. 16 is a perspective view of the mounting plate shown in FIG. 11.

With reference to FIG. 16, the mounting plate 652 is now described in greater detail. The mounting plate 652 is a generally rectangular plate with truncated corners, its shape defined primarily by a pair of opposed, relatively short, sides 690 and 692 and a pair of opposed, relatively long sides 694 and 696 that extend between the short sides 690 and 692. The short sides 690 and 692 and the long sides 694 and 696. Moreover, the mounting plate 652 has a leading face 698, an opposed trailing face 700 and an aperture 702 defined therein between the leading and trailing faces 698 and 700. The aperture 702 is adapted to receive the bolt 656 therethrough.

Figure 17:
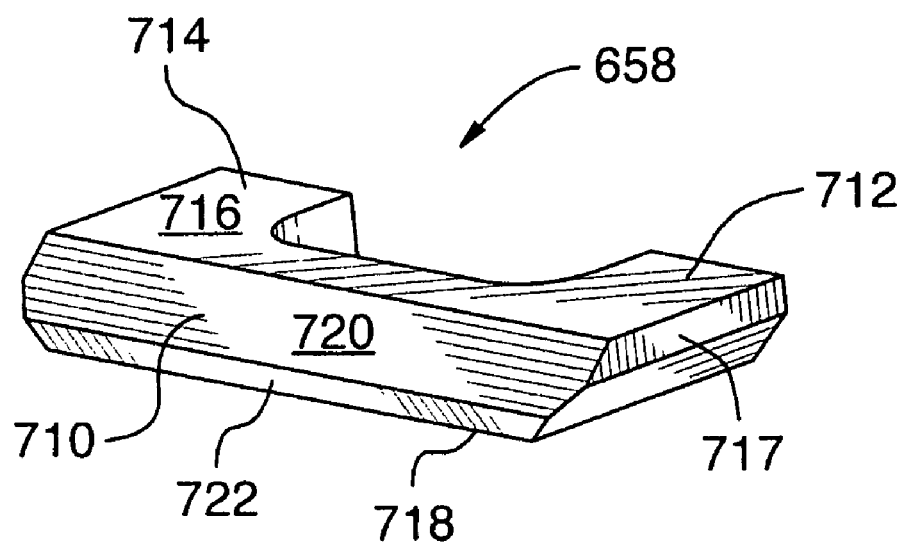
FIG. 17 is a perspective view of the abutment plate shown in FIG. 11.

Referring now to FIG. 17, there is shown the abutment plate 658. Abutment plate 658 is generally C-shaped when viewed in top plan. It has a back portion 710 and a pair of spaced apart arm portions 712 and 714 joined to the back portion 710 and extending away therefrom. The abutment plate 658 further includes a top face 716, an opposed bottom face 718 and a leading face 720 spanning the back portion 710. The leading face 720 extends downwardly from the top face 716 toward the bottom face 718. A narrow band 722 joins the leading face 720 to the bottom face 718. The leading face 720, the narrow band 722 and the bottom face 718 cooperate with each other to impart to the abutment plate 658 a generally tapering (wedge-like) profile. A portion of the outer-facing side 717 of each arm portions 712, 714 is also trimmed inwardly starting at a point roughly one third of the way from the top face 716 and terminating at the bottom face 718.

Figure 18:
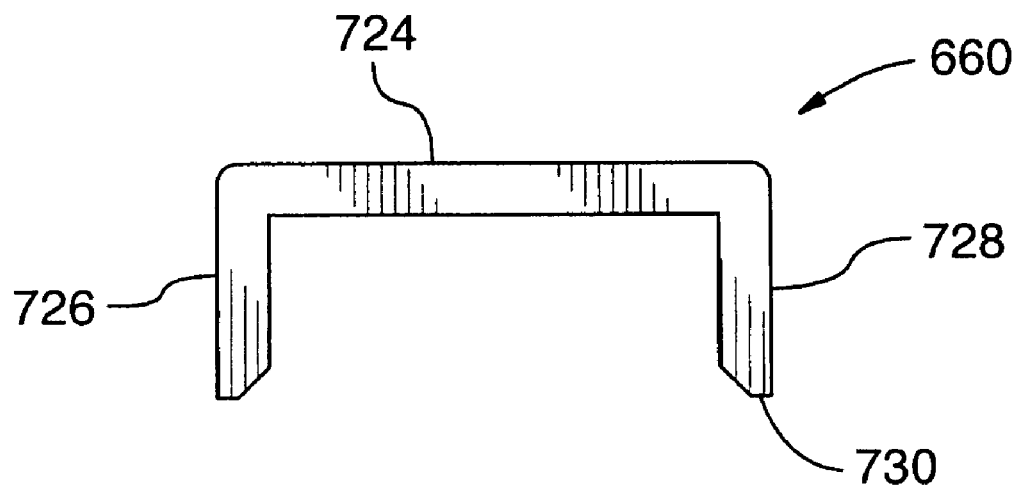
FIG. 18 is an end elevation view of the retaining member shown in FIG. 11

With reference to FIG. 18, the retaining member 660 has a back portion 724 and a pair of spaced apart arm portions 726 and 728, each depending from one end of the back portion 724. To facilitate welding of the arm portions 726 and 728 to the collars 542, the terminal end 730 of each arm portion 726, 728 is trimmed on an angle. The spacing between the arm portions 726 and 728 is sized so that the retaining member 660 can span the distance between two adjacent collars 542, with one arm portion 726 abutting the first face 732 of one collar 542 and the other arm portion 728 abutting the second face 734 of another adjacent collar 542.

As best shown in FIG. 11, during fabrication of the brush cutting head 24, the mounting block 650 and the abutment plate 658 are fixed to adjacent collars 542u and 542t (as the case may be). More specifically, the mounting block 650 is positioned between adjacent collars 542u and 542t with its bottom face 662 abutting the curved surface 540 of the support body 210 and its trailing face 666 disposed flush with the sidewall end 554 of collar 542u so as to allow unobstructed access to the cutout 558 during re-tooling. The mounting block 650 is then welded to the adjacent collars 542 about the first and second rebates 580 and 582. The abutment plate 658 is mounted to span the space between adjacent collars 542u and 542t. The first arm portion 712 of the abutment plate 658 is supported on the first substantially planar edge 564, while the second arm portion 714 rests on the second substantially planar edge 572. At their terminal extremities the arm portions 712 and 714 abut the shoulders 566 and 576 defined on the outer edges of the collars 542u and 542t. Thus disposed, the abutment plate 658 is welded in place.

Referring now to FIG. 11, the attachment of the cutting tooth 590 to the brush cutting head 24 is now described in greater detail in the context of station 544ab. The cutting tooth base portion 594 is placed between the mounting block 650 and the abutment plate 658 with its leading face 664 abutting the trailing face 666 of the mounting block 650 and its abutment shoulder 612 bearing on the leading face 620 of the abutment plate 658. The mounting plate 652 is then placed between the collars 542a and 542b with its long side 694 abutting the curved surface 540 and its opposed long side 696 abutting the bottom of the abutment plate 658. Thereafter, the bolt 656 is inserted into the aligned apertures of the mounting block 650, the cutting tooth 590 and the mounting plate 652 and securely fastened with the nut 654. The space between the arm portions 712 and 714 facilitates the use of a tool to tighten or loosen (as the case may be) the nut 654.

It will be appreciated that in other embodiments different collars and cutting tooth assemblies may be employed to similar advantage, for instance, those described and shown in U.S. patent application Ser. No. 11/431,748 and U.S. Pat. No. 6,764,035; the contents of which are hereby incorporated by reference.

While in the embodiment shown in FIGS. 1 to 24, the brush cutting head 24 is provided with a drive and bearing assembly 160 having a single motor 252 carried at one end of the support member 210, this need not be the case in every application. In an alternative embodiment, it may be possible to construct a drive and bearing assembly having two motors—one disposed at each end of the support body. FIGS. 25 to 30 show a brush cutter 800 which includes an alternate brush cutting head 802 incorporating such a drive and bearing assembly identified in the drawings with reference numeral 930.

Brush cutter 800 includes an open-bottom housing 804 defined generally by a front panel assembly 806, a rear panel assembly 808 and a pair of side panels 810 and 812. The panel assemblies 806 and 808 extend longitudinally between, and are joined to, the side panels 810 and 812. A curved wall 814 disposed within the interior of the housing 804 spans the space between the side panels 810 and 812, its curved profile partially defining a well 814 (best shown in FIG. 29) sized to accommodate the brush cutting head 802.

Figure 26:
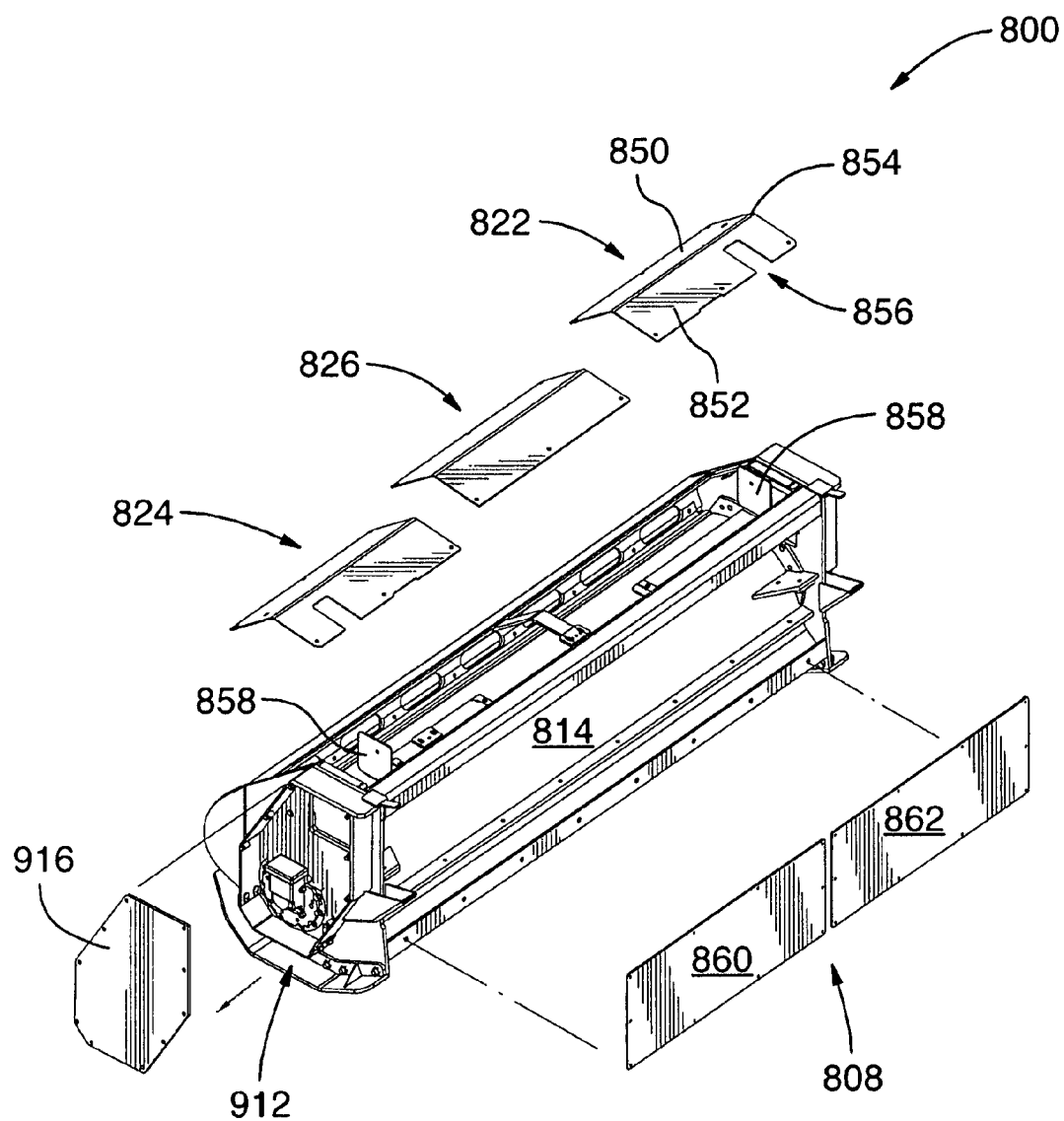
FIG. 26 is rear right perspective view of the brush cutter illustrated in FIG. 25 showing front and rear cover panels and the side cover plate exploded from the brush cutter housing.
Figure 27:
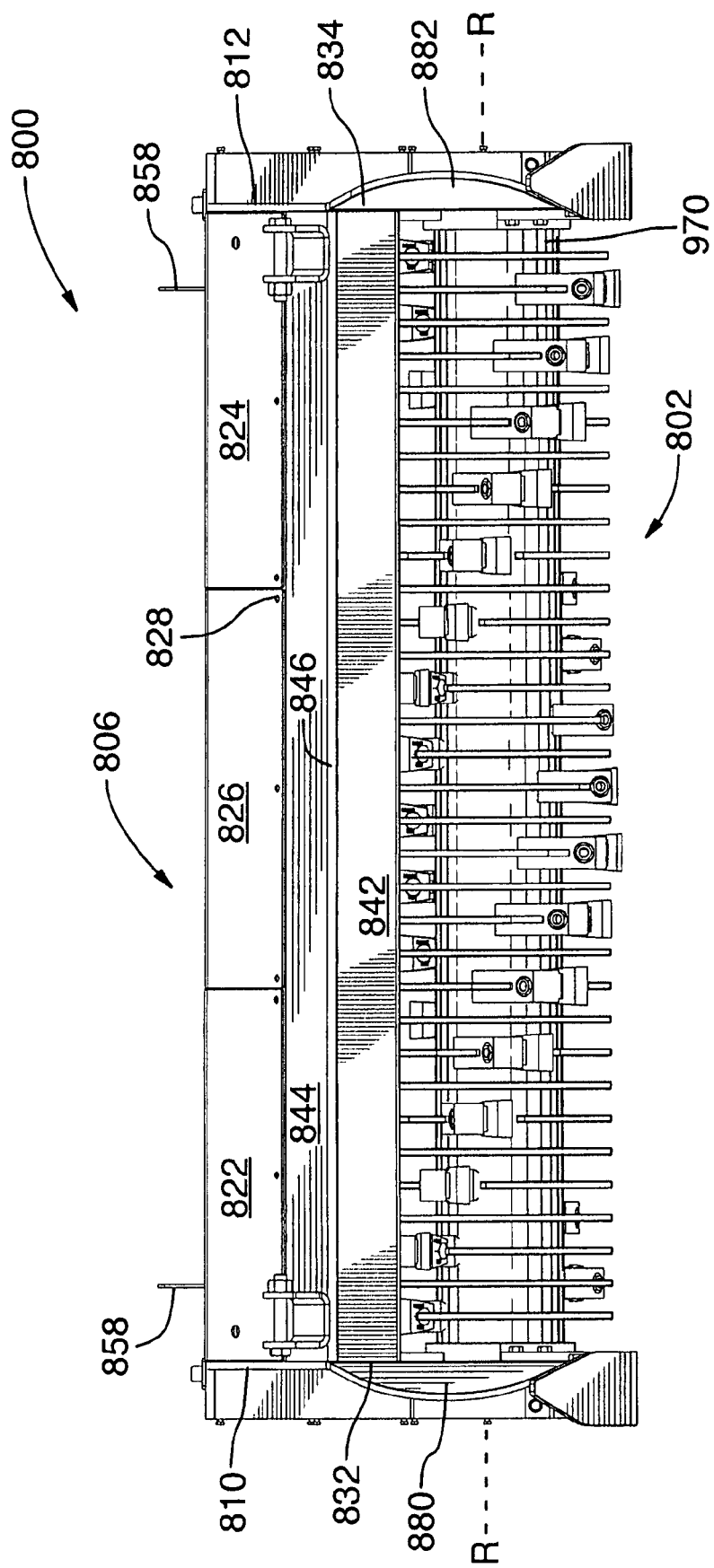
FIG. 27 is a front elevation view of the brush cutter shown in FIG. 25.

With reference to FIG. 26, the front panel assembly includes a lower panel 820 and three upper panels—a first upper panel 822, a second upper panel 824 and a third upper panel 826 disposed between the first upper panel 822 and the second upper panel 824. The lower panel 820 is a bent steel panel whose margins are defined by a rear upper longitudinal edge 828, a front lower longitudinal edge 830, and a pair of spaced apart side edges 832 and 834 extending between the longitudinal edges 828 and 830. The lower panel 820 is welded to the inner faces 840 of the side panels 810 and 812 along its side edges 832 and 834. The lower panel 820 includes an upper portion 842 and a lower portion 844. The lower portion 842 extends generally vertically upwards from the front lower edge 830 to a first corner 846 whereat it meets the upper portion 844. The front lower edge 830 is carried above the axis of rotation R-R of the brush cutting head 800 (as best shown in FIG. 27) leaving the front of the housing 804 substantially open to allow the brush cutting head 802 to engage the brush to be cut as the brush cutter 800 travels over an area to be cleared.

Each upper panel 822, 824, 826 is a bent steel panel having a lower portion 850 and an upper portion 852 which meets the lower portion 850 at a corner 854. The upper portion 852 has a generally horizontal orientation and defines the top of the housing 804. Defined in the upper portions 852 of the first and second upper panels 824 and 826 are cutouts 856 through which extend tabs 858. The tabs 858 provide an attachment site for fixing a protective member in the nature of bar (not shown) for protecting the housing 804 from being crushed or otherwise damaged by a falling tree during operation of the brush cutter 800. The upper panels 822, 824 and 826 are attached to the housing 804 with fasteners 828.

The rear panel assembly 808 includes first and second, rectangular, rear panels 860 and 862 mounted side-by-side and fastened to the housing 804 by a plurality of fasteners (not shown).

Figure 28:
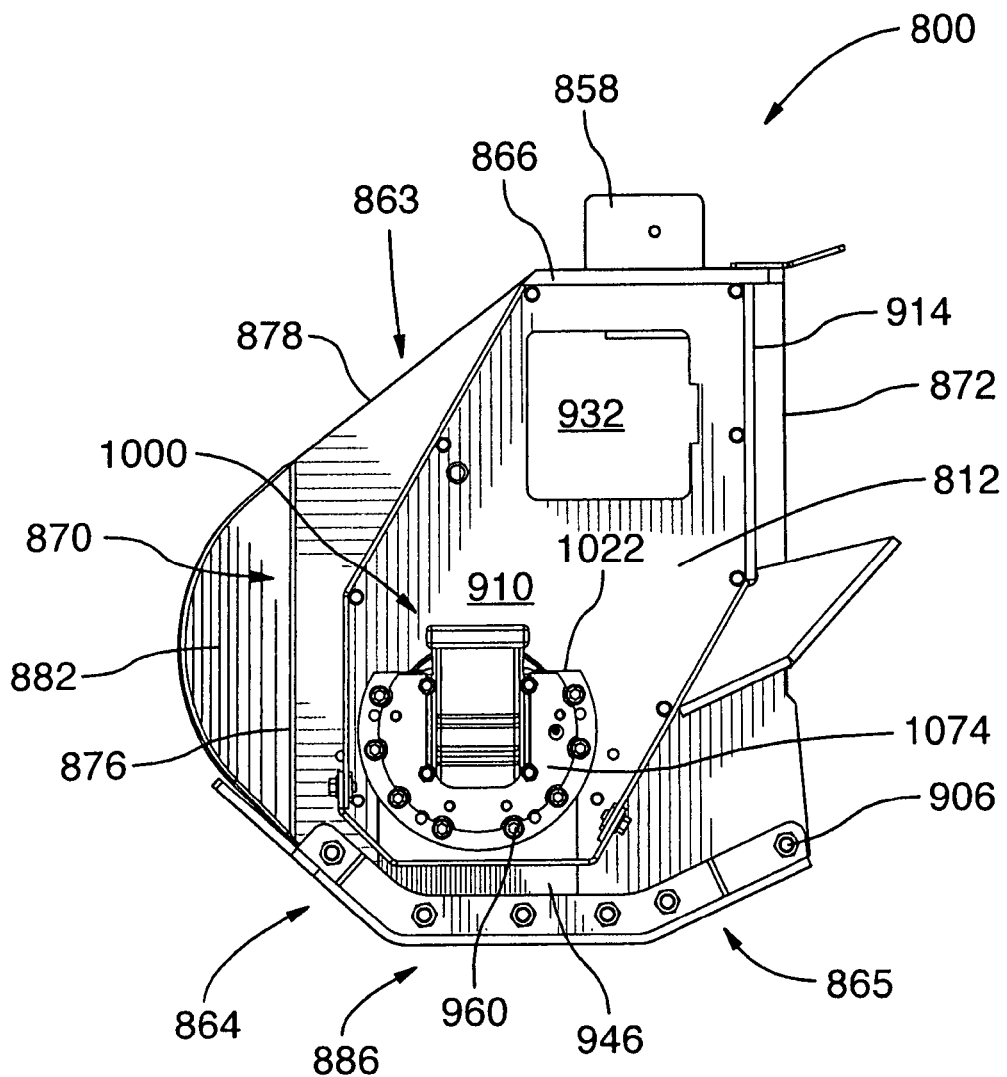
FIG. 28 is a right end elevation view of the brush cutter shown in FIG. 25.
Figure 29:
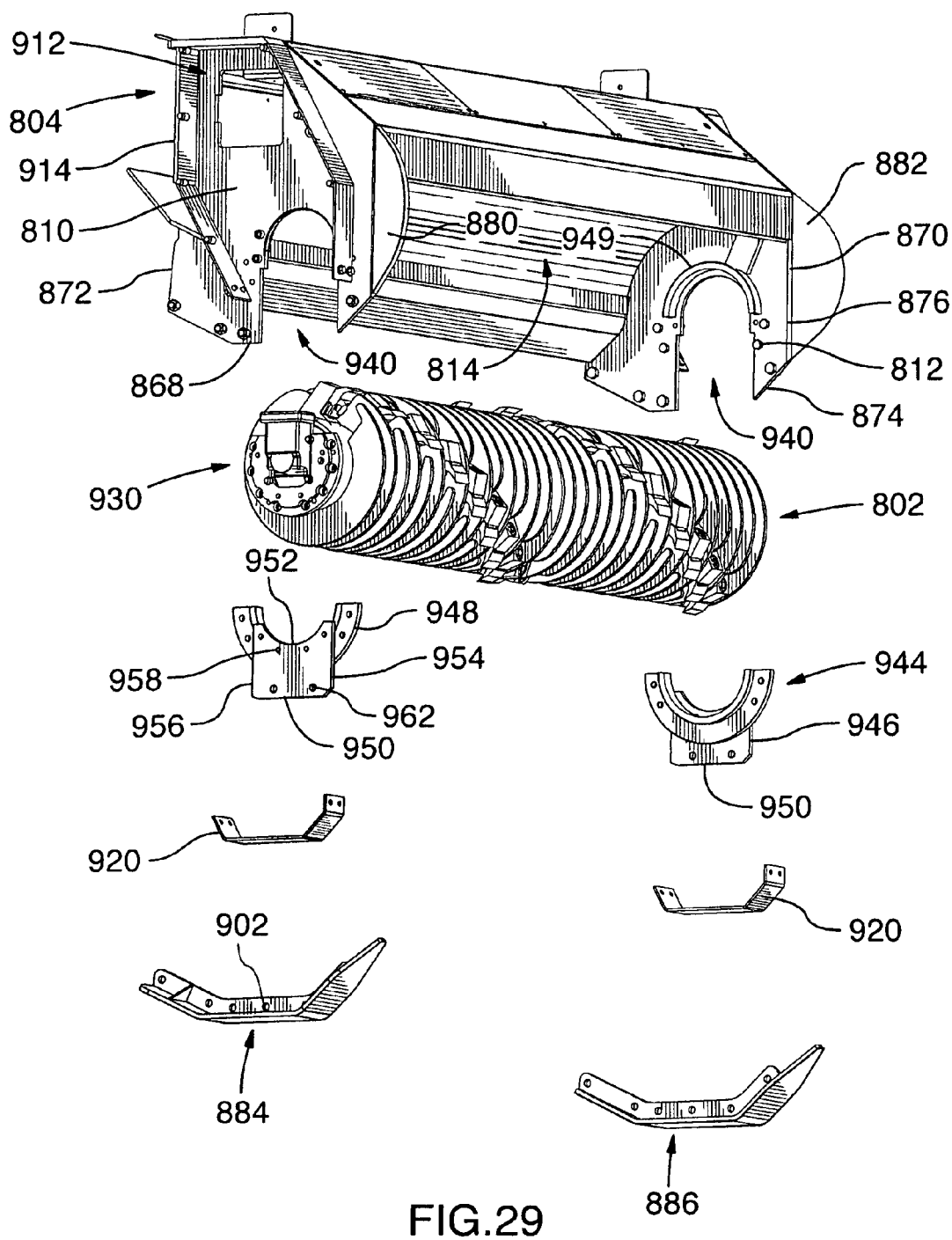
FIG. 29 is another right perspective view of the brush cutter of FIG. 25 showing the brush cutting head and the side panel runners and end members exploded.
Figure 30:
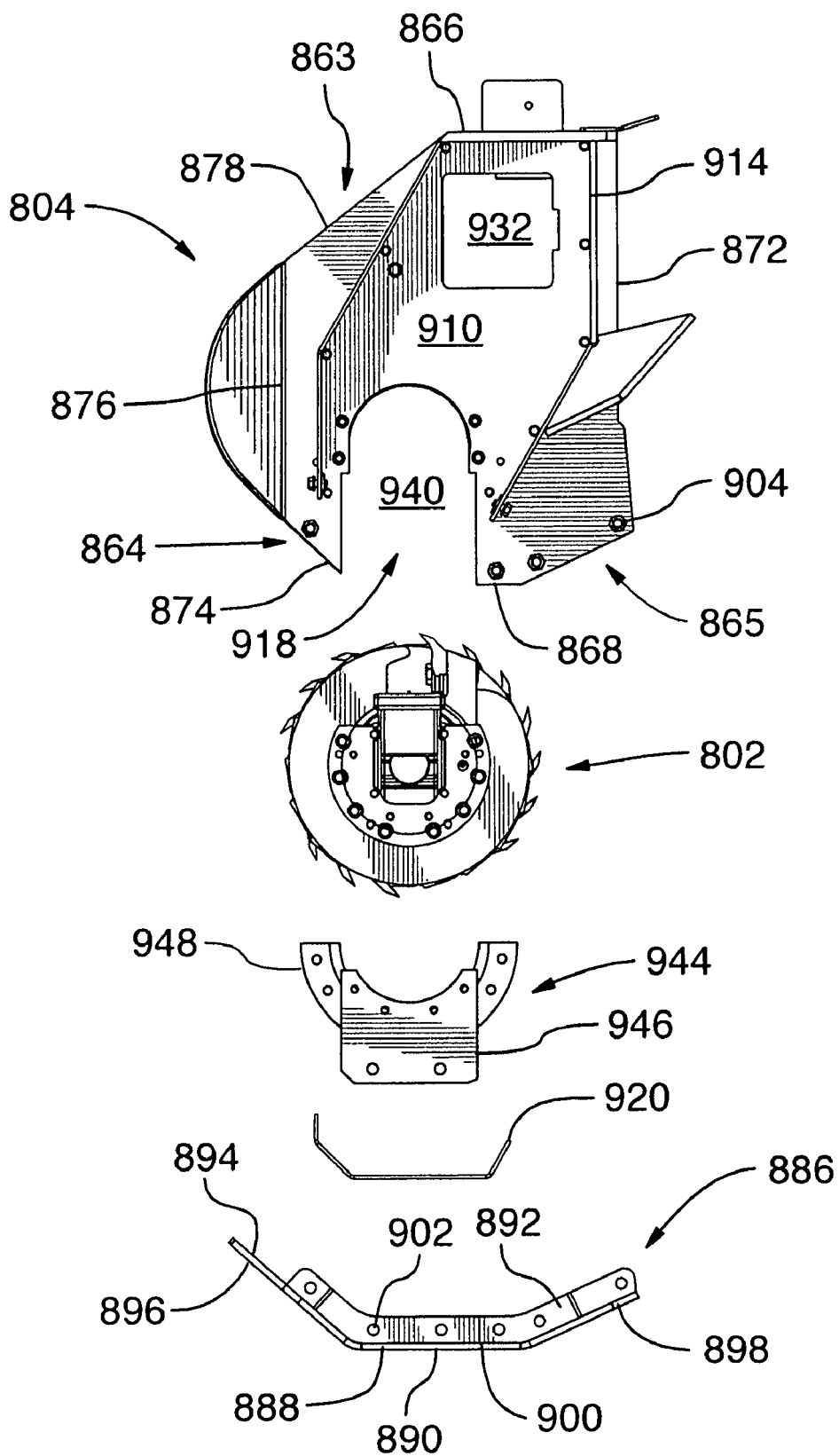
FIG. 30 is a right end elevation view of the brush cutter shown in FIG. 29.

Referring to FIGS. 28, 29 and 30, each side panel 810, 812 is a steel panel having a roughly rectangular shape with its top front corner 863, bottom front corner 864 and bottom rear corner 865 truncated. The margins of each side panel 810, 812 are defined by an upper horizontal edge 866, an opposed lower horizontal edge 868 and front and rear edges 870 and 872 that extend between the upper and lower horizontal edges 866 and 868. The rear edge 872 runs substantially vertically from the upper horizontal edge 866 to the lower horizontal edge 868. The front edge 870 includes a frontwardly inclined edge portion 874 extending from the lower horizontal edge 868, a vertically extending edge portion 876 running upwardly from the edge portion 874, and a rearwardly inclined or slanted edge portion 878 that joins the vertically extending edge portion 876 to the upper horizontal edge 866. A deflector plate 880, 882 is welded to the vertically extending edge portion 876 of each side panel 810, 812. As best shown in FIG. 27, the deflector plates 880 and 882 flare slightly from the plane of their respective side panels 810 and 812. In like fashion to deflector plates 114 and 116, the deflectors plates 810 and 812 tend to encourage the brush to be cut toward the brush cutting head 802 during operation of the brush cutter 800.

Fastened to the lower horizontal edge 868 of each side panel 810, 812 is a ski-like runner 884, 886 that is generally similar to runner 120, 122 in that it includes a steel strip 888 whose bottom face 890 is adapted for contact with the ground and a bracket 892 welded to the top face 894 of the strip 888 for securing the runner 884, 886 to the side panel 810, 812. The strip 888 has front and rear upturned ends 896 and 898 and a flat portion 900 disposed intermediate the front and rear ends 896 and 898. The bracket 892 is similarly shaped to correspond to the profile of the strip 888. A plurality of apertures 902 formed in the bracket 892 are alignable with corresponding apertures 904 defined in each side panel 810, 812 adjacent the lower horizontal edge 868 thereof, to allow fasteners 906 to be received therethrough.

Each side panel 810, 812 is similarly configured in that it carries on its outer face 910 a protective enclosure 912 defined by a peripheral sidewall 914 standing proud of the side panel 810, 812 and a removable cover plate 916. The peripheral sidewall 914 has a gap 918 formed therein along its lower-most margin to allow detachment of the brush cutting head 802 from the housing 804 during maintenance, repair or re-tooling of the brush cutter 20. The cover plate 916 may be attached to the peripheral sidewall 914 using fasteners (not shown). When secured to the peripheral sidewall 914, the cover plate 916 in cooperation with bent plate 920 (best shown in FIG. 29) is adapted to close off the space defined by the peripheral sidewall 914 and the outer face 910 to prevent dirt, dust or debris from entering into the drive and bearing assembly 930 and the hydraulic fluid distribution system (not shown) (said system being accessible through a rectangular opening 932 formed in the side panel 810, 812).

As best shown in FIGS. 29 and 30, each side panel 810, 812 has defined therein a generally semi-circular, arch-shaped cutout 940 sized to allow a portion of the drive and bearing assembly 930 to be accommodated therein. Adjacent the straight edges defining the cutout 940, the side panel has a plurality of apertures 942.

Also provided, is an end member 944 designed to close off the arched-shaped cutout 940. The end member 944 includes a plate portion 946 that is configured to fit within the arch-shaped cutout 940 and an upturned semi-annular portion 948 welded to the back of the plate portion 946. The upturned semi-annular portion 948 is adapted for abutment with a downturned semi-annular portion 949 (best shown in FIG. 29) fastened to the inner face 840 of the side panel (in this case side panel 812). When abutted, the semi-annular portion 948 and the downturned semi-annular portion 949 together define a protective end ring or collar which serves to block dust or debris from entering into the interior of the brush cutting head 802.

The plate portion 946 is defined by a lower horizontal edge 950, an opposed downwardly concaving edge 952 and a pair of spaced part substantially vertical edges 954 and 956 extending between the edges 950 and 952. Disposed along the downwardly concaving edge 952 is a plurality of apertures 958 configured to receive fasteners 960 for securing the plate portion 946 to side panel 810, 812. Adjacent the lower horizontal edge 950 of the plate portion 946, a pair of apertures 962 is provided. The apertures 962 are alignable with the corresponding apertures 902 in the bracket 892 to allow the insertion of fasteners 964 therethrough to secure the plate portion 946 to the bracket 892.

Figure 31:
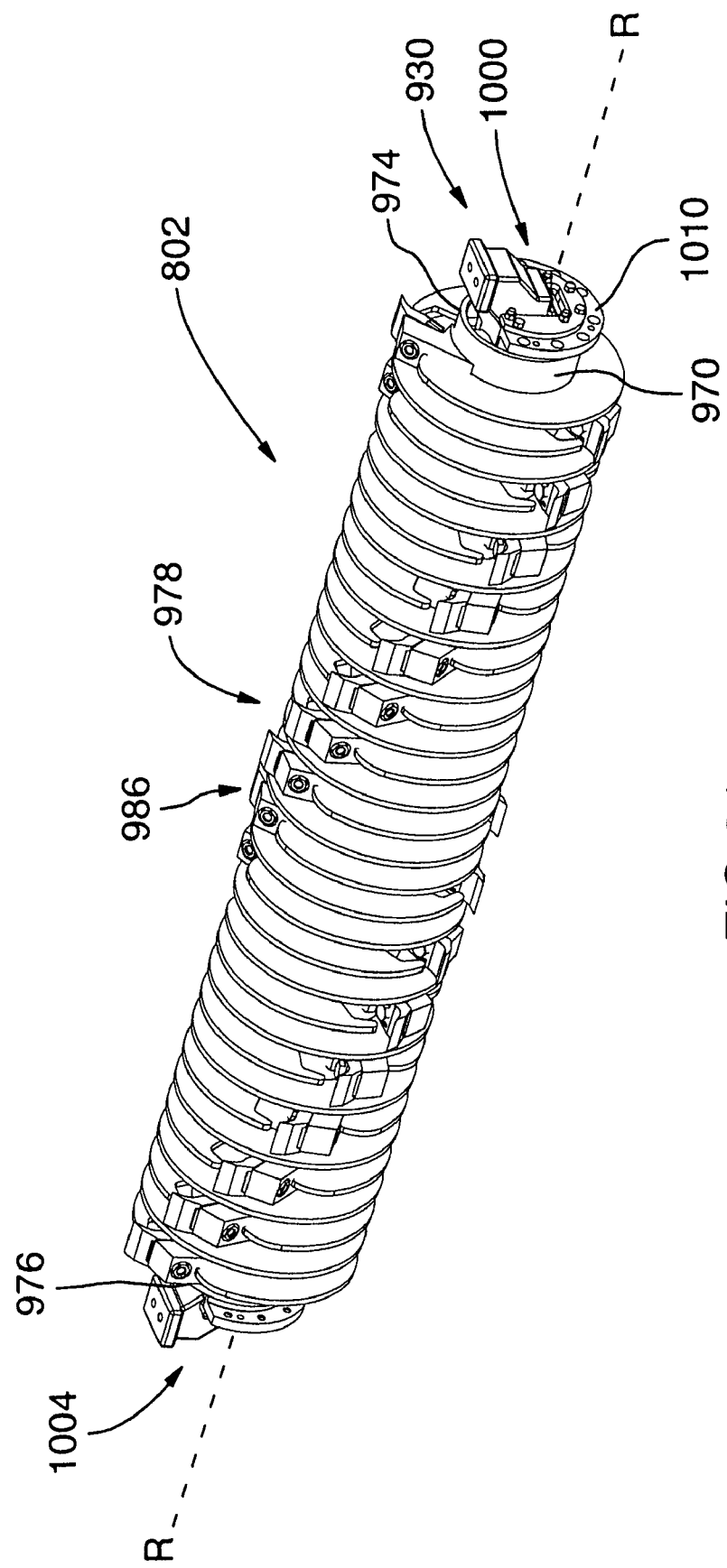
FIG. 31 is a front left perspective view of the brush cutting head shown in FIG. 25.
Figure 32:
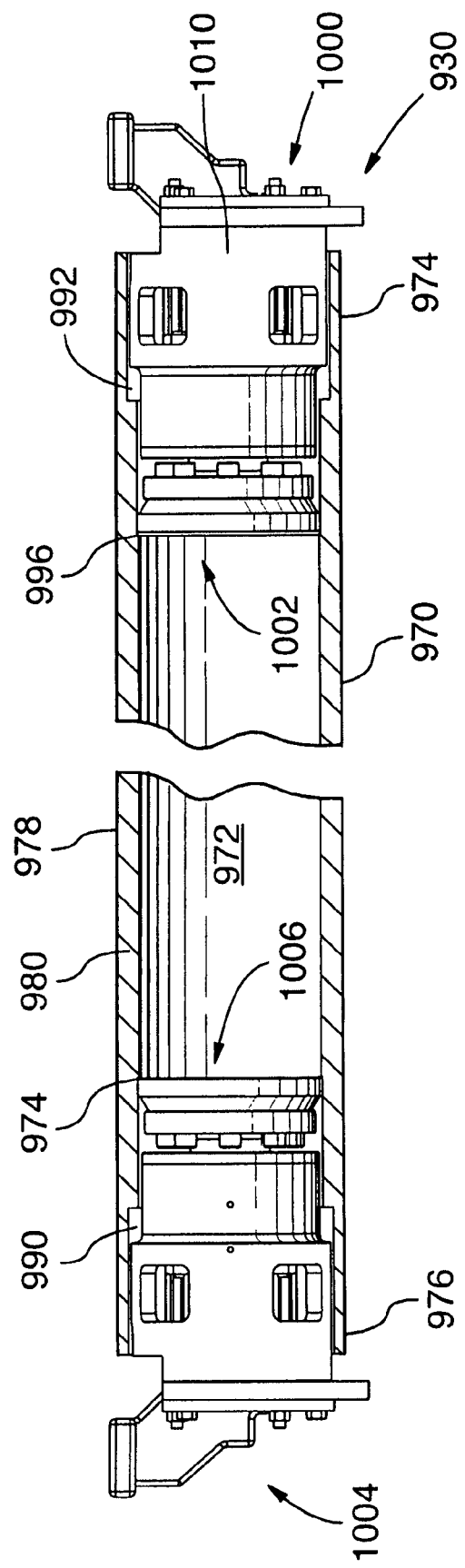
FIG. 32 is a front elevation view of the brush cutting head illustrated in FIG. 25 with a portion of the outer surface of the support body removed to reveal an drive and bearing assembly mounted within the hollow of the support body, the drive and bearing assembly including a first drive block and first coupling assembly and a second drive block and second coupling assembly.

Referring now to FIGS. 31, 32, there is shown the brush cutting head 802. The brush cutting head 800 includes a tubular support body 970 and the drive and bearing assembly 930 housed substantially within the hollow 972 defined in the support body 970. The support body 970 is generally similar to the support body 210 in that it has a first end 974, an opposed second end 976 and an intermediate portion 978 extending between the first and second ends 974 and 976. The support body 970 has a circular cross-section defined by a circumferential wall 980 having an outer surface 982 and an inner surface 984. Disposed along the outer surface 982 is a plurality of cutting tooth assemblies 986.

In like fashion to the support body 210, the thickness of the circumferential wall 980 is not constant throughout the length of the support body 970. More specifically, the circumferential wall 970 is thinner at the regions 990 and 992 of the support body 970 (which regions extend inwardly from the first and second ends 974 and 976 a short distance) than at the mid-length of the support body 970. In the regions 990 and 992 the hollow 972 has a greater cross-sectional area to accommodate the drive and bearing assembly 930. Defined by the increased thickness of the circumferential wall 980 beyond the regions 990 and 992, are circumferentially extending shoulders 994 and 996 upon which portions of the drive and bearing assembly 930 will abut.

The support body 970 however differs from support body 210 in that it is sized longer and has a greater diameter than the support body 210.

In contrast to the drive and bearing assembly 160 shown in FIG. 19 which only has a single drive block 240, the drive and bearing assembly 930 includes a first drive block 1000 operatively connected to a first coupling assembly 1002 and a second drive block 1004 operatively connected to a second coupling assembly 1006. The first drive block 1000 and the first coupling assembly 1002 are adapted to fit within the hollow 972 in the region 990, while the second drive block 1004 and the second coupling assembly 1006 are designed to fit in the hollow 972 in the region 992. The provision of two drive blocks allows greater torque to be generated for the rotation of the support body 970.

Figure 33:
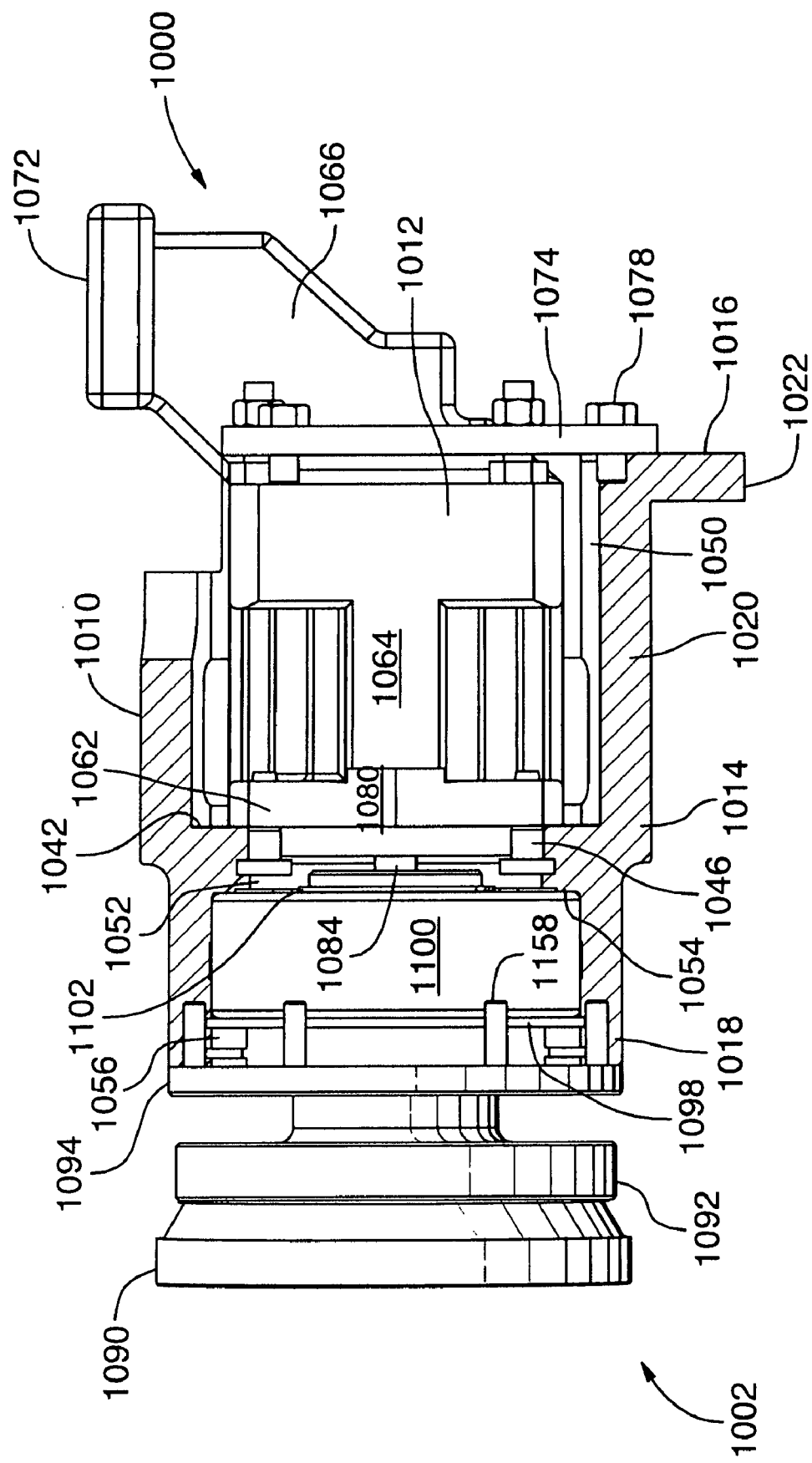
FIG. 33 is a side elevation view of the first drive block and the first coupling assembly illustrated in FIG. 32 showing the first drive block and the first coupling assembly operatively connected to each other, a portion of the outer wall of the motor support member being removed to reveal details of the interior thereof.
Figure 34:
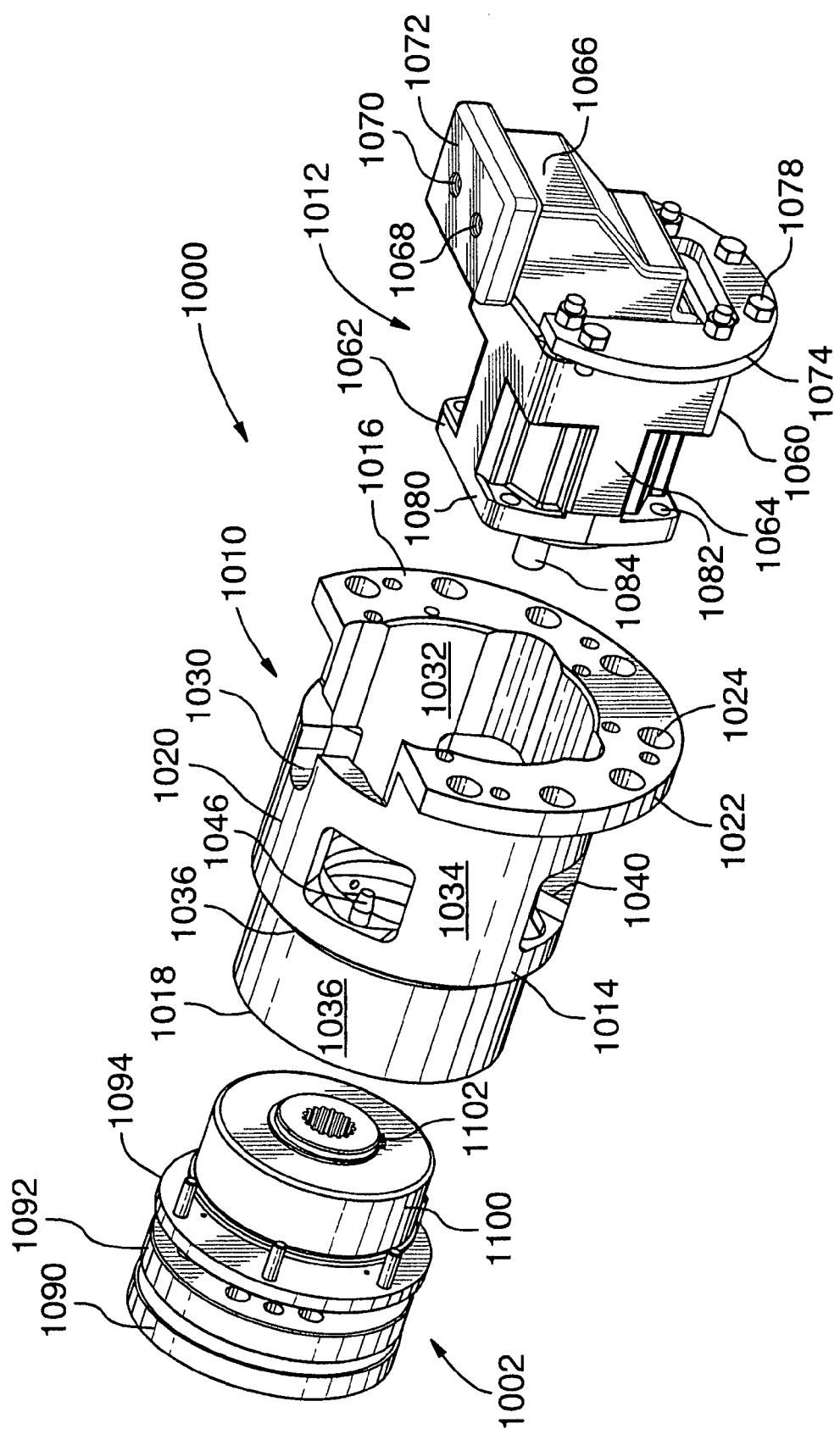
FIG. 34 is an exploded perspective view of the first drive block and first coupling assembly illustrated in FIG. 33.
Figure 35:
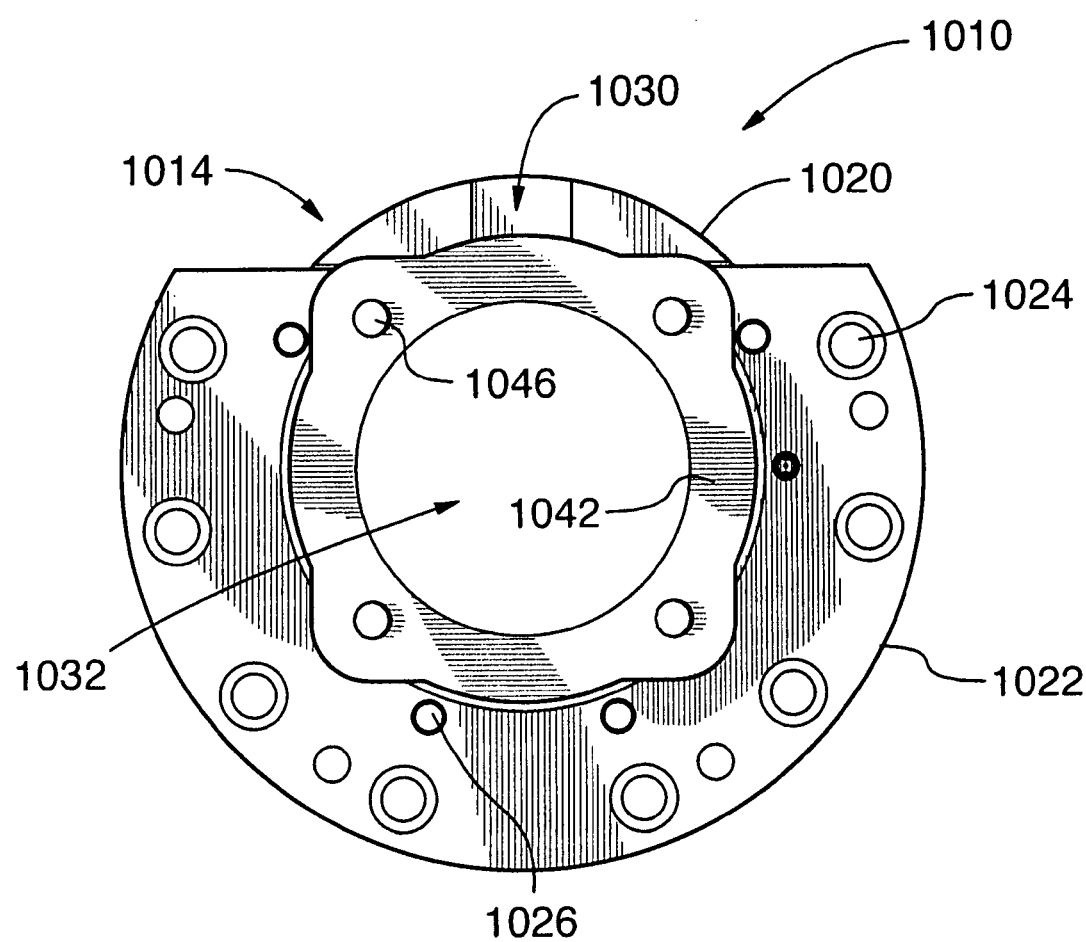
FIG. 35 is an end elevation view of the motor support member of the first drive block shown in FIG. 34.

The first drive block 1000 and first coupling assembly 1002 combination is identical to the second drive block 1004 and second coupling assembly 1006 combination such that a description of one will suffice for the other. Referring now to FIGS. 33, 34 and 35, the first drive block 1000 includes a hollow motor support member 1010 and a hydraulic motor 1012 adapted to fit at least partially within the motor support member 1010. The motor support member 1010 has a sleeve-like body 1014 with a first end 1016, an opposed second end 1018 and a generally cylindrical sidewall 1020 extending between the first and second ends 1016 and 1018. At the first end 1016, the body 1014 has a flange or outwardly projecting ring or collar 1022 joined to the sidewall 1020. However, unlike flange 262 shown in FIG. 21, which extends about the entire circumference of the body 254, the flange 1022 is trimmed back to impart a generally horseshoe-like shape to the flange 1022. Defined in the flange 1022 are a first plurality of threaded apertures 1024 alignable with apertures 942 defined in the side panel 812 (or side panel 810, as the case may be) and a second plurality of threaded apertures 1026 which are provided to allow fastening of the hydraulic motor 1012 to the motor support member 1010.

In like fashion to the flange 1022, a portion of the sidewall 1020 is also trimmed back. In the area where the sidewall 1020 has been trimmed, a rebate 1030 has been formed. The rebate 1030 is sized to accommodate therethrough the passage of a hydraulic fluid sensor line (not shown) connected to the hydraulic motor 1012. The sidewall 1020 defines an interior hollow 1032 within the body 1014 and includes a first sidewall portion 1034 extending from the first end 1016 to a juncture 1036 and a second sidewall portion 1038 extending from the second end 1018 to meet the first sidewall portion 1034 at the juncture 1036. Defined at circumferentially spaced locations along the first sidewall portion 1034 are a plurality of relatively large cutouts 1040.

As best shown in FIG. 33, the outer diameter of the body 1014 defined by the first sidewall portion 1034 is greater than the outer diameter of the body 1014 defined by the second sidewall portion 1038. At the juncture 1036, a portion of the sidewall 1020 extends radially inward from the first sidewall portion 1034 to define a first shoulder 1042. Projecting from the first shoulder 1042 at each corner thereof is a locating pin or dowel 1046.

The hollow 1032 includes a first region 1050 extending between the flange 1022 and the first shoulder 1042, a second region 1052 spanning from the first shoulder 1042 to a second shoulder 1054 defined by a radially outwardly extending portion of the sidewall 1020 and a third region 1056 extending from the second shoulder 1054 to the second end 1018 of the body 1014. Each region 1050, 1052 and 1056 is open at either end to provide access to the next adjacent region. As best shown in FIG. 35, the first region 1050 is roughly square and is configured to correspond generally to the shape of the hydraulic motor 1012. Both the second and third regions 1052 and 1056 have a generally cylindrical shape. However, the third region 1056 is sized larger than the second region 1052.

The hydraulic motor 1012 has a first end 1060, a second end 1062 and a housing body 1064 that extends between the first and second ends 1060 and 1062. Projecting from the first end 1060 of the housing body 1064 is a hydraulic coupling member 1066. The hydraulic coupling member 1066 includes inlet and outlet ports 1068 and 1070 defined on its top face 1072. The ports 1068 and 1070 are connectable to the hydraulic fluid distribution system (not shown) for fluid communication therewith via flexible fluid supply lines or hoses (not shown).

A horseshoe-shaped member 1074 whose shape corresponds generally to that of flange 1022 but is sized relatively smaller, is fastened to the first end 1060. The horse-shaped member 1074 partially surrounds the hydraulic coupling member 1066 and provides a flange to the housing body 1064 for fixing the hydraulic motor 1012 to the motor support member 1010. The horseshoe-shaped member 1074 has a plurality of apertures 1076 that are alignable with the apertures 1026 defined within the flange 1022 and through which threaded fasteners 1078 may be inserted.

The housing body 1064 is formed with a roughly square, end wall 1080. When the motor 1012 is attached to the motor support member 1010, the end wall 1080 abuts the first shoulder 1042. Disposed at each corner of the end wall 1080 is an aperture 1082 that is adapted to receive one of the locating pins 1046 of the motor support member body 1014 for mating connection therewith. It will be appreciated that in an alternative embodiment, each locating dowel 1046 may be replaced with an aperture defined in the first shoulder 1042. Such an aperture would be alignable with an aperture 1082 and would be configured to receive therethrough a threaded fastener. In such an embodiment, the cutouts 1040 would provide access to the second hollow region 1052 to allow facilitate insertion and tightening of each fastener.

Extending outwardly from the second end 1062 of the hydraulic motor 1012 is a splined driveshaft 1084 for connecting to the first coupling assembly 1002.

While it is preferred that the motor 1012 be hydraulically powered, it will be appreciated that this need not be the case in every application. In other embodiments, other motors may be used to similar advantage, for instance, pneumatically-powered motors or gas-powered motors.

Figure 36:
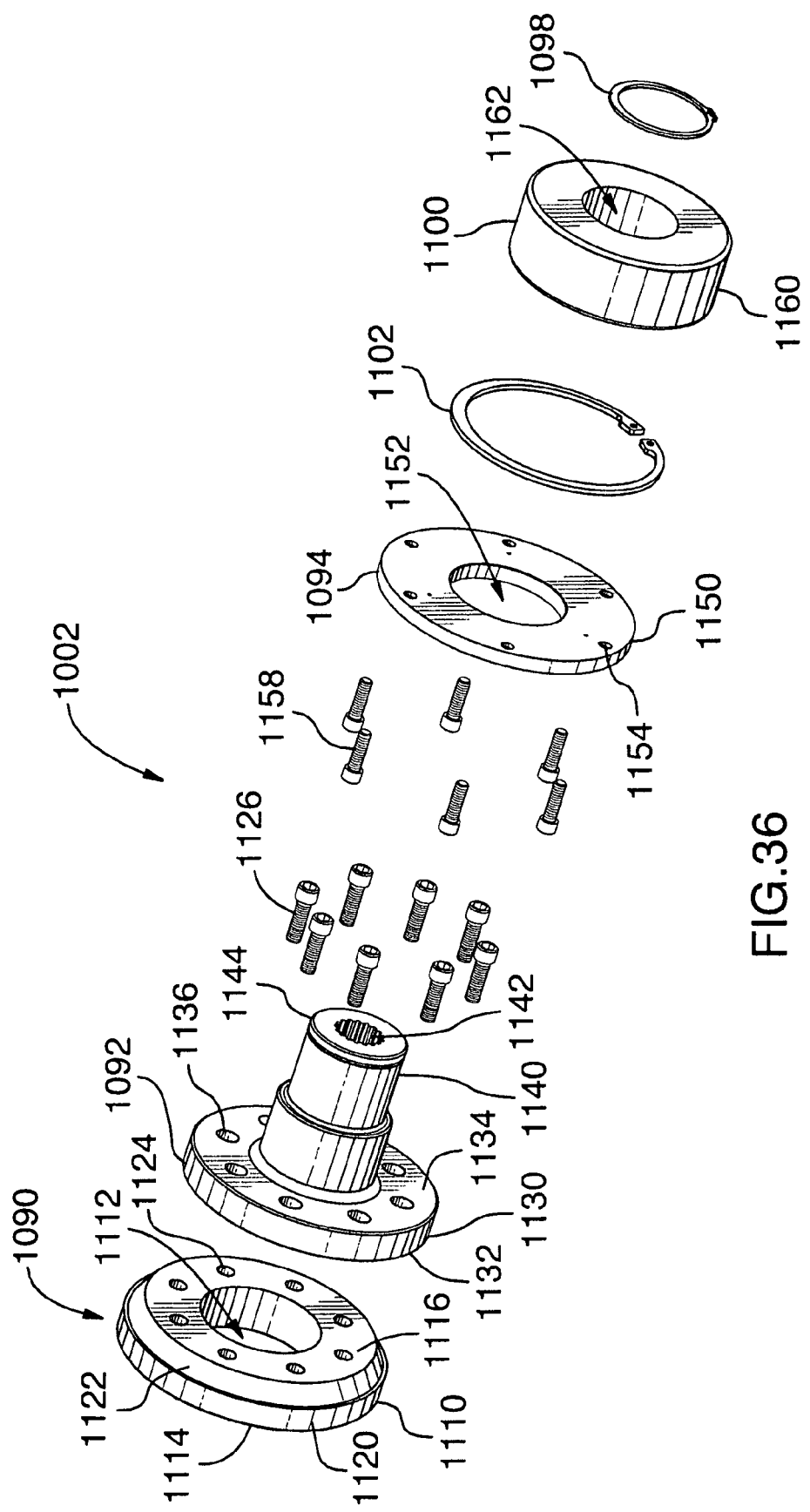
FIG. 36 is an exploded perspective view of the first coupling assembly shown in FIG. 34.

Referring now to FIGS. 34 to 36, the first coupling assembly 1002 is generally similar to the first coupling assembly 242 in that it includes a mounting plate 1090 for fixing to the support body 970, a coupling member 1092 for mating to the driveshaft 1084, a flat annular plate 1094 attachable to the motor support member 1010, a first retaining ring 1098, a bearing assembly 1100 and a second retaining ring 1102.

The mounting plate 1090 resembles mounting plate 330. It has an annular body 1110 with a central aperture 1112, a first face 1114 and a second opposed face 1116. Joining the first face 1114 to the second face 1116 is a sidewall 1118 formed by a narrow circumferential band 1120 and a tapering sidewall portion 1122. When mounting the plate 1090 to the support body 970, the peripheral edge of the first face 1114 is urged to abut the circumferential shoulder 996 of the support body 970. The narrow band 1120 is brought to bear against the inner surface 984 of the support body 970 and the mounting plate 1090 is welded to the support body 970 about its tapering sidewall portion 1122. Defined in the mounting plate 1090 is a plurality of bores 1124 sized to accommodate fasteners in the nature of threaded fasteners 1126.

In like fashion to the coupling member 332, the coupling member 1092 includes a disc-shaped portion 1130 having a first face 1132, a second face 1134 and a plurality of circumferentially spaced bores 1136 defined therein. Standing proud of the first face 1132 is a puck-like projection 1138 that is sized for clearance fit with the central aperture 1112 formed in the mounting plate 1090. During fabrication, the first face 1132 of the coupling member 1092 is brought to bear against the second face 1116 of the mounting plate 1090 with the puck-like projection 1138 locating in the central aperture 1112. Thereafter, the coupling member 1092 is fastened to the mounting plate 1090 by inserting the threaded fasteners 1126 into the aligned the bores 1124 and 1136 and tightening them. Thus attached, the coupling member 1092 and mounting plate 1090 are fixed to each other for rotation. The coupling member 1092 further includes a cylindrical hub portion 1140 that extends outwardly from the second face 1134. The hub portion 1140 has a blind bore 1142 defined at its free or terminal end 1144 that is adapted for slip fit mating with the splined drive shaft 1084.

The annular plate 1094 is has a wall 1150 that radially bounds the central aperture 1152 formed in the plate 1094. When the first coupling assembly 1002 is assembled, the annular plate 1094 surrounds the cylindrical hub portion 1140. The annular plate 1094 has a plurality of bores 1154 which are alignable with longitudinal blind bores 1156 drilled into the sidewall 1020 at the second end 1018 of the body 1014. During fabrication, threaded fasteners 1158 are inserted through bores 1154 and 1156 and tightened to attach the annular plate 1094 to the motor support member 1010.

The bearing assembly 1100 includes a generally annular body 1160 having a central aperture 1162 defined therethrough. As best shown in FIG. 33, the annular body 1160 is sized to fit snugly in the third hollow region 1056 defined within the motor support member 1010. The annular body 1160 is securely retained at one end by the first retaining ring 1098 mounted in surrounding relation with the terminal end 1144 of the hub portion 1140 and at the opposite end by the second retaining ring 1102 which engages the inner surface of the second sidewall portion 1038 of body 1014. Housed within the annular body 1160 is a plurality of bearings (not shown) disposed circumferentially about the central aperture 1162. When the drive block 1000 is assembled to the first coupling assembly 1002, the bearing assembly 1110 surrounds the cylindrical hub portion 1140.

Referring now to FIGS. 29 and 30, the mounting of the brush cutting head 802 to the housing 804 of the brush cutter 800 is now described in greater detail. The brush cutter 800 is operatively connected to the front of a vehicle (not shown) and the brush cutting head 802 is placed on the ground or other support surface which may be raised above the ground. Care is taken to ensure that the runners 884 and 886 and the end members 944 are detached from the side panels 810 and 812 and that the cutouts 940 are free from obstructions. The cover plate 916 is also removed from the protective enclosure 912.

Using the lifting means (not shown) provided on the vehicle (for instance, mechanical lifting arms) the housing 804 is hoisted above the brush cutting head 802 and positioned such that the arch-shaped cutouts 940 defined in the side panels 810 and 812 are aligned with the first and second ends 974 and 976 of the support body 970. Thereafter, the housing 804 is lowered onto the brush cutting head 802 with the motor support member 1010 of each drive block 1000 and 1004 received within each arch-shaped cutout 940.

Once the brush cutting head 802 is properly positioned within the well 814 of the housing 804, the brush cutting head 802 is attached at each end to the side panels 812 and 814. The flange 1022 of each motor support member body 1014 is fastened to the outer face of each side panel 812, 814 by inserting threaded fasteners 1170 through the aligned apertures 1024 (defined in the flange 1022) and apertures 942 (defined in the side panels 812, 814), and tightening the fasteners 1170.

The end members 944 are then attached to the side panels 812 and 814. More specifically, each plate portion 946 is fitted into each respective arch-shaped cutout 940 and secured in place with the threaded fasteners 960 extending through the aligned apertures 1170 (defined in the flange 1022) and the apertures 958 (defined in the plate portion 1024). The upturned semi-annular portions 948 are in turn fastened to the inner faces 840 of the side panel 812 and 814.

With the end members 944 secured in place, the runners 884 and 886 are next installed. If required, the housing 804 is raised off the ground to create sufficient clearance between the lower horizontal edges 868 of the side panel 812 and 814 and the ground to permit installation of the runners 884 and 886. To fix each runner 884, 886 to its respective side panel 810, 812, fasteners 906 are inserted through the aligned apertures 902 (defined in each bracket 892) and the apertures 904 (defined in each side panel 810, 812) and tightened.

With the mounting of the brush cutting head 802 onto the housing 804 completed, the hydraulic fluid distribution system (not shown) is operatively connected to the hydraulic motor 1012 via fluid supply lines tied to the inlet and outlet ports 1068 and 1070 and the brush cutter 800 is now operation ready. To actuate the brush cutting head 800, the hydraulic motors 1012 of each drive block 1000 and 1004 are energized thereby causing their respective driveshafts 1084 to rotate. By virtue of the mating connection between each driveshaft 1084 and its associated cylindrical hub portion 1140, the torque generated by each driveshaft 1084 is transmitted to the support body 970 via the coupling members 1092, the mounting plate 1090 and the circumferential shoulders 994 and 996 formed in the support body 970. As a result, the support body 970 is urged to rotate about the longitudinal axis R-R. A hydraulic fluid sensor (not shown) operatively connected to the hydraulic fluid distribution system associated with each drive block 1000, 1004 monitors the speed of the hydraulic motor 1012 of the drive block 1000 to ensure that it matches the speed of the hydraulic motor 1012 of the drive block 1004. During rotation of the support body 970, the motor support members 1010 are not subjected to torque.

In like fashion to the brush cutting head 24, the brush cutting head 802 can be relatively easily attached/detached from the brush cutter 20 while minimizing the duration of out-of-service periods. Additionally, the configuration of the drive and bearing assembly 930 tends to permit the performance of re-tooling, repair and maintenance activities in a cost-effective and time-efficient manner. As previously mentioned, with the provision of two hydraulic motors 1012, the drive and bearing assembly 930 allows for the use of a larger and heavier support body 970 to meet more challenging field conditions.

Referring now to FIG. 31, a plurality of protective collars designated generally with reference numerals 1180 are concentrically mounted to the support body 970 at spaced intervals along the intermediate portion 978. As with the collars 542 of the brush cutting head 24, pairs of adjacent collars 1180 cooperate with each other to define mounting sites or stations 1182 for each receiving a cutting tooth assembly 986 therein. The configuration and structure of the collars 1180 and the cutting tooth assemblies 986 is generally similar to that described in U.S. Pat. No. 6,764,035 such that it is not necessary for the purposes of this specification to describe these components and their mounting on the support body 970 in greater detail.

It will however be appreciated that in alternative embodiments, different collars and cutting tooth assemblies may be employed to similar advantage. For example, it may be possible to use the collars 542 and cutting tooth assemblies 546 described above or those described and shown in U.S. patent application Ser. No. 11/431,748.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. A brush cutting head comprising:
a hollow support body having a first end, an opposed second end, an outer surface and an inner surface; the inner surface of the support body defining a hollow which extends between the first and second ends of the support body; and
a drive and bearing assembly housed at least partially within the hollow of the support body; the drive and bearing assembly including:
a drive block mounted to extend within the hollow of the support body at the first end thereof; the drive block including a motor provided with a torque transmitting driveshaft;
a first coupling assembly connected to the driveshaft of the motor and the support body; the first coupling assembly being operable to transmit the torque produced by the motor to the support body to thereby urge rotation of the brush cutting head;
a second coupling assembly mounted to extend within the hollow of the support body at the second end thereof; the second coupling assembly having a first end and a second end, the second end of the coupling assembly being fixedly attached to the support body; the second coupling assembly including a bearing support member, a bearing assembly housed within the bearing support member and a coupling member; the bearing assembly being mounted in surrounding relation with a portion of the coupling member to thereby allow free rotation of the coupling member relative to the bearing support member;
wherein the drive block further includes a motor support member for retaining the motor within the hollow of the support body, the motor support member includes a body provided with a first end, a second end, a generally cylindrical sidewall extending between the first and second ends of the body; the sidewall defining a hollow which receives therein a portion of the motor.

2. The brush cutting head of claim 1 wherein the motor is hydraulically-actuated.

3. The brush cutting head of claim 1 wherein the motor is detachably mounted to the motor support member.

4. The brush cutting head of claim 3 wherein:
intermediate the first and second ends of the body, the sidewall has a radially inwardly extending portion defining a shoulder; and
the motor is provided with at least one tab for releasably fastening to the shoulder defined in the sidewall.

5. The brush cutting head of claim 1 wherein the body of the motor support member further includes a flange member joined to the sidewall at the first end of the body, the flange member being fixable to the side panel of a brush cutter housing.

6. A brush cutting head comprising:
a hollow support body having a first end, an opposed second end, an outer surface and an inner surface; the inner surface of the support body defining a hollow which extends between the first and second ends of the support body; and
a drive and bearing assembly housed at least partially within the hollow of the support body; the drive and bearing assembly including:
a drive block mounted to extend within the hollow of the support body at the first end thereof; the drive block including a motor provided with a torque transmitting driveshaft;
a first coupling assembly connected to the driveshaft of the motor and the support body; the first coupling assembly being operable to transmit the torque produced by the motor to the support body to thereby urge rotation of the brush cutting head;
a second coupling assembly mounted to extend within the hollow of the support body at the second end thereof; the second coupling assembly having a first end and a second end, the second end of the coupling assembly being fixedly attached to the support body; the second coupling assembly including a bearing support member, a bearing assembly housed within the bearing support member and a coupling member; the bearing assembly being mounted in surrounding relation with a portion of the coupling member to thereby allow free rotation of the coupling member relative to the bearing support member;
wherein the first coupling assembly includes a coupling member, the coupling member of the first coupling assembly includes a hub portion;
the hub portion has a first end and a second end, the second end of the huh portion has a bore defined therein, the bore receiving the driveshaft in mating engagement therewith;
the drive block further includes a motor support member for retaining the motor within the hollow of the support body; the motor support member includes a body provided with a first end, a second end, a generally cylindrical sidewall extending between the first and second ends of the body; the sidewall defining a hollow sized to receive therein a portion of the motor; and
the hub portion of the coupling member is mounted to extend into the hollow defined by the sidewall of the body.

7. The brush cutting head of claim 6 wherein the first coupling assembly includes a bearing assembly, the bearing assembly of the first coupling assembly being mounted in surrounding relation with the hub portion; the bearing assembly of the first coupling assembly being housed within the body of the motor support member.

8. The brush cutting head of claim 7 wherein the first coupling assembly includes an annular plate mounted to the second end of the body; the annular plate having a central opening defined therein, the central aperture receiving therethrough a portion of the hub portion; the annular plate cooperating with the sidewall of the body to at least partially enclose the bearing assembly of the first coupling assembly within the body.

9. The brush cutting head of claim 8 wherein the first coupling assembly includes first means for retaining the bearing assembly of the first coupling assembly onto the hub portion.

10. The brush cutting head of claim 9 wherein the first means for retaining the bearing assembly includes a first retaining ring fitted onto the second end of the hub portion.

11. The brush cutting head of claim 10 wherein the first coupling assembly includes second means for retaining the bearing assembly of the first coupling assembly within the body of the motor support member.

12. The brush cutting head of claim 11 wherein:
the sidewall of the body has an inner surface which defines the hollow of the body; and
the second means for retaining the bearing assembly includes a second retaining ring mounted in surrounding relation with the hub portion at a location intermediate the first and second ends thereof, the second retaining ring engaging the inner surface of the sidewall and a portion of the bearing assembly of the first coupling assembly.

13. A brush cutting head comprising:
a hollow support body having a first end, an opposed second end, an outer surface and an inner surface; the inner surface of the support body defining a hollow which extends between the first and second ends of the support body; and
a drive and bearing assembly housed at least partially within the hollow of the support body; the drive and bearing assembly including:
a drive block mounted to extend within the hollow of the support body at the first end thereof; the drive block including a motor provided with a torque transmitting driveshaft;
a first coupling assembly connected to the driveshaft of the motor and the support body; the first coupling assembly being operable to transmit the torque produced by the motor to the support body to thereby urge rotation of the brush cutting head;
a second coupling assembly mounted to extend within the hollow of the support body at the second end thereof; the second coupling assembly having a first end and a second end, the second end of the coupling assembly being fixedly attached to the support body; the second coupling assembly including a bearing support member, a bearing assembly housed within the bearing support member and a coupling member; the bearing assembly being mounted in surrounding relation with a portion of the coupling member to thereby allow free rotation of the coupling member relative to the hearing support member;
wherein the first couplings assembly includes a coupling member, the coupling member of the first coupling assembly includes a huh portion;
the hub portion has a first end and a second end, the second end of the hub portion has a bore defined therein, the bore receiving the driveshaft in engagement therewith;
the coupling member of the first coupling assembly includes a disc-shaped portion having a first face and an opposed second face, the hub portion extending outwardly from the second face of the disc-shaped portion;
the first coupling member includes a mounting plate fixed to the support body; the mounting plate being releasably fastened to the disc-shaped portion of the first coupling member; and
the first coupling assembly includes means for aligning the disc-shaped portion of the first coupling member with the mounting plate.

14. The brush cutting head of claim 13 wherein:
the disc-shaped portion has a projection standing proud of the first face thereof;
the mounting plate has an annular body provided with a central aperture; and
the projection and the central aperture of the annular body together define the alignment means of the first coupling assembly.

15. The brush cutting head of claim 1 wherein the bearing support member includes a body provided with a first end, a second end, a generally cylindrical sidewall extending between the first and second ends of the body; the sidewall defining a hollow which receives therein the bearing assembly.

16. The brush cutting head of claim 15 wherein the body of the bearing support member further includes a flange member joined to the sidewall at the first end of the body, the flange member being fixable to the side panel of a brush cutter housing.

17. The brush cutting head of claim 15 wherein the bearing assembly is removeably mounted to the bearing support member.

18. The brush cutting head of claim 17 wherein the coupling member of the second coupling assembly includes a hub portion, the bearing assembly being mounted in surrounding relation with the hub portion.

19. The brush cutting head of claim 18 wherein the second coupling assembly includes an annular plate mounted to the second end of the body; the annular plate having a central opening defined therein, the central opening receiving therethrough a portion of the hub portion; the annular plate cooperating with the sidewall of the body to at least partially enclose the bearing assembly within the body.

20. The brush cutting head of claim 19 wherein the second coupling assembly includes first means for retaining the bearing assembly of the second coupling assembly onto the hub portion.

21. The brush cutting head of claim 20 wherein the first means for retaining the bearing assembly includes a first retaining ring fitted onto the second end of the hub portion.

22. The brush cutting head of claim 21 wherein the second coupling assembly includes second means for retaining the bearing assembly of the second coupling assembly within the body of the bearing support member.

23. The brush cutting head of claim 22 wherein:
the sidewall of the body has an inner surface which defines the hollow of the body; and
the second means for retaining the bearing assembly includes a second retaining ring mounted in surrounding relation with the hub portion at a location intermediate the first and second ends thereof, the second retaining ring being sized to engage the inner surface of the sidewall and a portion of the bearing assembly of the second coupling assembly.

24. The brush cutting head of claim 18 wherein the coupling member of the second coupling assembly includes a disc-shaped portion having a first face and an opposed second face, the hub portion extending outwardly from the second face of the disc-shaped portion.

25. The brush cutting head of claim 24 wherein the second coupling member includes a mounting plate fixed to the support body; the mounting plate being releasably fastened to the disc-shaped portion of the second coupling member.

26. The brush cutting head of claim 25 wherein the second coupling assembly includes means for aligning the disc-shaped portion of the second coupling member with the mounting plate.

27. The brush cutting head of claim 26 wherein:
the disc-shaped portion has a projection standing proud of the first face thereof;
the mounting plate has an annular body provided with a central aperture; and
the projection and the central aperture of the annular body together define the alignment means of the second coupling assembly.

28. A brush cutting head comprising:
a hollow support body having a first end, an opposed second end, an outer surface and an inner surface; the inner surface of the support body defining a hollow which extends between the first and second ends of the support body; and
a drive and bearing assembly housed at least partially within the hollow of the support body; the drive and bearing assembly including:
a drive block mounted to extend within the hollow of the support body at the first end thereof; the drive block including a motor provided with a torque transmitting driveshaft;
a first coupling assembly connected to the driveshaft of the motor and the support body; the first coupling assembly being operable to transmit the torque produced by the motor to the support body to thereby urge rotation of the brush cutting head;
a second coupling assembly mounted to extend within the hollow of the support body at the second end thereof; the second coupling assembly having a first end and a second end, the second end of the coupling assembly being fixedly attached to the support body; the second coupling assembly including a bearing support member, a bearing assembly housed within the bearing support member and coupling member; the bearing assembly being mounted in surrounding relation with a portion of the coupling member to thereby allow free rotation of the coupling member relative to the bearing support member;
wherein:
at a location adjacent the first end of the support body, the support body has a first shoulder projecting from the inner surface thereof into the hollow; a portion of the first coupling assembly being fixed to the first shoulder;
at a location adjacent the second end of the support body, the support body has a second shoulder projecting from the inner surface thereof into the hollow; the second end of the second coupling assembly being fixedly attached to the second shoulder;
the first coupling assembly includes a coupling member matingly engaged with the driveshaft and a first mounting plate fixed to the first shoulder defined in the support body; the coupling member of the first coupling assembly being releasably fastened to first mounting plate; and
the second coupling assembly includes a second mounting plate fixed to the second shoulder defined in the support body; the coupling member of the second coupling assembly being releasably fastened to second mounting plate.

29. A brush cutter comprising:
an open-bottom brush cutter housing having a plurality of panels, the plurality of panels including a first side panel and a second side panel;
a hollow support body rotatably mounted between the lint and second side panels of the brush cutter housing; the support body having a first end, an opposed second end, an outer surface and an inner surface; the inner surface of the support body defining a hollow which extends between the first and second ends of the support body; and
a drive and bearing assembly housed at least partially within the hollow of the support body; the drive and bearing assembly including:
a drive block mounted to extend within the hollow of the support body at the first end thereof; the drive block including a motor provided with a torque transmitting driveshaft;
a first coupling assembly connected to the drive shall of the motor and the support body; the first coupling assembly being operable to transmit the torque produced by the motor to the support body to thereby urge rotation of the brush cutting head;
a second coupling assembly mounted to extend within the hollow of the support body at the second end thereof; the second coupling assembly having a first end and a second end, the second end of the coupling assembly being fixedly attached to the support body; the second coupling assembly including a bearing support member, a bearing assembly housed within the bearing support member and a coupling member; the bearing assembly being mounted in surrounding relation with a portion of the coupling member to thereby allow free rotation of the coupling member relative to the bearing support member;
wherein:
the drive block is releasably connected to the first side panel of the brush cutter housing; and
the bearing support member is releasably connected to the second side panel of the brush cutter housing.

30. A brush cutter comprising:
an open-bottom brush cutter housing having a plurality of panels, the plurality of panels including a first side panel and a second side panel;
a hollow support body rotatably mounted between the first and second side panels of the brush cutter housing; the support body having a first end, an opposed second end, an outer surface and an inner surface; the inner surface of the support body defining a hollow which extends between the first and second ends of the support body; and
a drive and bearing assembly housed at least partially within the hollow of the support body; the drive and bearing assembly including:
a drive block mounted to extend within the hollow of the support body at the first end thereof; the drive block including a motor provided with a torque transmitting driveshaft;
a first coupling assembly connected to the driveshaft of the motor and the support body;

the first coupling assembly being operable to transmit the torque produced by the motor to the support body to thereby urge rotation of the brush cutting head;

a second coupling assembly mounted to extend within the hollow of the support body at the second end thereof; the second coupling assembly having a first end and a second end, the second end of the coupling assembly being fixedly attached to the support body; the second coupling assembly including a bearing support member, a bearing assembly housed within the bearing member and a coupling member; the bearing assembly being mounted in surrounding relation with a portion of the coupling member to thereby allow free rotation of the coupling member relative to the bearing support member;

wherein the drive block further includes a motor support member for retaining the motor within the hollow of the support body; the motor support member having a flange member, the flange member being detachably fastened to the first side panel.

31. The brush cutter of claim 30 wherein the first side panel has a cutout formed therein sized to receive a portion of the motor support member.

32. The brush cutter of claim 29 wherein the bearing support member has a flange member, the flange member being detachably fastened to the second side panel.

33. The brush cutter of claim 32 wherein the second side panel has a cutout formed therein sized to receive a portion of the bearing support member.

* * * * *